US008542970B2

(12) United States Patent
Ogawa et al.

(10) Patent No.: US 8,542,970 B2
(45) Date of Patent: Sep. 24, 2013

(54) PLANAR OPTICAL WAVEGUIDE ELEMENT, CHROMATIC DISPERSION COMPENSATOR, OPTICAL FILTER, OPTICAL RESONATOR AND METHODS FOR DESIGNING THE ELEMENT, CHROMATIC DISPERSION COMPENSATOR, OPTICAL FILTER AND OPTICAL RESONATOR

(71) Applicant: Fujikura Ltd., Koto-ku (JP)

(72) Inventors: Kensuke Ogawa, Sakura (JP); Ning Guan, Sakura (JP); Ken Sakuma, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/723,566

(22) Filed: Dec. 21, 2012

(65) Prior Publication Data
US 2013/0129293 A1 May 23, 2013

Related U.S. Application Data

(60) Division of application No. 12/870,684, filed on Aug. 27, 2010, now abandoned, which is a continuation of application No. PCT/JP2009/053763, filed on Feb. 27, 2009.

(30) Foreign Application Priority Data

Feb. 29, 2008 (JP) .................................. 2008-051346

(51) Int. Cl.
*G02B 6/10* (2006.01)
(52) U.S. Cl.
USPC ........................................................ 385/129

(58) Field of Classification Search
USPC ............................................................ 385/129
See application file for complete search history.

(56) References Cited

U.S. PATENT DOCUMENTS

| 5,016,959 | A |   | 5/1991 | Diemeer |
| 5,199,092 | A |   | 3/1993 | Stegmueller |
| 5,497,393 | A |   | 3/1996 | Lee |
| 5,668,900 | A | * | 9/1997 | Little et al. ..................... 385/37 |
| 5,715,271 | A |   | 2/1998 | Huang et al. |
| 6,277,048 | B1 |   | 8/2001 | Rohs |

(Continued)

FOREIGN PATENT DOCUMENTS

| JP | 01-214803 A | 8/1989 |
| JP | 02-051132 A | 2/1990 |

(Continued)

OTHER PUBLICATIONS

US 6,584,264, Jun. 2003, Arakawa (withdrawn).

(Continued)

*Primary Examiner* — Uyen Chau N Le
*Assistant Examiner* — Hoang Tran
(74) *Attorney, Agent, or Firm* — Sughrue Mion, PLLC

(57) ABSTRACT

There is provided a planar optical waveguide element including a core, the core including first and second portions and a gap portion that is positioned in a center of a width direction of the core between the first and second portions so as to extend in a light waveguide direction. The gap portion has a lower refractive index than that of the first and second portions, and a single mode propagated in the waveguide element has a span crossing the first and second portions.

2 Claims, 49 Drawing Sheets

(56) References Cited

U.S. PATENT DOCUMENTS

| | | | |
|---|---|---|---|
| 6,553,164 | B1 | 4/2003 | Ono et al. |
| 6,687,446 | B2 | 2/2004 | Arakawa |
| 6,707,967 | B2 | 3/2004 | Rothenberg et al. |
| 6,728,445 | B2 | 4/2004 | Blomquist et al. |
| 6,751,241 | B2 * | 6/2004 | Davis et al. ............. 372/6 |
| 6,865,319 | B2 | 3/2005 | Painchaud |
| 7,065,280 | B2 | 6/2006 | Ogawa et al. |
| 7,095,911 | B2 | 8/2006 | Kopp et al. |
| 7,177,501 | B2 | 2/2007 | Guerin et al. |
| 7,391,940 | B2 | 6/2008 | Bryan et al. |
| 2002/0001446 | A1 | 1/2002 | Arakawa |
| 2002/0122650 | A1 | 9/2002 | Kominato et al. |
| 2004/0218275 | A1 | 11/2004 | Ketterson et al. |

FOREIGN PATENT DOCUMENTS

| | | | |
|---|---|---|---|
| JP | 02-297505 A | 12/1990 | |
| JP | 02-305487 A | 12/1990 | |
| JP | 03-158802 A | 7/1991 | |
| JP | 05-080223 A | 4/1993 | |
| JP | 05-188231 A | 7/1993 | |
| JP | 06-313818 A | 11/1994 | |
| JP | 08-271842 A | 10/1996 | |
| JP | 09-129958 A | 5/1997 | |
| JP | 10-115725 A | 5/1998 | |
| JP | 2000-121852 A | 4/2000 | |
| JP | 2000-147286 A | 5/2000 | |
| JP | 2000-295125 A | 6/2000 | |
| JP | 2000-235125 A | 8/2000 | |
| JP | 2001-124945 A | 5/2001 | |
| JP | 2001-194549 A | 7/2001 | |
| JP | 3262312 B2 | 3/2002 | |
| JP | 2003-057465 A | 2/2003 | |
| JP | 3415267 B2 | 6/2003 | |
| JP | 2003-188479 A | 7/2003 | |
| JP | 2004-029073 A | 1/2004 | |
| JP | 2004-077665 A | 3/2004 | |
| JP | 2004-126172 A | 4/2004 | |
| JP | 2004-170627 A | 6/2004 | |
| JP | 2004-258119 A | 9/2004 | |
| JP | 2003-057465 A | 5/2006 | |
| JP | 2006-126527 A | 5/2006 | |
| JP | 2006-330104 A | 12/2006 | |
| JP | 3917170 B2 | 5/2007 | |
| WO | 03/062886 A2 | 7/2003 | |

OTHER PUBLICATIONS

Brooks, Cameron et. al., "Integrated-optic dispersion compensator that uses chirped gratings", Optics Letters, vol. 20, No. 4, 1995, pp. 368-370.

Feced, Ricardo et. al., "An Efficient Inverse Scattering Algorithm for the Design of Nonuniform Fiber Bragg Gratings", IEEE Journal of Quantum Electronics, vol. 35, No. 8, 1999, pp. 1105-1115.

Li, Hongpu et. al., "Phased-Only Sampled Fiber Bragg Gratings for High-Channel-Count Chromatic Dispersion Compensation", Journal of Lightwave Technology, vol. 21, No. 9, Sep. 2003, pp. 2074-2083.

Xiao, Gaobiao and Yashiro, Ken'ichiro. "An efficient Algorithm for Solving Zakharov-Shabat Inverse Scattering Problem", IEEE Transactions on Antennas and Propagation, vol. 50, Issue 6, 2002. pp. 807-811.

Almeida, Vilson R. et. al., "Guiding and Confining Light in Void Nanostructure", Optics Letters, vol. 29, No. 11, 2004, pp. 1209-1211.

International Search Report [PCT/ISA/210], dated Apr. 7, 2009, issued in International Application No. PCT/JP2009/053731.

International Search Report [PCT/ISA/210], dated May 26, 2009, issued in Application No. PCT/JP2009/053766.

Japanese Office Action, dated Mar. 23, 2010, issued in Japanese Application No. 2009-530044.

International Search Report [PCT/ISA/210], dated Jun. 9, 2009, issued in International Application No. PCT/JP2009/053759.

Communication, dated Nov. 24, 2011, issued by the State Intellectual Property Office of P.R. China in corresponding Chinese Application No. 200980106431.3.

Non-Final Office Action dated Jan. 30, 2012 issued in U.S. Appl. No. 12/870,684.

Non-Final Office Action dated Jan. 26, 2012 issued in U.S. Appl. No. 12/870,748.

Notice of Allowance issued in the United States Patent and Trademark Office May 16, 2012 in counterpart U.S. Appl. No. 12/870,647.

U.S. final Office Action issued Jun. 22, 2012 in U.S. Appl. No. 12/870,684.

* cited by examiner

PLANAR OPTICAL WAVEGUIDE ELEMENT, CHROMATIC DISPERSION COMPENSATOR, OPTICAL FILTER, OPTICAL RESONATOR AND METHODS FOR DESIGNING THE ELEMENT, CHROMATIC DISPERSION COMPENSATOR, OPTICAL FILTER AND OPTICAL RESONATOR

CROSS-REFERENCE TO RELATED APPLICATION

This is a Divisional of application Ser. No. 12/870,684, filed Aug. 27, 2010, which priority is claimed on International Application No. PCT/JP2009/053763, filed on Feb. 27, 2009, which claims priority to Japanese Patent Application No. 2008-051346, filed Feb. 29, 2008. The contents of the aforementioned applications are incorporated herein by reference.

TECHNICAL FIELD

Apparatuses and embodiments described herein related to a planar optical waveguide element and design method thereof, in which the planar optical waveguide element can be used in various applications such as a wavelength dispersion compensation element, an optical filter and an optical resonator and the like.

BACKGROUND ART

The following are examples of wavelength dispersion compensation in an optical waveguide structure which does not consider polarization dependence.

An element having a plurality of Bragg grating elements in which the cycle changes spatially such that wavelength dispersion is compensated in a plurality of wavelength channels is disclosed in Patent document 1 (U.S. Pat. No. 6,865,319) as a dispersion compensation element which has a Bragg grating pattern on the waveguide. Moreover, Patent document 1 also discloses that a refractive index distribution n (z) of the Bragg grating which is formed by a plurality of elements extending in the direction of the optical axis of the waveguide also shows sinusoidal changes as shown in the following formula (wherein z is the position of a point on the light propagation axis).

[Expression 1]

$$n(z) = n_{\text{eff}}(z) + \sum_{i=1}^{m} \Delta n_i(z) \sin\left(\int_0^z \frac{2\pi}{p_i(z')} dz' + \phi_i\right) \quad \text{(Formula 1)}$$

In a sine wave component which corresponds to the Bragg grating pattern of each wavelength channel, the pitch (local cycle) p, gradually changes (i.e., chirps) together with z. In FIG. 3 of Patent document 1, the pitch chirps in a direction in which it decreases in response to increases in z. In addition, an origin phase $\phi_i$ changes discretely in each grating element i. As in the above described formula, the Bragg grating pattern which corresponds to each channel is defined independently, and a Bragg grating pattern is formed by superimposing these patterns. In Patent document 1, a case is illustrated in which a Bragg grating pattern is formed in an optical fiber.

In Patent document 2 (U.S. Pat. No. 6,707,967), a wavelength dispersion compensation element is described in which a Bragg grating having one cycle is formed on the waveguide path, and a sampling structure is formed on the waveguide path which is superimposed on this Bragg grating, so that wavelength dispersion compensation is performed in a plurality of wavelength channels. The sampling structure is formed by a pattern that has undergone phase sampling in one cycle which is longer than the cycle of the Bragg grating. Each cycle of the phase sampling is divided into a plurality of spatial areas in a direction along the optical axis of the waveguide, and the phase of the Bragg grating changes discontinuously at a boundary where mutually adjacent spatial areas are in contact with each other. As is shown in FIG. 1A through FIG. 1D of Patent document 2, there are no discontinuous phase changes within a single spatial area.

In Patent document 3 (Japanese Patent No. 3262312), a two-input and two-output light dispersion equalizer is described that performs wavelength dispersion compensation. The light dispersion equalizer has a structure as a basic component element in which two optical waveguides are coupled by a plurality of directional couplers, the optical path lengths of two waveguides in a region sandwiched by two adjacent directional couplers are mutually different, and a phase controller is provided in at least one of the two waveguides. In this document, a device is illustrated that compensates a dispersion slope using these waveguides, and an element that compensates wavelength dispersion is provided in an optical input section. Furthermore, this document also described that increasing the number of stages formed by connecting the aforementioned basic component elements in series, in order to increase the compensation effect.

In Patent document 4 (Japanese Patent No. 3415267), a design method for an optical signal processor is described in which a structure provided with a directional coupler having an amplitude coupling ratio ranging from a positive value to a negative value on one side of two waveguides having an optical path difference is used as a basic component element, and these basic component elements are combined in a series so as to form a two-input and two-output optical circuit with no feedback (namely, no reflection). In this design technique, the structure of the optical circuit is decided by expressing the characteristics of the optical circuit using a two-row two-column unitary matrix, imparting the desired output characteristics of the cross-port, and calculating amplitude parameters of the directional coupler in which the amplitude parameters are unknown parameters of the optical circuit. An example of the design of a wavelength dispersion compensation element that is based on this design method is given in the Examples.

In Patent document 5 (Japanese Patent No. 3917170), a broadband wavelength dispersion compensation element that employs a high refractive index waveguide that uses photonic crystals is described, and in which wavelength dispersion compensation is performed by a transmission type of optical waveguide structure. The coding of the wavelength dispersion can be changed.

In Non-patent document 1 ("Phase-Only Sampled Fiber Bragg Gratings for High-Channel-Count Chromatic Dispersion Compensation" H. Li, Y. Sheng, Y. Li and J. E. Rothenberg, Journal of Lightwave Technology, Vol. 21, No. 9, September 2003, pp. 2074-2083), an actual fiber Bragg grating wavelength dispersion compensation element is prepared using a design technique similar to that of Patent document 2, and the result of this is described. Firstly, a Bragg grating pattern of a single channel in a center wavelength is designed using the information in Non-patent document 2 ("An Efficient Inverse Scattering Algorithm for the Design of Nonuniform Fiber Bragg Gratings" R. Feced, M. N. Zervas and M. A. Muriel, IEEE Journal of Quantum Electronics, Vol. 35, No. 8, 1999, pp. 1105-1115). The grating pattern is derived using an inverse scattering solution from the spectrum characteristics of the desired reflection and wavelength dispersion. However, in the fiber Bragg grating, because there are limits to the range over which the refractive index can be changed in order to manufacture a grating pattern, an operation in which the aforementioned spectrum characteristics are apodized by undergoing an inverse Fourier transform is also carried out so that these limits are not exceeded. As a result of this, a pattern is obtained in which the pitch of the Bragg grating changes continuously together with the position. Thereafter, Bragg grating patterns are designed using phase sampling for a plurality of channels. In a fiber Bragg grating, because there are limits on the range of refractive index change, phase sampling is effective.

In Non-patent document 2, an algorithm of a solution for the problem of inverse scattering which is based on layer peeling solution is described, and an example of the analysis of a wavelength dispersion compensation element that employs a fiber Bragg grating is illustrated.

In Non-patent document 3 ("Integrated-Optic Dispersion Compensator that uses Chirped Gratings" C. J. Brooks, G. L. Vossler and K. A. Winick, Optics Letters, Vol. 20, No. 4, 1995, pp. 368-370), a wavelength dispersion compensation element that employs a chirped Bragg grating waveguide on a substrate is described. In this wavelength dispersion compensation element, a rectangular optical waveguide core is formed by silver ion exchange on a silica glass substrate, and a Bragg grating pattern is formed in silica cladding on a top portion of the core. Because the grating pitch is gradually changed, the propagation axis of the core of the optical waveguide is bent. Laser light pulses having a wavelength of 800 nm are irradiated thereon so that 58 ps/nm is obtained for an optical waveguide having a 7 mm grating length. Using a grating having a length of 50 mm, it is possible to perform wavelength dispersion compensation for an optical fiber equivalent to 50 km at a wavelength of 1550 nm.

In FIGS. 1 (a) and (b) and FIG. 3 (a) of Non-patent document 4 ("Guiding and Confining Light in Void Nanostructure" Vilson R. Almeida et. al, Optics Letters, Vol. 29, No. 11, 2004, pp. 1209-1211), a slot-type optical waveguide element is described that has a structure in which light is confined in silica glass (having a refractive index of 1.46, a width of 50 nm and a height of 300 nm) in a center gap region that is sandwiched between rectangular silicon (i.e., between two locations that each have a refractive index of 3.48, a width of 180 nm and a height of 300 nm).

DISCLOSURE OF THE INVENTION

Problems to be Solved by the Invention

The amount of information that can be transmitted by optical communication has been constantly increasing. In response to this, measures such as (I) increasing the transmission rate of a signal, and (II) increasing the number of channels in wavelength multiplexing communication are being promoted.

In optical communication, optical signals are transmitted using light pulses. Consequently, the following problems occur in the aforementioned measure (I). If the transmission rate increases, the time width of the light pulses is shortened, and the intervals between adjacent light pulses on a time axis becomes narrower. Because of this, it is crucial for the temporal waveform of the light pulses to be controlled. On a transmission path formed by an optical fiber, because of wavelength dispersion in which the propagation rate differs depending on the wavelength of the light, the time width of the light pulses becomes broader as they travel along the optical fiber. Because of this, technology for wavelength dispersion compensation is required in which an optical element having the opposite coding wavelength dispersion from that of the optical fiber is provided on the optical fiber transmission path, and wavelength dispersion is removed from the light pulses after they have traveled along the transmission path. The above described Patent documents 1 to 5 provide technology for a wavelength dispersion compensation element for measure (I). In particular, in Patent documents 1 and 2, technology is described which relates to a multichannel wavelength dispersion compensation element that deals with a plurality of channels of wavelength multiplexing optical fiber communication.

In contrast, measures (II) have the problems that, because the transmission path becomes more complex as the number of optical components increases, they lead to increased size, increased complexity, and increased costs for the optical communication equipment.

In order to avoid increases in the size and complexity of optical communication equipment, it is necessary to miniaturize the component elements such as the circuits and components of the devices that make up the optical communication equipment, and to then integrate the miniaturized component elements so as to avoid any increase in the number of components. In order to achieve a miniaturization of the optical components, it is essential to miniaturize the optical elements that are the fundamental elements making up the optical components. Optical elements that are used for optical communication are commonly formed using optical waveguides. Because of this, miniaturization of the optical waveguide is important to miniaturize the optical components. In order to miniaturize the optical waveguide, it is essential to use a material having a high refractive index such as silicon (Si) or the like. This is because, as the wavelength of light in a medium is inversely proportional to the refractive index of that medium, dimensions such as the core width of the optical waveguide become smaller as the refractive index becomes higher. The refractive index of Si is approximately 3.5, which is more than 2.3 times the refractive index of silica ($SiO_2$), which is approximately 1.5. Because the materials having a high refractive index such as Si and the like can be formed on a flat substrate, coupling of a plurality of optical waveguides becomes easier, and this materials are suitable for the task of integrating a plurality of optical components.

In order to avoid increased costs in optical components, it is important to reduce the manufacturing costs of the optical elements. If the optical waveguides are miniaturized, the cost of the raw materials needed for each optical element also decreases, and unit costs can be reduced. Because materials having a high refractive index such as Si and the like can be formed on a flat substrate, a large number of optical elements can be manufactured on one substrate by using a large area substrate, and the manufacturing costs can be reduced even further.

In order to obtain wavelength dispersion elements that are small in size and suitable for integration by forming optical waveguides on a flat substrate using Si and Si-based high refractive index materials, in the design of the optical waveguide, it is necessary for the effective refractive index of the optical waveguide in a polarization state which is parallel to the substrate surface to be equivalent to the effective refractive index in a polarization state which is orthogonal to the substrate surface. This is because the cross-sectional configuration of the core of a high refractive index optical waveguide on the flat substrate is different from a circular core cross-section of a semiconductor optical fiber. If the effective refractive index of the optical waveguide is different due to the polarization, then the wavelength dispersion generated in the optical waveguide is also changed by the polarization. In this case, the performance of the wavelength dispersion compensation element ends up being affected by the polarization of the light pulses traveling along the optical fiber.

Solving the above described problems is difficult using related art technology. A description will now be given of each element of the above mentioned related art technology.

Technology of Patent Document 1

In the technology described in Patent document 1, as an example of device manufacturing, there is only a description of a case in which a Bragg grating that uses an optical fiber is formed. Namely, the main subject of this technology is an optical fiber Bragg grating. The cross-section of an optical fiber is circular, and the optical characteristics thereof do not depend on the polarization direction of the propagated light. Accordingly, absolutely no mention is made about providing technology that relates to the design of an optical waveguide intended to reduce polarization dependence. In a design that considers polarization dependence, the effective refractive index is independently defined for each of polarization that is parallel to the substrate surface and polarization that is perpendicular to the substrate surface, and it is necessary to optimize the waveguide structure such that these two effective refractive indices match each other. However, in this document, as is described above formula, only a single effective refractive index n (z) is defined irrespective of the polarization. Accordingly, it is not possible for the technology of this document to be applied to the design of wavelength dispersion compensation elements that are formed from high refractive index optical waveguides in which the polarization dependence on the substrate has been reduced.

Moreover, the design method of the wavelength dispersion compensation element according to Patent document 1 follows a procedure in which the parameters in the formula such as the element length and amplitude of the effective refractive index is determined such that the wavelength dispersion characteristics obtained by simulation from that structure approach predetermined characteristics, while determining the shape of the effective refractive index pattern of the Bragg grating by the formula in advance. In this design method, a Bragg grating optical waveguide is configured only by superimposing the Bragg grating patterns that correspond to each wavelength channel. Accordingly, the removal of interference between wavelength channels has not performed in this design method, therefore the problem arises that the wavelength dispersion characteristics are deteriorated by the interference between wavelength channels. Furthermore, the procedure of this design method is a reverse flow of a procedure of a design method that specifies the effective refractive index pattern of a Bragg grating from predetermined element dimensions or optical characteristics. In order to achieve a miniaturization of the elements, it is essential for the element length to be decided in advance. However, this is not possible in the design method of Patent document 1.

Technology of Patent Document 2

Patent document 2 does not mention a design that considers polarization dependence in the same way as in Patent document 1. Accordingly, it is not possible for the technology of this document to be applied to the design of wavelength dispersion compensation elements that are formed from high refractive index optical waveguides in which the polarization dependence on a substrate has been reduced.

In this document, a principle of designing a grating waveguide based mainly on phase sampling of the grating is employed. The reason for this is that, because this document is intended for low refractive index optical waveguides such as optical fibers whose refractive index is within a range of 1.4 to 1.5, it is restricted by the fact that a range of what the effective refractive index of the optical waveguide can be changed is narrow. Patent document 2 mentions that the technology can also be applied to waveguides on a substrate. However, the technology of Patent document 2 is suitable only for the same type of low refractive index optical waveguides. Accordingly, the technology of Patent document 2 is not suitable for the purpose of attaining miniaturization by shortening the grating length as much as possible without reducing the reflectance by widely changing the effective refractive index in a reflective optical waveguide.

Furthermore, Patent document 2 discloses that a phase sampling pattern is effective in avoiding performance deterioration due to voids when a grating structure is being manufactured. The reason for this is that this document is concerned with manufacturing optical fiber gratings, and intended for a manufacturing method in which a grating pattern is printed on an optical fiber using ultraviolet irradiation. If it were intended for a high refractive index optical waveguide on a substrate, then it should be expected that there would be no restrictions such as performance deterioration due to the voids.

Technology of Patent Document 3

Patent document 3 does not mention any technology to reduce polarization dependence. In the simple optical waveguide structure of this document, it is only possible to compensate a dispersion slope, and it is not possible to compensate wavelength dispersion. In order to compensate wavelength dispersion, it is necessary to form a structure in which another optical element is connected to the optical waveguide. Because of this, it is not possible to achieve miniaturization by using the technology of this document.

Technology of Patent Document 4

Patent document 4 does not mention any technology to reduce polarization dependence. In the wavelength dispersion compensation element of this document, because the phase characteristics are anti-symmetrical to the point of origin, the wavelength dispersions in adjacent spectrum regions end up being inverted. Accordingly, this wavelength dispersion compensation element can only be used for wavelength dispersion compensation that targets a particular limited spectrum region, namely, that targets specific spectrum region channels. This wavelength dispersion compensation element cannot be used to compensate wavelength dispersion in a plurality of channels for the purpose of application to wavelength multiplexing optical fiber communication.

Technology of Patent Document 5

The technology of Patent document 5 can compensate wavelength dispersion in a broad wavelength band. However, the technology of Patent document 5 cannot deal with multichannel wavelength dispersion. Because of this, the wavelength dispersion value thereof is not large. Accordingly, this technology cannot be used to compensate wavelength dispersion in a long distance (e.g., 40 km) optical fiber transmission path for the purpose of application to wavelength multiplexing optical fiber communication.

Technology of Non-Patent Document 1

The technology of Non-patent document 1 has the same problems as those of Patent document 2.

Technology of Non-Patent Document 3

Although this is a Bragg grating optical waveguide formed on a flat substrate, a grating pattern is only formed in the cladding region on top of the optical waveguide core. Accordingly, the effective refractive indices of the respective optical waveguides are different for linearly polarized light in a direction parallel to the substrate surface and in a direction perpendicular to the substrate surface. Because of this, the wavelength dispersion performance differs greatly due to the polarization state. Experiments described in this document were performed using a Ti: sapphire laser as a light source. A Ti: sapphire laser normally emits linearly polarized light. In this document, there is no description of polarization states, and no consideration is given as to how to solve the problem of effective refractive index differences that are caused by disparities in polarization. Accordingly, it is not possible for the technology of this document to be applied to the design of wavelength dispersion compensation elements that are formed by high refractive index optical waveguides in which the polarization dependence on a substrate has been reduced.

Technology of Non-Patent Document 4

The technology of Non-patent document 4 is characterized in having a special structure in which a low refractive index center gap is sandwiched in rectangular silicon, and propagated light is confined in this low refractive index region by narrowing this center gap. The light propagation principle itself differs greatly from a typical optical waveguide in which propagated light is mainly confined in a high refractive index region. In optical waveguides that correspond to this structure, the machining accuracy of the slot side walls has a large effect on the scattering rather than that of the core rib side walls. Moreover, because wave-guided light is distributed more in the low refractive index portion than the high refractive index portion, this structure is not suited to the purpose of making the optical characteristics variable by making the refractive index of the high refractive index portions variable.

When the optical waveguide structure shown in FIG. 3 is calculated using a mode solver, it was found that the light confinement coefficient in two silicon regions was 42.7%, while in contrast to this, the light confinement coefficient in the center gap region which had a surface area having a width of 50 nm and a height of 300 nm was 48.0%, so that the propagated light was mainly confined in the center gap (i.e., slot) region.

The exemplary embodiments described herein were conceived in view of the above described circumstances and it is an exemplary object thereof to provide a planar optical waveguide element, a wavelength dispersion compensation element using this planar optical waveguide element, and a design method thereof, in which the planar optical waveguide element can reduce the effects caused by a roughness of the core-side wall which is inevitably generated in a manufacturing process.

Means for Solving the Problem

In order to solve the above described problems, exemplary embodiments include the following.

Namely, (1) An aspect of an exemplary embodiment is related to a planar optical waveguide element wherein an optical waveguide comprises: a core, and a gap portion that is positioned in a center of a width direction of the core so as to extend in a light waveguide direction, and that has a lower refractive index than that of the core; and wherein the core comprises two areas that are separated by the gap portion, and a single mode optical waveguide, in which a single mode is propagated span crossing these two areas, is formed.

(2) In the planar optical waveguide element according to (1), it is preferable that a first Bragg grating pattern and a second Bragg grating pattern may be respectively formed in areas which are mutually parallel in the light waveguide direction when viewed in a cross-section which is perpendicular to the light waveguide direction; and the first Bragg grating pattern comprises recessed and protruding portions that are formed on both outer side walls of the core of the optical waveguide along the light waveguide direction; and the second Bragg grating pattern comprises recessed and protruding portions that are formed, along the light waveguide direction, on both inner side walls of a groove that is formed on a top portion of the core at the center of the width direction of the core; and, when viewed in the light waveguide direction, for portions of the first Bragg grating pattern where a core width is wide correspond with portions of the second Bragg grating pattern where a groove width is narrow, and for portions of the first Bragg grating pattern where the core width is narrow also correspond with portions of the second Bragg grating pattern where the groove width is wide.

(3) In the planar optical waveguide element according to (1) or (2), the Bragg grating patterns may comprise a plurality of isolated single coordinate points where a coding of a gradient of an envelope curve of an amplitude of a Bragg grating is inverted.

(4) In the planar optical waveguide element according to (1) to (3), that the optical waveguide may comprise a Bragg grating pattern; the Bragg grating pattern only uses discrete values of three or more different pitches; these discrete values are each present in a plurality of locations over an entire length of the optical waveguide; and, if a value which has the highest distribution frequency among all of these discrete values is taken as M, and if a closest value to the M which is larger than the M is taken as A, and if a closest value to the M which is smaller than the M is taken as B, then a difference expressed as A-M is equal to a difference expressed as M-B.

(5) In the planar optical waveguide element according to (1) to (4), the core of the optical waveguide may comprise an inner side core having a projection which forms a rib structure, and an outer side core which is provided on top of the inner side core and covers a circumferential surface of the projection; and a refractive index of the outer side core may be lower than an average refractive index of the inner side core.

(6) Moreover, another aspect of an exemplary embodiment is related to a wavelength dispersion compensation element which comprises the planar optical waveguide element according to (1) to (5), and which comprises a Bragg grating pattern in an optical waveguide; and in which a wavelength dispersion and a dispersion slope in the optical waveguide are compensated by differing a distance over which signal light is propagated in the optical waveguide between entering the optical waveguide and being reflected in accordance with the wavelength, in a plurality of wavelength channels.

(7) Moreover, another aspect of an exemplary embodiment is related to a design method for the wavelength dispersion compensation element according to (6), wherein the optical waveguide comprises a first Bragg grating pattern and a second Bragg grating pattern each formed in areas which are mutually parallel in a light waveguide direction when viewed in a cross-section which is perpendicular to the light waveguide direction; and wherein the design method comprises: an optical waveguide cross-sectional structure design process in which, by changing dimensions, in a cross-section which is perpendicular to the light waveguide direction, of the two areas which form the first Bragg grating pattern and the second Bragg grating pattern, and thus equalizing effective refractive indices of the optical waveguide for two mutually independent polarizations that are guided on the optical waveguide, and by then determining a common effective refractive index for the two polarizations, a relationship between the dimensions of the two areas and the common effective refractive index is obtained; a Bragg grating pattern design process in which, after a predetermined complex reflectance spectrum is calculated by specifying a wavelength dispersion, a dispersion slope, and a reflectance as parameters, a shape distribution of an effective refractive index along the light waveguide direction is obtained for the optical waveguide from the complex reflectance spectrum and a desired optical waveguide length; and a wavelength dispersion compensation element design process in which, by converting the shape distribution of the effective refractive index obtained in the Bragg grating pattern design process into a shape distribution of the dimensions of the two areas based on the relationship between the dimensions of the two areas and the common effective refractive index obtained in the optical waveguide cross-sectional structure design process, the first Bragg grating pattern and the second Bragg grating pattern which are formed by the changes in the dimensions of the two areas are obtained.

(8) In the design method for the wavelength dispersion compensation element according to (7), the Bragg grating pattern design process further comprises a coarse graining process in which a discretized resolution of a coordinate axis is taken as more than an amount of change in a pitch which corresponds to a half value of a width of a reflection band, in other words, more than a maximum value of the amount of change from a center value of the pitch in a chirped Bragg grating; and the optical waveguide is created by the coarse graining process, which includes a plurality of isolated single coordinate points where a coding of a gradient of an envelope curve of an amplitude of a Bragg grating is inverted.

(9) Moreover, another aspect of an exemplary embodiment is related to an optical filter that comprises the planar optical waveguide element described in any one of the above (1) through (5).

(10) Moreover, another aspect of an exemplary embodiment is related to a design method for the optical filter according to (9), wherein the optical waveguide comprises a first Bragg grating pattern and a second Bragg grating pattern which are mutually parallel in the light waveguide direction when viewed in a cross-section which is perpendicular to the light waveguide direction; and wherein the design method comprises: an optical waveguide cross-sectional structure design process in which, by changing dimensions, in a cross-section which is perpendicular to the light waveguide direction, of two areas which form the first Bragg grating pattern and the second Bragg grating pattern, and thus equalizing effective refractive indices of the optical waveguide for two mutually independent polarizations that are guided on the optical waveguide, and by then determining a common effective refractive index for the two polarizations, a relationship between the dimensions of the two areas and the common effective refractive index is established; a Bragg grating pattern design process in which, after a predetermined complex reflectance spectrum is calculated by specifying both a reflectance and a phase as parameters, a shape distribution of an effective refractive index along the waveguide direction of the optical waveguide is obtained from the complex reflectance spectrum and a desired optical waveguide length; and an optical filter design process in which, by converting the shape distribution of the effective refractive index obtained in the Bragg grating pattern design process into a shape distribution of the dimensions of the two areas based on the relationship between the dimensions of the two areas and the common effective refractive index obtained in the optical waveguide cross-sectional structure design process, the two Bragg grating patterns which are formed by the changes in the dimensions of the two areas are obtained.

(11) In the design method for the optical filter according to (10), the Bragg grating pattern design process may comprise a coarse graining process in which a discretized resolution of a coordinate axis is taken as more than an amount of change in a pitch which corresponds to a half value of a width of a reflection band, in other words, more than a maximum value of the amount of change from a center value of the pitch in a chirped Bragg grating; and the optical waveguide is created by the coarse graining process, which includes a plurality of isolated single coordinate points where a coding of a gradient of an envelope curve of an amplitude of a Bragg grating is inverted.

(12) Moreover, another aspect of an exemplary embodiment is related to an optical resonator which comprise a first optical waveguide which forms a first reflection mirror, a second optical waveguide which forms a second reflection mirror, and a third optical waveguide which is sandwiched between the first optical waveguide and the second optical waveguide; wherein the first optical waveguide, the third optical waveguide, and the second optical waveguide are connected in series, so that a single planar optical waveguide is formed, and wherein the first optical waveguide and the second optical waveguide comprises the planar optical waveguide element according to any one of the above (1) through (5).

(13) Moreover, another aspect of an exemplary embodiment is related to a design method for the optical resonator according to (12), wherein the optical waveguide of each of the reflection mirrors comprises a first Bragg grating pattern and a second Bragg grating pattern which are mutually parallel in a light waveguide direction when viewed in a cross-section which is perpendicular to the light waveguide direction; and wherein the design method comprises: an optical waveguide cross-sectional structure design process in which, by changing dimensions, in a cross-section which is perpendicular to the light waveguide direction, of two areas which form the first Bragg grating pattern and the second Bragg grating pattern, and thus equalizing effective refractive indices of the optical waveguide for two mutually independent polarizations that are guided on the optical waveguide, and by then determining a common effective refractive index for the two polarizations, a relationship between the dimensions of the two areas and the common effective refractive index is obtained; a Bragg grating pattern design process in which, after a predetermined complex reflectance spectrum is calculated by specifying both a reflectance and a phase as parameters, a shape distribution of an effective refractive index along the waveguide direction of the optical waveguide is obtained from the complex reflectance spectrum and a desired optical waveguide length; and a reflection mirror design process in which, by converting the shape distribution of the effective refractive index obtained in the Bragg grating pattern design process into a shape distribution of the dimensions of the two areas based on the relationship between the dimensions of the two areas and the common effective refractive index obtained in the optical waveguide cross-sectional structure design process, the two Bragg grating patterns which are formed by the changes in the dimensions of the two areas are obtained.

(14) In the design method for the optical resonator according to (13), the Bragg grating pattern design process may further comprise a coarse graining process in which a discretized resolution of a coordinate axis is taken as more than an amount of change in a pitch which corresponds to a half value of a width of a reflection band, in other words, more than a maximum value of the amount of change from a center value of the pitch in a chirped Bragg grating; and an optical waveguide is created by the coarse graining process, which includes a plurality of isolated single coordinate points where a coding of a gradient of an envelope curve of an amplitude of a Bragg grating is inverted.

Effects of the Invention

According to the exemplary aspect described in (1) above, because the mode field diameter of the fundamental mode expands, it is possible to inhibit the effects (i.e., scattering loss) on the optical characteristics from roughness of the core-side walls which are formed from a high refractive index material, in which the roughness is unavoidably generated in the manufacturing process.

According to the exemplary aspect described in (2) above, a planar optical waveguide element having a Bragg grating pattern can reduce the polarization dependence of the optical characteristics.

According to the exemplary aspect described in (3) above, it is possible to make the waveguide length shorter than a sampled grating.

According to the exemplary aspect described in (4) above, compared to a related art chirped grating in which the pitch changes gradually, tolerance control in the manufacturing process is easier and this contributes to an improvement in the manufacturing yield.

According to the exemplary aspect described in (5) above, compared to a related art embedded type of optical waveguide with high relative refractive index difference which is only formed from two portions, namely, a cladding and a core formed from a high refractive index material, because the confinement of light in an inner side core which is formed from a high refractive index material is weaker, it is possible to inhibit the effects (i.e., scattering loss) on the optical characteristics from roughness of the inner-side of core-side walls, in which the roughness is unavoidably generated in the manufacturing process.

According to the exemplary aspect described in (6) above, it is possible to achieve a wavelength dispersion compensation element having little variation in the optical characteristics.

According to the exemplary aspect described in (7) above, it is possible to easily achieve the designing of a wavelength dispersion compensation element having two types of Bragg grating pattern.

According to the exemplary aspect described in (8) above, it is possible to design a wavelength dispersion compensation element which is miniaturized even further.

According to the exemplary aspect described in (9) above, it is possible to achieve an optical filter having little variation in the optical characteristics.

According to the exemplary aspect described in (10) above, it is possible to easily achieve the designing of an optical filter having two types of Bragg grating pattern.

According to the exemplary aspect described in (11) above, it is possible to design an optical filter which is miniaturized even further.

According to the exemplary aspect described in (12) above, it is possible to achieve an optical resonator having little variation in the optical characteristics.

According to the exemplary aspect described in (13) above, it is possible to easily achieve the designing of an optical resonator having two types of Bragg grating pattern.

According to the exemplary aspect described in (14) above, it is possible to design an optical resonator which is miniaturized even further.

Figure 1A:
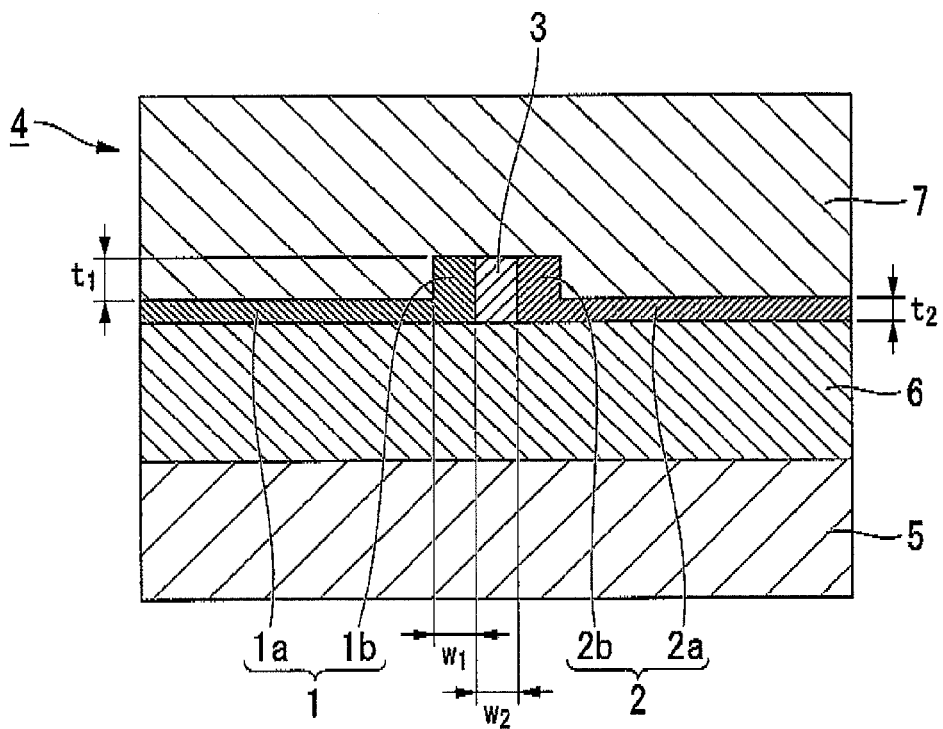
FIG. 1A is a cross-sectional view showing a first exemplary embodiment of a planar optical waveguide element.

DESCRIPTION OF THE REFERENCE NUMERALS 1, 1A . . . First core region
2, 2A . . . Second core region
3, 3A . . . Gap portion (Center gap)
4, 4A . . . Planar optical waveguide element
5, 5A . . . Substrate
6, 6A . . . Bottom cladding
7, 7A . . . Top cladding
10 . . . Core
12 . . . Side wall
12$a$ . . . Recessed portion (Narrow portion of core width)
12$b$ . . . Protruding portion (Wide portion of core width)
13 . . . Groove
13$a$ . . . Recessed portion (Wide portion of groove width)
13$b$ . . . Protruding portion (Narrow portion of groove width)
15 . . . Projection
15$a$ . . . Recessed portion (Narrow portion of projection width)
15$b$ . . . Protruding portion (Wide portion of projection width)
20, 30 . . . Planar optical waveguide element
21, 31 . . . First rib of inner side core
22, 32 . . . Second rib of inner side core
23 . . . Center gap
24, 34 . . . Outer side core
25, 35 . . . Substrate
26, 36 . . . Bottom cladding
27, 37 . . . Top cladding
101 . . . Wavelength dispersion compensation element
102 . . . Optical circulator
150 . . . Optical resonator
151 . . . First optical waveguide (Reflection mirror)
152 . . . Second optical waveguide (Reflection mirror)
153 . . . Third optical waveguide

BEST MODES FOR CARRYING OUT THE INVENTION

Hereinafter, exemplary embodiments will be described with reference to the figures.

First Exemplary Embodiment of a Planar Optical Waveguide Element

Figure 1B:
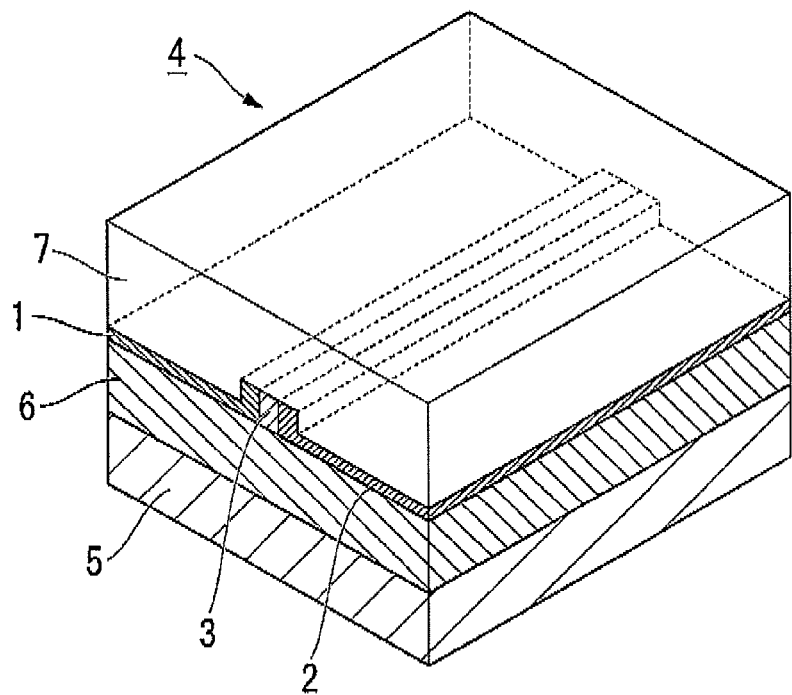
FIG. 1B is a partial perspective view showing the planar optical waveguide element of FIG. 1A.

FIG. 1A and FIG. 1B typically show a first exemplary embodiment of a planar (substrate type) optical waveguide element. FIG. 1A is a cross-sectional view, and FIG. 1B is a partial perspective view.

The planar optical waveguide element 4 forms a single mode optical waveguide, and the optical waveguide is formed on a substrate 5. The planar optical waveguide element includes a gap portion 3 which is provided in the center of a width direction of the cores 1 and 2 of the optical waveguide. The gap portion 3 is formed from a material having a lower refractive index than that of cores 1 and 2, and extends in the light waveguide direction. The cores 1 and 2 are separated by the gap portion 3, and a single mode optical guided wave is propagated so as to span across (straddle) the cores 1 and 2. Specifically, the optical waveguide is formed by a bottom cladding 6 which is formed on the substrate 5, the cores 1 and 2 that are formed by two L-shaped areas which are formed on the bottom cladding 6, the gap portion 3 which is inserted in the center of the cores 1 and 2, and top cladding 7 that is formed on the cores 1 and 2 and on the gap portion 3. The optical waveguide of the present embodiment is not limited to being a linear waveguide, and may also be a curved waveguide.

In this example, the cores 1 and 2 are formed by two areas of a first rib 1 and a second rib 2. The first rib 1 and second rib 2 are formed from a material having a higher refractive index than that of the gap portion 3. The first rib 1 and second rib 2 are the same height, and this height is indicated by $t_2$ in FIG. 1A.

The first rib 1 and second rib 2 have an identical shape, and a protruding portion is formed by the mutually abutting portions of each one. Specifically, the first rib 1 and second rib 2 include planar portions 1a and 2a, and rectangular parallelepiped portions 1b and 2b which have a height $t_1$ and which are positioned on edges of the planar portions 1a and 2a. The rectangular parallelepiped portions 1b and 2b form protruding portions having a width $w_1$. The material used to form the rectangular parallelepiped portions 1b and 2b is the same as the material used to form the planar portions 1a and 2a. The width of the gap portion 3 is $w_2$, and the gap portion 3 is formed from a material having a lower refractive index than that of the first rib 1 and second rib 2.

Examples of the material used to form the first rib 1 and second rib 2 include high refractive index materials such as silicon (Si) and the like. Examples of the material used to form the gap portion 3 include silica ($SiO_2$), silicon oxynitride ($SiO_xN_y$), silicon nitride ($Si_xN_y$), and the like. Materials in which the composition ratio x:y is controlled such that, for example, in $SiO_xN_y$ the refractive index is 1.5, or in $Si_xN_y$ the refractive index is 2.0, may be used. However, other composition ratios may also be used provided that they have a lower refractive index than that of the Si of the ribs 1 and 2 which have high refractive index.

P-conductivity or N-conductivity may be imparted to the first rib 1 or the second rib 2 by doping the medium with suitable impurities. Namely, the first rib 1 may be set as a P-type area, and the second rib 2 may be set as an N-type area. Conversely, the first rib 1 may be set as an N-type area, and the second rib 2 may be set as a P-type area.

The impurities (i.e., dopants) that impart conductivity to the high refractive index core which is formed by a semiconductor can be appropriately selected in accordance with the maternal medium (base medium). For example, if the maternal medium is a group-IV semiconductor such as silicon, then a group-III element such as boron (B) can be used as a dopant to impart P-type polarity, and a group-V element such as phosphorus (P) or arsenic (As) can be used as a dopant to impart N-type polarity.

In this manner, a P-I-N bond is formed in a plane of the core, by making the first rib 1 and second rib 2 of the core high refractive index ribs which are formed from a semiconductor such as Si or the like, and by making one of these ribs a P-type and the other one a N-type. In addition, by providing an electrode pad that imparts voltage to both the first rib 1 and the second rib 2, and generating an electric potential difference between the two ribs 1 and 2, it is possible to induce a change in the refractive index which is caused by changes in the carrier density, and to thereby make it possible to vary the optical characteristics of the electrode element.

Note that the imparting of conductivities of opposite polarities (i.e., P-type or N-type) to the first rib 1 and the second rib 2, and also the provision of the electrode pad to impart voltage are not essential structure in the present embodiment, and it is also possible to use the cores 1 and 2 without imparting any external voltage thereto.

The above-described cores 1 and 2 and the gap portion 3 are located on the bottom cladding 6 which is formed as a film on the substrate 5. The top of the core is covered by the top cladding 7. The top cladding 7 and the bottom cladding 6 are formed from a material having a lower refractive index than that of the core. Both the materials used to form the top cladding 7 and the bottom cladding 6 are not particularly restricted. Specific examples thereof include Si for the material of the substrate 5, and SiO2 for the materials of the top cladding 7 and bottom cladding 6. However, the present embodiment is not particularly limited to these materials. The top cladding 7 and the bottom cladding 6 have a suitable thickness to correspond to the thickness of the core.

According to the planar optical waveguide element of the present embodiment, because the mode field diameter of the fundamental mode expands in a core which is formed from a high refractive index material, it is possible to inhibit the effects (i.e., scattering loss) on the optical characteristics from roughness of the core-side walls which is unavoidably generated in the manufacturing process.

Second Exemplary Embodiment of a Planar Optical Waveguide Element

Figure 2:
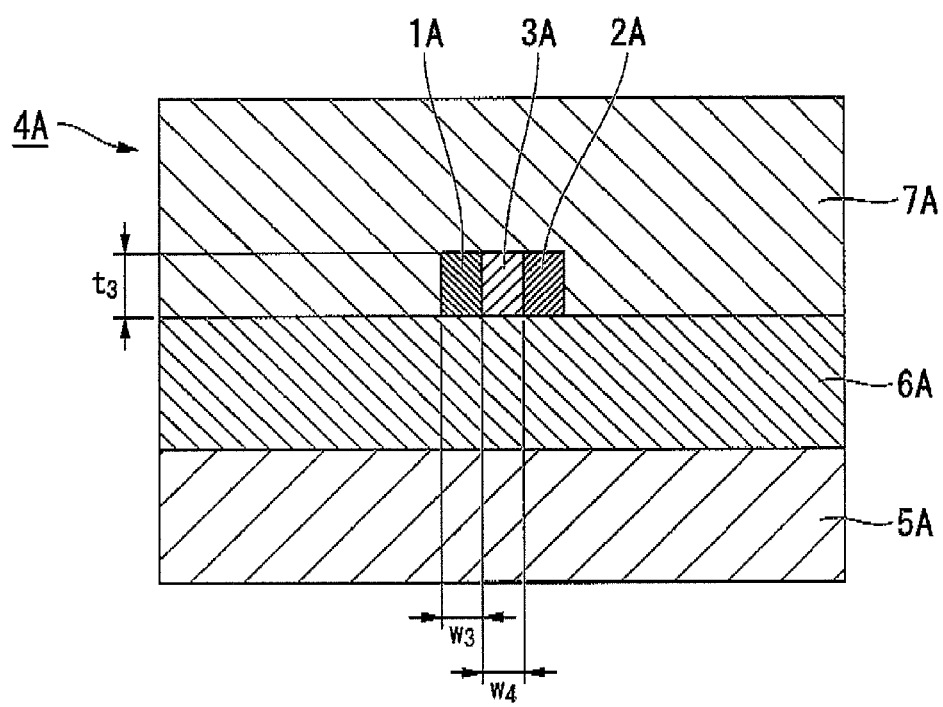
FIG. 2 is a cross-sectional view showing a second exemplary embodiment of a planar optical waveguide element.

FIG. 2 typically shows a cross-sectional view of a second embodiment of the planar optical waveguide element 4A of the present invention. This planar optical waveguide element is constructed in the same way as the first embodiment shown in FIG. 1A in FIG. 1B except for the fact that the core of the optical waveguide is not a rib structure (i.e., an L-shaped structure), but is a rectangular waveguide having a rectangular cross-section.

Specifically, the first and second areas 1A and 2A of the core have rectangular cross-sections each having a height of $t_3$ and a width of $w_3$. The first and second areas 1A and 2A are formed from a material having a higher refractive index than that of the gap portion 3A. The heights of the first and second areas 1A and 2A and the height of the gap portion 3A are the same, and the heights are indicated in FIG. 2 by $t_3$. The width of the gap portion 3A is $w_4$, and the gap portion 3A is formed from a material having a lower refractive index than that of the first and second areas 1A and 2A.

According to the planar optical waveguide element of the present embodiment, because the mode field diameter of the fundamental mode expands in a core which is formed from a high refractive index material, it is possible to inhibit the effects (i.e., scattering loss) on the optical characteristics from roughness of the core-side walls which is unavoidably generated in the manufacturing process.

[Example of a Grating Structure]

In the planar optical waveguide elements in the above described embodiments, it is possible to provide a grating structure based on cyclical variations in the core shape and dimension. If a grating structure is provided, as is described below, an outer side core may be provided on top of the ribs 1 and 2 and the gap portion 3, and a Bragg grating pattern may be provided on the side wall or top portion of this outer side core. An example of the method used to design the Bragg grating pattern involves specifying three factors, namely, wavelength dispersion, wavelength slope, and reflectance as parameters, and then calculating a predetermined complex reflectance spectrum. Next, a shape distribution of the effective refractive index which extends in (along) the waveguide direction of an optical waveguide having a Bragg grating is obtained from this complex reflectance spectrum and the desired optical waveguide length.

Bragg grating patterns may be provided on both the side wall and top portion of the outer side core, as this makes it possible to reduce the polarization dependence of the optical characteristics by these two Bragg grating patterns. Therefore, hereinafter, exemplary embodiments and design methods of a planar optical waveguide element having two Bragg grating patterns on the optical waveguide will be described.

Figure 3A:
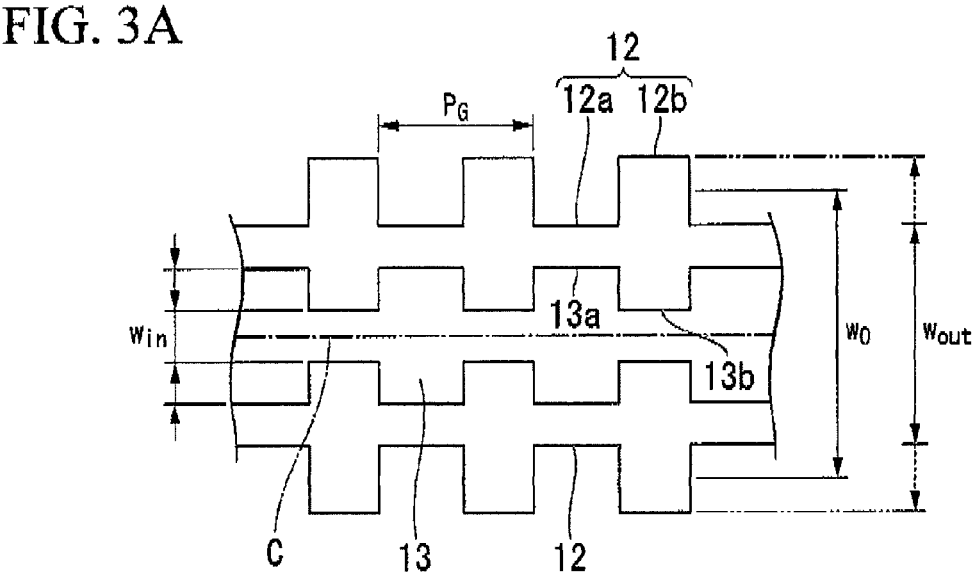
FIG. 3A is a partial plan view showing a grating structure in a planar optical waveguide element.
Figure 3B:
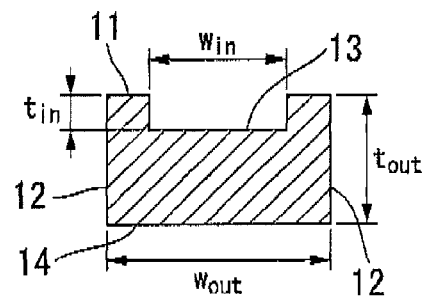
FIG. 3B is a cross-sectional view of the grating structure of FIG. 3A.
Figure 3C:
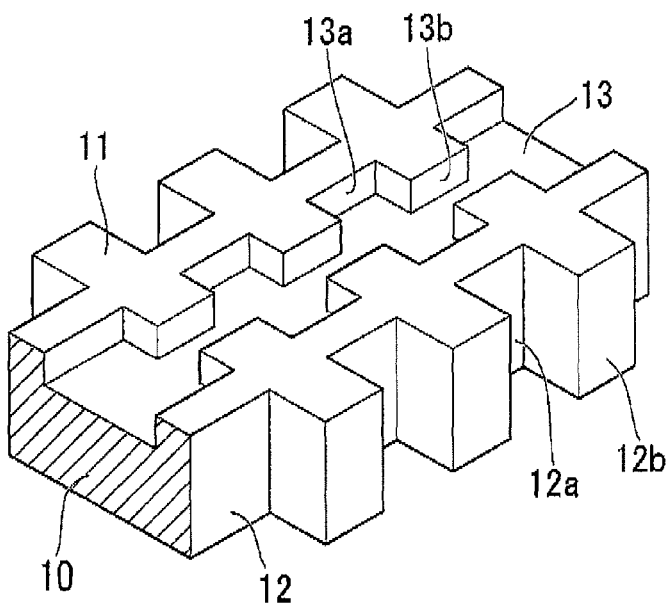
FIG. 3C is a partial perspective view of the grating structure of FIG. 3A.

An example of a grating structure in the planar optical waveguide element of the present invention is shown in FIG. 3A through FIG. 3C. If the width or thickness of the waveguide in the light propagation direction is changed cyclically in an optical waveguide, then the effective refractive index of the optical waveguide also changes cyclically, and a Bragg grating can be constructed. In FIG. 3A through FIG. 3C, only the core 10 is shown and the claddings are not shown, however, it is to be assumed that cladding surrounds the periphery of the core 10. In addition, a substrate (not shown) is located below the cladding, and a bottom surface 14 of the core 10 is parallel with the substrate surface. The term "horizontal direction" refers to a direction which is parallel to this substrate surface, and the term "vertical direction" refers to a direction which is perpendicular to the substrate surface. If this grating structure is applied to a planar optical waveguide element of an exemplary embodiment, then it may be applied with this core 10 being used as an outer side core.

FIG. 3A is a plan view of a portion of the core 10. The symbol C represents a single center axis within a horizontal plane of the optical waveguide core 10, and light is propagated along this center axis C within the optical waveguide. This optical waveguide has a Bragg grating pattern (described below in detail), and at least one reflection band is evident in the spectrum of this optical waveguide. A center wavelength $\lambda_0$ of this reflection band is determined by $\lambda_0 = 2\, p_G/n_{\text{eff}}$ when the cycle of the Bragg grating is taken as $p_G$, and the effective refractive index of the optical waveguide is taken as $n_{\text{eff}}$. Here, the effective refractive index $n_{\text{eff}}$ is the value when the width of the core 10 of the optical waveguide is taken as an average width $w_0$.

The average width $w_0$ of the core 10 is equivalent to the average value in one cycle of the horizontal width $w_{out}$ of the core 10, and is a constant value (same value) along the center axis C over the entire optical waveguide. Recessed portions 12a and protruding portions 12b are formed alternatingly in a side wall 12 of the core 10, and the horizontal width $w_{out}$ oscillates alternatingly for each cycle $p_G$ so as to form a first Bragg grating pattern. This Bragg grating pattern is regarded as one in which the width (namely, the horizontal width $w_{out}$) in the horizontal direction of an optical wave guide having a rectangular cross-section (see FIG. 3B) changes alternatingly.

Intrinsic waveguide modes exist respectively for both when an electric field of linearly polarized light extends principally in a horizontal direction (referred to below as TE-type polarization), and when it extends principally in a vertical direction (referred to below as TM-type polarization) in an optical waveguide having a rectangular cross-section. In addition, polarization dependence also exists in which intrinsic effective refractive indices are present in each waveguide mode.

An effective refractive index $n_{\text{eff}}^{TE}$ of the intrinsic mode in TE-type polarization changes more responsively in response to changes in the width of the optical waveguide compared to an effective refractive index $n_{\text{eff}}^{TM}$ of the intrinsic mode in TM-type polarization. In contrast, the effective refractive index $n_{\text{eff}}^{TM}$ of the intrinsic mode in TM-type polarization changes more responsively in response to changes in the height (namely, the thickness) of the optical waveguide compared to the effective refractive index $n_{\text{eff}}^{TE}$ of the intrinsic mode in TE-type polarization.

Accordingly, as is shown in FIG. 1A and FIG. 1B, if no Bragg grating pattern is provided in the gap portion 3 of the optical waveguide core 1, and the recessed portions and protruding portions 2a and 2b are provided in the side wall 2 so that only the width of the core 1 is changed cyclically, then there is a considerable increase in polarization dependence. Accordingly, in order to reduce the polarization dependence of the Bragg grating, not only is the width of the optical waveguide cyclically changed, but also the height of the optical waveguide is cyclically changed.

Because of this, in this planar optical waveguide element, two Bragg grating patterns are positioned in mutually different areas on a cross-section that is perpendicular to the light waveguide direction.

In addition, two Bragg grating patterns are formed in areas that both extend in parallel with the light waveguide direction. Namely, the ranges in which the respective Bragg grating patterns are located extending in the direction of the center axis C are the same.

As a result, by combining a first Bragg grating pattern with a second Bragg grating pattern, the effect thereof on TE-type polarization and the effect thereof on TM-type polarization are made equal, and polarization dependence can be reduced.

If the application of this to a rectangular optical waveguide (i.e., an optical waveguide having a substantially rectangular cross-section) is considered, then the first Bragg grating pattern may be provided on either one or both side walls of the core, and the second Bragg grating pattern may be provided on at least one of the top surface and bottom surface (on the top surface and/or the bottom surface) of the core. In the present embodiment, in order to simplify the formation of the core on a substrate, the first Bragg grating pattern is provided on both side walls of the core, and the second Bragg grating pattern is provided on the top surface of the core. The shape of the core 10 is symmetrical (i.e., symmetrical above and below the center axis C in FIG. 3A) in a horizontal direction relative to a plane that extends in the vertical direction and includes the center axis C.

In order to form an optical waveguide having a Bragg grating on a substrate, the following manufacturing process is followed.

Firstly, a material used to form the bottom cladding is formed (coated) on one surface of the substrate as a film. Next, a material used to form the core is formed on the bottom cladding as a film, and this film is then processed into the shape of the Bragg grating. Thereafter, a material used to form the top cladding is formed on the bottom cladding and the core as a film, so that when viewed in cross-section, the core is enclosed by a bottom cladding and a top cladding.

As is described below, the amplitude and cycle of cyclical variations in the Bragg grating become non-uniform in order to provide wavelength dispersion compensation in a plurality of wavelength channels. Accordingly, a forming process may be performed on the core to form it into a shape that is able to deal with this type of non-uniform cyclical variations. Forming process of the core in the width is achieved by etching and lithography (drawing) using an optical mask that contains a grating pattern (i.e., a cyclical variation of the horizontal width $w_{out}$) that provides wavelength dispersion compensation for a plurality of channels.

In contrast, it is difficult for the depth of etching which is intended to form the height of the core to be changed in accordance with the Bragg grating pattern. Namely, it is necessary to achieve a cyclic variation in etching depth in order to form a grating pattern (i.e., a cyclical variation in the core height) on the top portion of the core by etching. However, if depth variations in etching within a horizontal plane extending along the substrate surface which are non-uniform and non-controllable are disregarded, then etching depths are substantially uniform (same) under the same conditions. Accordingly, it is difficult to forming process the height of a core in accordance with a Bragg grating pattern.

FIG. 3B shows a cross-section of a core in a plane that intersects the center axis C. In the core 10 of the present embodiment, instead of changing the height of the core, as is shown in FIGS. 3A through 3C, the width $w_{in}$ of a groove 13 provided in a top portion of the core is cyclically changed. The core height is $t_{out}$, and the depth of the grooves is $t_{in}$. As is shown in FIG. 3A, the groove 13 extends in a direction along the center axis C, and coordinates in the horizontal direction of the center point of the width $w_{in}$ of the groove 13 are positioned on the center axis C.

As a result of this, it is possible to make changes to the effective refractive index that are the equivalent of cyclically changing the height of the core 10. Recessed portions 13a and protruding portions 13b are formed alternatingly in side walls of the groove 13, and the groove width $w_{in}$ oscillates alternatingly each one cycle $p_G$ so as to form a second Bragg grating pattern. Because the depth $t_{in}$ is uniform within the groove 13, it is possible to achieve a groove 13 having a cyclic variation in the width $w_{in}$ by using etching and lithography using an optical mask.

According to this type of method, by performing forming process on the width $w_{in}$ of a groove provided in a top portion of the core in the same way as the core width $w_{out}$, it is possible to construct an optical waveguide having a Bragg grating in both a width direction and height direction. Accordingly, it is possible to reduce polarization dependence by matching changes in the effective refractive index which are generated by the first Bragg grating pattern in the width direction with changes in the effective refractive index which are generated by the second Bragg grating pattern in the height direction.

In the structure shown in FIGS. 3A through 3C, in the light waveguide direction, the wide portions (i.e., the protruding portions 12b) of the core width $w_{out}$ of the sidewalls 12 correspond to the narrow portions (i.e., the protruding portions 13b) of the groove width $w_{in}$ of the inner side walls of the grooves 13, and the narrow portions (i.e., the recessed portions 12a) of the core width $w_{out}$ of the sidewalls 12 correspond to the wide portions (i.e., the recessed portions 13a) of the groove width $w_{in}$ of the inner side walls of the groove 13. In this manner, the protrusions and recessed portions of the first Bragg grating pattern are synchronized with the protrusions and recessed portions of the second Bragg grating pattern, so that the pitches (local cycle) $p_G$ of each one coincide (same). Employing this simplifies the designing of the optical waveguide dimensions.

Figure 4A:
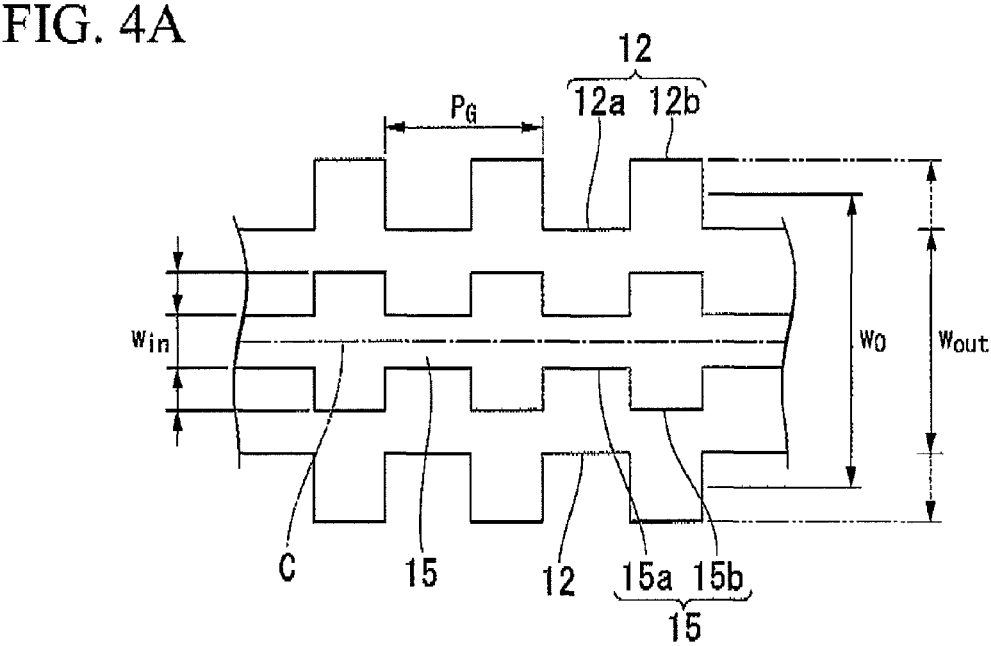
FIG. 4A is a partial plan view showing another example of a grating structure in a planar optical waveguide element.
Figure 4B:
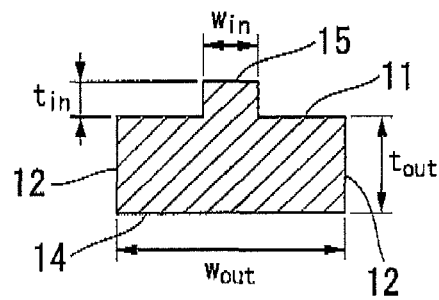
FIG. 4B is a cross-sectional view of the grating structure of FIG. 4A.
Figure 4C:
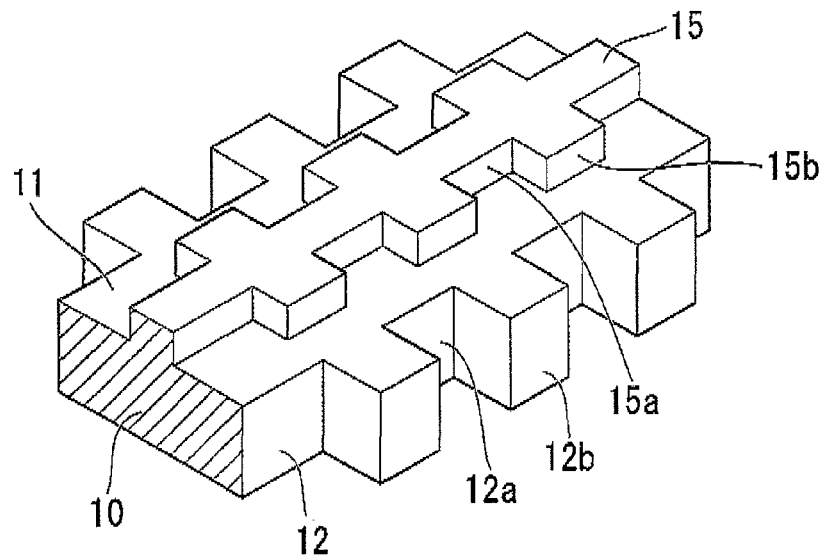
FIG. 4C is a partial perspective view of the grating structure of FIG. 4A.

In order to generate changes that are equivalent to changes in the height of the core, it is also possible to provide projections (ridges) 15, as is shown in FIGS. 4A through 4C, instead of the grooves 13 as the structure which is provided on the top portion of the core. The grooves 13 may be used from the standpoint of ease of controlling the effective refractive index, however, if restrictions on materials or processing conditions or the like exist, then it is also possible to select the projections 15. The projections 15 can be constructed by forming another layer of film from the same material which is used to form the core, and then forming cyclical variations in the width direction using optical lithography and etching.

In the structure shown in FIGS. 4A through 4C, in the optical waveguide direction, the wide portions (i.e., the protruding portions 12b) of the core width $w_{out}$ of the side wall 12 correspond with the wide portions (i.e., the protruding portions 15b) of the width $w_{in}$ of the projections 15, and the narrow portions (i.e., the recessed portions 12a) of the core width $w_{out}$ of the sidewalls 12 correspond with the narrow portions (i.e., the recessed portions 15a) of the width $w_{in}$ of the projections 15. In this manner, the cycle of the protrusions and recessed portions of the first Bragg grating pattern are synchronized with the cycle of the protrusions and recessed portions of the second Bragg grating pattern, so that the pitches $p_G$ of each coincide. Employing this simplifies the designing of the optical waveguide dimensions.

At least one of the grooves 13 and projections 15 (the grooves 13 and/or the projections 15) are preferably formed in the center in the width direction of the core 10 and on the top portion in the vertical direction thereof. In this case, the coordinates in the horizontal direction of the center point of the width $w_{in}$ of the grooves 13 and/or projections 15 are located on the center axis C of the core 10. Moreover, it is also possible to form the second Bragg grating pattern by combining groove-shaped structural elements with projection shaped structural elements.

The grooves 13 and projections 15 shown in FIGS. 3A through 3C and FIGS. 4A through 4C are connected in the light waveguide direction, however, it is also possible to provide a cyclical change in the core height direction by forming at least one of recessed portions and protruding portions in each pitch. The grooves 13 and projections 15 that are formed on the top surface 11 of the core 10 are formed in a portion of the center in the width direction of the core 10, but it is also possible for the thickness of the core 10 itself to be changed.

Among these structures, from the standpoint of the manufacturing process a cyclical change in the height direction of the core may be provided using changes in the width direction of the structural elements on the top portion of the core. In particular, as is shown in FIGS. 3A through 3C and FIGS. 4A through 4C, the second Bragg grating pattern may be formed by at least one of the projection shaped structures 15 and the groove-shaped structures 13 which are formed in the center in the width direction of the core 10 and on the top portion in the vertical direction thereof. The groove-shaped structures 13 can be obtained simply by forming a single layer of film of the material used to form the core.

Third Exemplary Embodiment of a Planar Optical Waveguide Element

Figure 5:
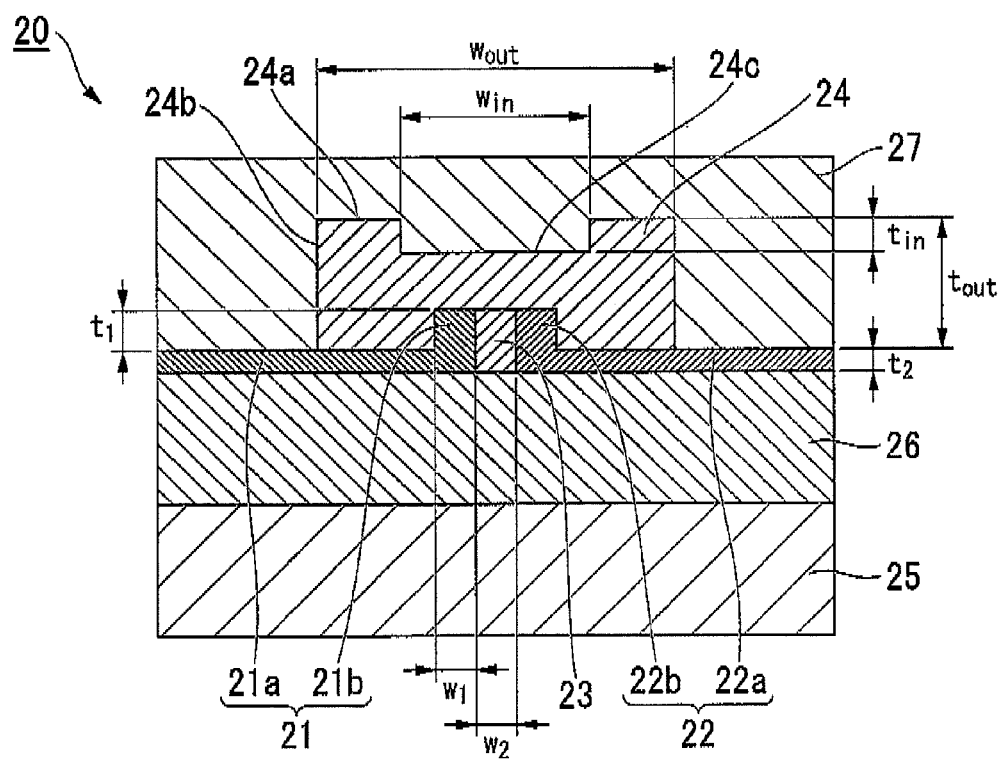
FIG. 5 is a cross-sectional view showing a third exemplary embodiment of a planar optical waveguide element.

An optical wave guide having a cross-sectional structure such as that shown in FIG. 5 can be given as an example of a Bragg grating optical waveguide structure in which polarization dependence has been reduced. On account of the simplified description of the principle of reducing polarization dependence, the cross-sectional structures of the cores 10 are all the same in the planar optical waveguide elements shown in FIGS. 3A through 3C and FIGS. 4A through 4C. However, if the effective refractive index is changed by changing the dimensions of the optical waveguide, then an optical waveguide having a composite core structure such as that shown in FIG. 5 may improve the accuracy of the effective refractive index.

The core of the planar optical waveguide element 20 having the cross-sectional structure shown in FIG. 5 is a composite core formed by two areas, namely, inner side cores 21 and 22 and an outer side core 24.

In this example, the inner side core is formed by two areas, namely, a first rib 21 and a second rib 22, and a center gap 23 is provided between these two ribs. The first rib 21 and second rib 22 are formed from a material having a higher refractive index than that of the outer side core 24. It is not necessary for the center gap 23 to be formed from a material having a higher refractive index than that of the outer side core 24. The heights of the first and second ribs 21 and 22 and the height of the center gap 23 are equal, and the heights are indicated by t2 in FIG. 5. If the center gap is inserted between the first rib 21 and second rib 22, then it is possible to increase the cross-sectional area of the region in which light is confined in the inner side core, while maintaining the condition in which only a single mode is present in a single polarization state. Moreover, because it is possible to reduce the accuracy deterioration of the effective refractive index which is due to machining errors of the Bragg grating which is formed on the outer side core 24 (described below), this example is also effective in reducing the polarization dependence of the effective refractive index.

The first rib 21 and second rib 22 have the same shape, and a protruding portion is formed by the mutually abutting portions of each one. Specifically, the first rib 21 and second rib 22 are formed by planar portions 21a and 22a which have a thickness of t2, and by rectangular parallelepiped portions 21b and 22b which have a height t1 and a width w1 and which are positioned on edges of the planar portions 21a and 22a. The material used to form the rectangular parallelepiped portions 21b and 22b is the same as the material used to form the planar portions 21a and 22a. The width of the center gap 23 is w2, and the center gap 23 is formed from a material having a lower refractive index than that of the first rib 21 and second rib 22.

Examples of $t_1$, $t_2$, $w_1$, and $w_2$ are: $t_1=250$ nm, $t_2=50$ nm, $w_1=280$ nm, and $w_2=160$ nm. However, exemplary embodiments are not limited to these dimensions.

One example is a combination in which the first rib 21 and second rib 22 are formed from silicon (Si), and the center gap 23 is formed from silica ($SiO_2$). Instead of forming the center gap 23 from silica (i.e., silicon oxide), it may also be formed from silicon oxynitride ($SiO_xN_y$) or silicon nitride ($Si_xN_y$). Materials in which the composition ratio x:y is controlled such that, for example, in $SiO_xN_y$ the refractive index is 1.5, and in $Si_xN_y$ the refractive index is 2.0 may be used. However, other composition ratios may also be used provided that they have a lower refractive index than that of the Si of the high refractive index ribs 21 and 22.

P-conductivity or N-conductivity may be imparted to the first rib 21 or the second rib 22 by doping the medium with suitable impurities. Namely, the first rib 21 may be set as a P-type area, while the second rib 22 may be set as an N-type area. Conversely, the first rib 21 may be set as an N-type area, and the second rib 22 may be set as a P-type area.

The impurities (i.e., dopants) that impart conductivity to the high refractive index core which is formed by a semiconductor can be appropriately selected in accordance with the maternal medium. For example, if the maternal medium is a group-IV semiconductor such as silicon, then a group-III element such as boron (B) can be used as a dopant to impart P-type polarity, and a group-V element such as phosphorus (P) or arsenic (As) can be used as a dopant to impart N-type polarity.

In this manner, by making the first rib 21 and second rib 22 of the core high refractive index ribs which are formed from a semiconductor such as Si or the like, and by making one of these ribs a P-type and the other one a N-type and mutually separating these by the center gap 23 which is formed from an insulating material, a P-I-N bond is formed within a plane represented by the thickness t2 of the inner side cores 21 and 22. In addition, by providing an electrode pad that imparts voltage to both the first rib 21 and the second rib 22, and thereby generating an electric potential difference between the two ribs 21 and 22, it is possible to induce a change in the refractive index which is caused by changes in the carrier density, and to thereby make it possible to vary the optical characteristics of an electrode element. Moreover, by providing the center gap 23 which is formed from an insulating material between the two ribs 21 and 22 that make up P-type and N-type areas, the effect is obtained that it is possible to prevent leakage current between the P-type areas and the N-type areas, and it is also possible to considerably reduce the current consumption. Specifically, when voltage of several V was applied between the two ribs in a structure in which there was no center gap, a sub-milliamp (sub-mA) current flowed between the P-type and N-type areas. In contrast to this, when a center gap was provided, even when 30 to 40 V of voltage was applied, the leakage current between the P-type and N-type areas are only a sub-nanoamp (sub-nA) range.

Note that the imparting of conductivities of opposite polarities (i.e., P-type or N-type) to the first rib 21 and the second rib 22, and also the provision of the electrode pad to impart voltage are not essential structure in the present embodiment, and it is also possible to use the inner side cores 21 and 22 without imparting any external voltage thereto.

The outer side core 24 is placed on top of the inner side cores 21 and 22. The refractive index of the outer side core 24 is lower than the average refractive index of the inner side cores 21 and 22. Examples of the material used for the outer side core 24 include $Si_xN_y$, but other materials may also be used. Although omitted from FIG. 5, the same first and second Bragg grating patterns as those formed on the core 10 shown in FIGS. 3A through 3C are formed on a top surface 24a and side walls 24b of the outer side core 24.

Specifically, there are provided a first Bragg grating pattern in which the width $w_{out}$ of the outer side core 24 is changed cyclically, and a second Bragg grating pattern in which the width $w_{in}$ of a groove (trench) 24c which is formed on the top surface 24a of the outer side core 24 is changed cyclically. The thickness of the outer side core 24 is $t_{out}$, and the depth of the groove 24c is $t_{in}$.

Examples of $t_{out}$ and $t_{in}$ are: $t_{out}$=600 nm, and $t_{in}$=100 nm, however, the present embodiment is not particularly limited to these dimensions. $w_{in}$ and $w_{out}$ change cyclically.

Note that, in the example shown in FIG. 5, the Bragg grating pattern on the top surface 24a is formed by the groove 24c. However, as is described above it is also possible to employ the projections 15 (see FIGS. 4A through 4C).

The above described composite core is located on the bottom cladding 26 which is formed as a film on the substrate 25. The top portion and side walls of the composite core are covered by the top cladding 27. The top cladding 27 and bottom cladding 26 are formed from a material having a lower refractive index than the average refractive index of the composite core. The same material or different materials may be used for the top cladding 27 and the bottom cladding 26. Specific examples thereof include using Si for the material of the substrate 25, and using $SiO_2$ as the material for the top cladding 27 and bottom cladding 26, however, the present embodiment is not particularly limited to this. The top cladding 27 and bottom cladding 26 may have a suitable thickness to correspond to the thickness of the composite core. For example, if the dimensions of the composite core are as described above, then the thickness of the bottom cladding 26 is approximately 2000 nm, while the maximum thickness of the top cladding 27 (i.e., the thickness of the planar portions 21a and 22a) is approximately 2000 nm.

If the average refractive index (i.e., the overall average refractive index obtained from the two ribs and the center gap combined) of the inner side core is higher than the average refractive index of the outer side core 24, then when light is wave-guided to the composite core, because a greater electric field is present within the inner side core, the proportion of the effective refractive index that is changed by $w_{out}$ and $w_{in}$ is reduced compared with when the core is uniform. Accordingly, even if there are errors in the machining dimensions of the Bragg grating pattern formed on the outer side core, any effects of this on the effective refractive index are minimal. Accordingly, it is possible to increase the accuracy of the effective refractive index. In microfabrication on a flat substrate, errors of approximately 10 nm are generally considered. According to a composite core such as that shown in FIG. 5, it is possible to hold the effects on errors in the effective refractive index which are due to the machining accuracy to less than 80 ppm of the average value of the effective refractive index. Note that this term "average value of the effective refractive index" indicates the effective refractive index of the optical waveguide at the average width $w_0$, as is shown in FIG. 3A.

Example 1 of a Wavelength Dispersion Compensation Element

Next, a description will be given of a procedure introduced for the first time by the present exemplary embodiment for the design of a Bragg grating optical waveguide having reduced polarization dependence. The respective steps given below provide an itemized outline of the design flow of this procedure.

[1] The dimensions of the cross-sectional structure of an optical waveguide having reduced polarization dependence are specified, and the field distribution of the intrinsic mode of the TE-type polarization and TM-type polarization in the cross-section are calculated. The effective refractive index is calculated from the field distribution of each intrinsic mode, and correspondence relationships between these effective refractive indices and the optical waveguide dimensions which are used to determine the cross-sectional structure are obtained from the effective refractive indices.

[2] The desired wavelength dispersion characteristics and reflection characteristics are specified, and the necessary data required for determine the structure of the optical waveguide is prepared.

[3] The optical waveguide length is provided, and the shape distribution (profile) of the effective refractive index in a direction extending along the center axis C of the optical waveguide is calculated from the wavelength dispersion characteristics and reflection characteristics of the above described [2] using an inverse scattering problems solution method.

[4] Based on the correspondence relationships between the effective refractive indices and the optical waveguide dimensions obtained in the above described [1], the shape (i.e., the profile of the optical waveguide dimensions in a direction extending along the center axis C of the optical waveguide) of the Bragg grating optical waveguide is decided from the shape distribution of the effective refractive index obtained in [3].

The step [1] through [4] will now be described.

Note that because step [1] only needs to be completed before step [4], it is of course possible for the steps to be performed in the sequence [1]→[2]→[3]→[4], or [2]→[3]→[1]→[4], or [2]→[1]→[3]→[4], or for [1], [2], and [3] to each be performed in parallel.

Namely, this design method includes an optical waveguide cross-sectional structure design process (a) which comprises step [1], a Bragg grating pattern design process (b) which comprises steps [2] and [3], and a wavelength dispersion compensation element design process which comprises step [4], and the sequence in which process (a) and process (b) are performed is not restricted.

Here, in an optical waveguide structure having the composite core shown in FIG. 5, calculations were made when the first and second ribs 21 and 22 were formed from Si, the center gap 23 was formed from $SiO_2$, the outer side core 24 was formed from $Si_xN_y$, the substrate 25 was formed from Si, the bottom cladding 26 was formed from $SiO_2$, and the top cladding 27 was formed from $SiO_2$, and $t_1$=250 nm, $t_2$=50 nm, $w_1$=280 nm, $w_2$=160 nm, $t_{out}$=600 nm, $t_{in}$=100 nm, the thickness of the bottom cladding 26 was 2000 nm, and the maximum thickness of the top cladding 27 was 2000 nm. Note that the design method of exemplary embodiments can also be applied to optical waveguide structures having a uniform core such as those in FIGS. 3A through 3C and FIGS. 4A through 4C.

(Step [1])

In the case of the present embodiment, the term "optical waveguide dimensions for determining the cross-sectional structure" refers to $w_{out}$ for a first Bragg grating pattern which is made up of recessed portions and protrusions formed in the side wall 24b, and to $w_{in}$ for a second Bragg grating pattern which is formed in the groove 24c in the top surface 24a. Therefore, $w_{out}$ and $w_{in}$ are specified, and the field distribution of the intrinsic mode is calculated using a film mode matching method (i.e., an FMM method), a finite element method, or a beam propagation method, and an effective refractive index that corresponds to the intrinsic mode is determined. As a result of this, the correspondence relationship between $w_{out}$ and $w_{in}$ and the effective refractive index is obtained.

Figure 6A:
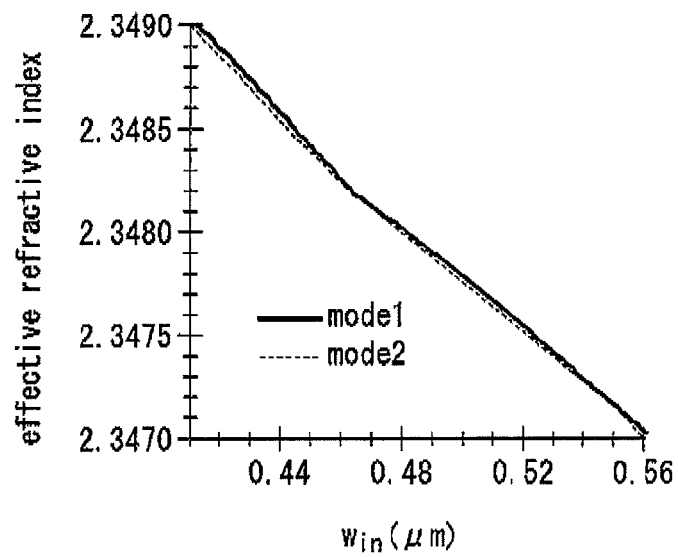
FIG. 6A is a graph showing an example of changes in the effective refractive index relative to $w_{in}$.
Figure 6B:
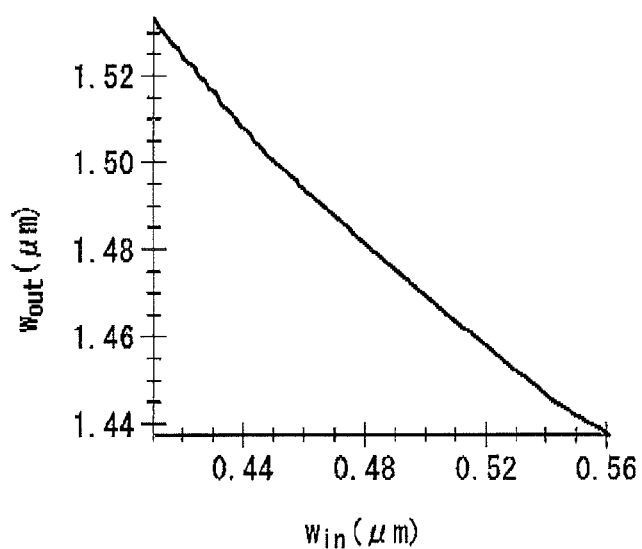
FIG. 6B is a graph showing an example of changes in $w_{out}$ which are attendant on the change in $w_{in}$.

A portion of this result is shown in FIG. 6A and FIG. 6B. FIG. 6A is a graph showing changes in the effective refractive index relative to $w_{in}$, and FIG. 6B is a graph showing changes in $w_{out}$ which accompanies the changes in $w_{in}$. Here, $w_{in}$ and $w_{out}$ are changed simultaneously. Mode 1 shown in FIG. 6A is TE-type polarization (with a polarization degree of 98% or more), and mode 2 is TM-type polarization (with a polarization degree of 97% or more). According to FIG. 6A, the difference between $n_{eff}^{TE}$ and $n_{eff}^{TM}$ is 20 ppm or less, which is smaller than the amount of change in the effective refractive index caused by machining errors. Accordingly, polarization dependence can be ignored. Hereinafter, the effective refractive index of mode 1 is taken as effective refractive index $n_{eff}$ of this optical waveguide.

Note that, here, it is assumed that the effective refractive index of mode 1 is used in the following design process. However, because the difference between $n_{eff}^{TE}$ and $n_{eff}^{TM}$ is less than an error would be, instead, the effective refractive index of mode 2 may be taken as the effective refractive index $n_{eff}$ of the optical waveguide, or the average of the effective refractive indices of both mode 1 and mode 2 may be taken as the effective refractive index $n_{eff}$ of the optical waveguide.

Figure 7:
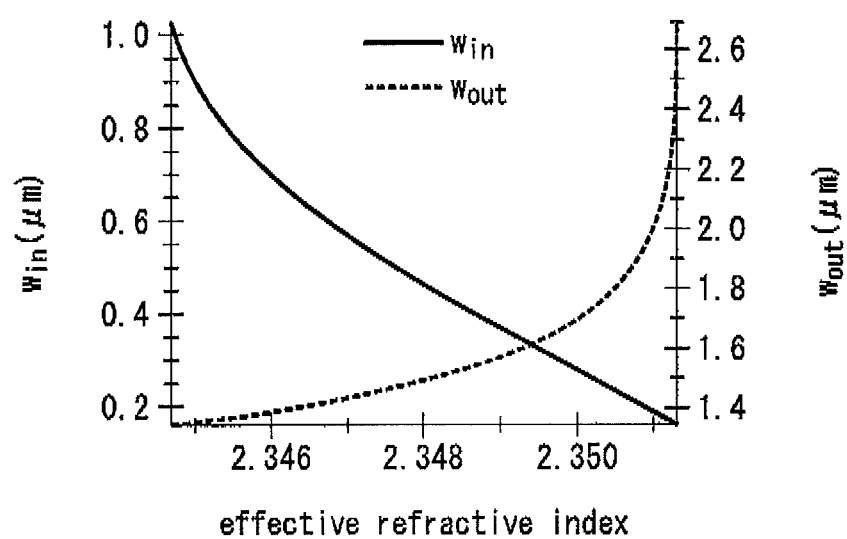
FIG. 7 is a graph showing the changes in $w_{in}$ and $w_{out}$ relative to $n_{eff}$ in an exemplary embodiment of a planar optical waveguide element.

In the present embodiment, the average value of $n_{eff}$ is taken as 2.3480. The horizontal axis is set to $n_{eff}$, the left vertical axis is set to $w_{in}$, and the right vertical axis is set to $w_{out}$. A graph showing the relationship of $w_{in}$ and $w_{out}$ to $n_{eff}$ is shown in FIG. 7. Using these settings, if the $n_{eff}$ of a particular position is supplied, then $w_{in}$ and $w_{out}$ can be determined, and the cross-sectional structure of the optical waveguide in that position is determined.

(Step [2])

The wavelength dispersion characteristics requested in the wavelength dispersion compensation element cancel out (counteract) the wavelength dispersion of the intended optical fiber transmission path, and have the opposite coding from the wavelength dispersion of the optical fiber transmission path, and have an equivalent absolute value. In the present example, the wavelength band of optical signals being transmitted is in the L band region (1566.31 to 1612.65 nm), and the optical transmission path is formed by a dispersion shifted fiber (G653) having a length of 40 km, so that the wavelength dispersion to be assigned to the wavelength dispersion compensation element is stipulated. Moreover, in the intended optical transmission path, it is to be assumed that optical signals of 50 channels of an L band ITU grid in which the frequency interval is 100 GHz (which is approximately 0.84 nm if converted into a wavelength interval) are being transmitted. The bit rate of the transmitted optical signals is 40 Gbit/s, and the bandwidth usage of each channel is 80 GHz. Outside this bandwidth usage, the delay time is stipulated as a fixed value.

A dispersion shifted fiber exhibits anomalous dispersion in the L band, and the group delay time increases as the wavelength lengthens. If the length of the optical transmission path is 40 km, and the center wavelength of the bandwidth usage is approximately 1590 nm, then the wavelength dispersion value is 116 ps/nm, and the dispersion slope (i.e., the higher order wavelength dispersion) value is 2.8 ps/nm².

The wavelength dispersion compensation element generates normal dispersion in which the group delay time decreases as the wavelength lengthens. In order to perform wavelength dispersion compensation on a dispersion shifted fiber, it is necessary to make the absolute values of the wavelength dispersion and the dispersion slope of the wavelength dispersion compensation element equal to these values in the dispersion shifted fiber.

Figure 8:
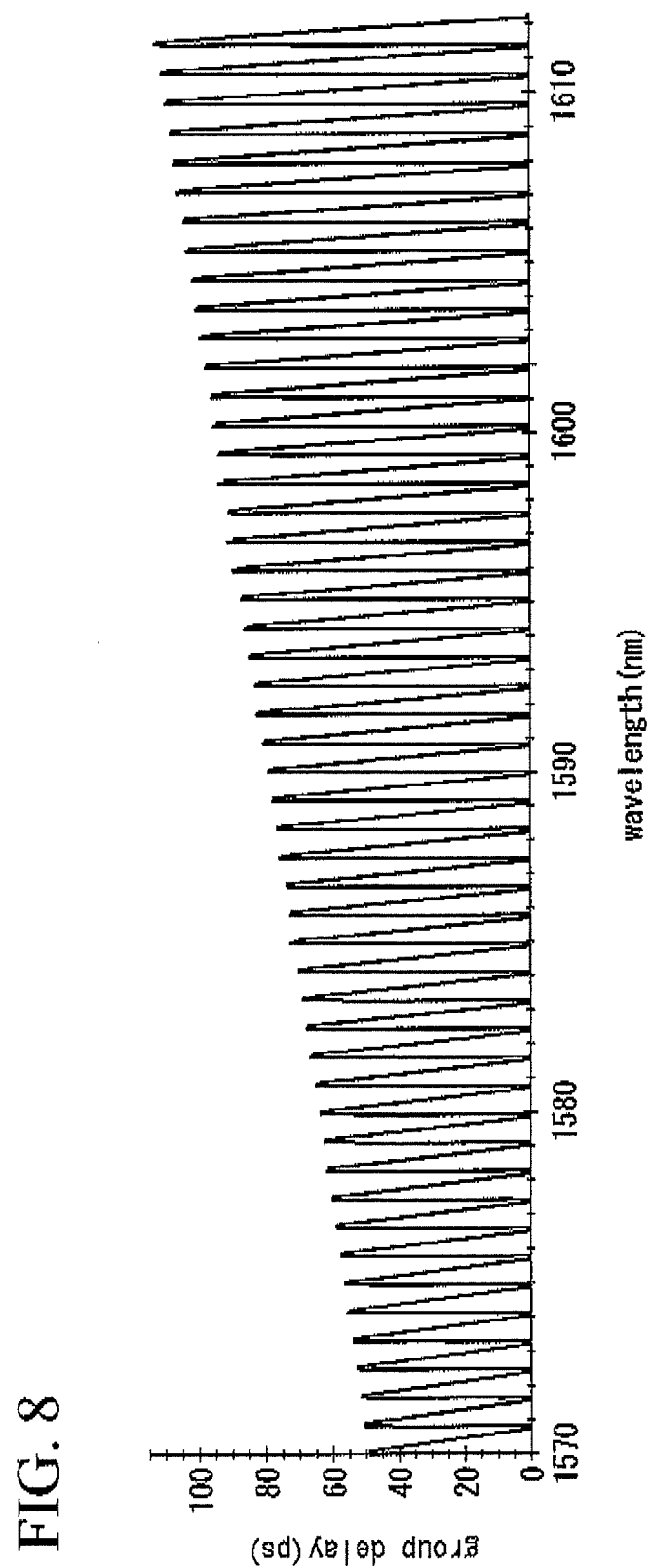
FIG. 8 is a graph showing a wavelength dependence of a group delay time determined in Example 1 and Reference example 1 of a wavelength dispersion compensation element.

If, using the above, the wavelength dependence of the group delay time requested in the wavelength dispersion compensation element were depicted in a graph, it would be like that shown in FIG. 8. Within one wavelength channel, because it is necessary to generate a fixed wavelength dispersion and dispersion slope, it is necessary for the group delay time to be continuous. However, between the wavelength channels, the spectrums of the optical signals are mutually isolated from each other and are independent. Because of this, there is no obstacle even if the group delay time changes non-continuously at the boundaries between the respective wavelength channels. Using the characteristic of the group delay time that non-continuous changes are repeated between wavelength channels, it is possible to superimpose the Bragg grating patterns of a plurality of wavelength channels in the same area of a single optical waveguide.

The characteristics required for a design are the spectrum of the phase of the reflectance and reflectance intensity of the Bragg grating optical waveguide, namely, the complex reflectance spectrum thereof. The reflectance intensity is flat in the 1570 to 1612.2 nm wavelength region, and is set to 85%. The characteristics of the wavelength dispersion of the Bragg grating optical waveguide are reflected in the phase of the reflectance. The relationship of follow Formula 1 is established between the group delay time $\tau_d$ and the phase $\phi$.

[Expression 2]

$$\tau_d(\lambda) = -\frac{\lambda^2}{2\pi c}\frac{d\phi}{d\lambda} \quad \text{(Formula 1)}$$

Here, the variable $\lambda$ is the wavelength, the constant $\pi$ is pi (circumference ratio), and c is the speed of light (within a medium). By integrating the two sides of Formula 1, the phase $\phi$ is determined from the group delay time $\tau_d$. As a result of the above, the complex reflectance spectrum is obtained and this is used as a predetermined characteristic in the following step [3].

In the present embodiments, designing which uses an amplitude modulation-type of Bragg grating in which the amplitude of the Bragg grating changes and the phase changes subordinately to the amplitude is implemented using processing known as coarse graining (described below). In order to simplify this coarse graining, all of the frequency regions for which predetermined group delay time characteristics are determined from the frequency point of origin, namely, from 0 Hz are included in the complex reflectance spectrum used as input data in the design.

(Step [3])

In this step, an effective refractive index profile in a direction along the center axis C of a Bragg grating optical waveguide is derived from the predetermined complex reflectance spectrum obtained in step [2]. Hereinafter, this derivation process will be described.

Firstly, the following formula is obtained using Maxwell's equation for an electrical field E (z) and a magnetic field H (z) on an optical waveguide. Here, z is a coordinate along the center axis C of the Bragg grating optical waveguide, and the coordinate point of origin (z=0) is placed at the starting end of the optical waveguide, while z is at a maximum value at the finishing end. Accordingly, the maximum value of z is the overall length of the Bragg grating optical waveguide.

[Expression 3]

$$\frac{dE(z)}{dz} = i\omega\mu_o H(z) \quad \text{(Formula 2)}$$

[Expression 4]

$$\frac{dH(z)}{dz} = i\omega\varepsilon_o n_{eff}^2(z)E(z) \quad \text{(Formula 3)}$$

i is an imaginary unit, ω is the frequency, $\mu_0$ is the magnetic permeability (in a vacuum), and $\in_0$ is the dielectric constant (in a vacuum). In order to construct a coupled mode equation from Formula 2 and Formula 3, as in Formula 4 and Formula 5, E (z) and H (z) are converted into a traveling wave $A_+$ (z) and a backward traveling wave $A_-$ (z) in the coupled mode equation. Reflected waves correspond to $A_-$ (z).

[Expression 5]

$$A_+(z) = \frac{1}{2}\left[\frac{n_{eff}(z)}{n_{av}}\right]^{1/2}\left[E(z) + \sqrt{\frac{\mu_o}{\varepsilon_o}}\frac{H(z)}{n_{eff}(z)}\right] \quad \text{(Formula 4)}$$

[Expression 6]

$$A_-(z) = \frac{1}{2}\left[\frac{n_{eff}(z)}{n_{av}}\right]^{1/2}\left[E(z) - \sqrt{\frac{\mu_o}{\varepsilon_o}}\frac{H(z)}{n_{eff}(z)}\right] \quad \text{(Formula 5)}$$

$n_{av}$ is the average refractive index of the Bragg grating optical waveguide, and in the present example $n_{av}$=2.3480. If the traveling wave (z) and backward traveling wave $A_-$ (z) are used, then the coupled mode equation is expressed as is shown in the following Formula 6 and Formula 7.

[Expression 7]

$$\frac{dA_+(z)}{dz} - ik(z)A_+(z) = -q(z)A_-(z) \quad \text{(Formula 6)}$$

[Expression 8]

$$\frac{dA_-(z)}{dz} + ik(z)A_-(z) = -q(z)A_+(z) \quad \text{(Formula 7)}$$

Here, the wave number k (z) is expressed in the following Formula (8), and the potential q (z) in the coupled mode equation is expressed in Formula (9). $c_{light}$ is the speed of light (within a vacuum).

[Expression 9]

$$k(z) = \frac{\omega}{c_{light}} n_{eff}(z) \quad \text{(Formula 8)}$$

[Expression 10]

$$q(z) = -\frac{1}{2}\frac{d}{dz}\ln[n_{eff}(z)] \quad \text{(Formula 9)}$$

If the potential q (z) is determined, then the effective refractive index profile of the Bragg grating optical waveguide is provided by the following Formula 10.

[Expression 11]

$$n_{eff}(z) = n_{av}\exp\left[-2\int_0^z q(s)\,ds\right] \quad \text{(Formula 10)}$$

The overall length z of the Bragg grating optical waveguide is specified as 10.2 mm. An estimation of the overall length is performed in the following manner. The speed of light in a vacuum is multiplied by the maximum value of the group delay time that should be generated in the Bragg grating optical waveguide, and the result is then divided by the average value of the effective refractive indices. The inverse scattering method of Non-patent document 2 is applied to the designing of a high refractive index optical waveguide grating pattern, and the potential q (z) is determined from the complex reflectance spectrum R (λ) using the following process.

Firstly, the solutions of Formula 4 and Formula 5 are expressed as in the following Formula 11 and Formula 12.

[Expression 12]

$$A_+(z) = e^{ikz} + \int_\infty^z e^{ikz'} B_-(z, z')\,dz' \quad \text{(Formula 11)}$$

[Expression 13]

$$A_-(z) = e^{-ikz} + \int_\infty^z e^{-ikz'} B_+(z, z')\,dz' \quad \text{(Formula 12)}$$

$A_+$ (z) and $A_-$ (z) are propagated in the +z direction and the −z direction respectively. The integral terms in Formula 11 and Formula 12 show the effects of reflection. The coupled equation is converted into the following Gel'fand-Levitan-Marchenko equation (Formula 13 and Formula 14) from Formula 11 and Formula 12.

[Expression 14]

$$B_+(z, y) + \int_{-\infty}^z B_-(z, z')r(z' + y)\,dz' = 0 \quad \text{(Formula 13)}$$

[Expression 15]

$$r(z + y) + B_-(z, y) + \int_{-\infty}^z B_+(z, z')r(z' + y)\,dz' = 0 \quad \text{(Formula 14)}$$

Here, $y = -c_{light}t$ (wherein t is time), and y<z. r (z) is an inverse Fourier transform of the complex reflectance spectrum R (k) which uses the wave number as a variable, and corresponds to the impulse response. By providing r (z) and solving Formula (13) and Formula (14), q (z) can be determined. q (z) is provided by the following Formula (15)

Expression 16

$$q(z) = -2B_-(z,z) \quad \text{(Formula 15)}$$

Figure 9:
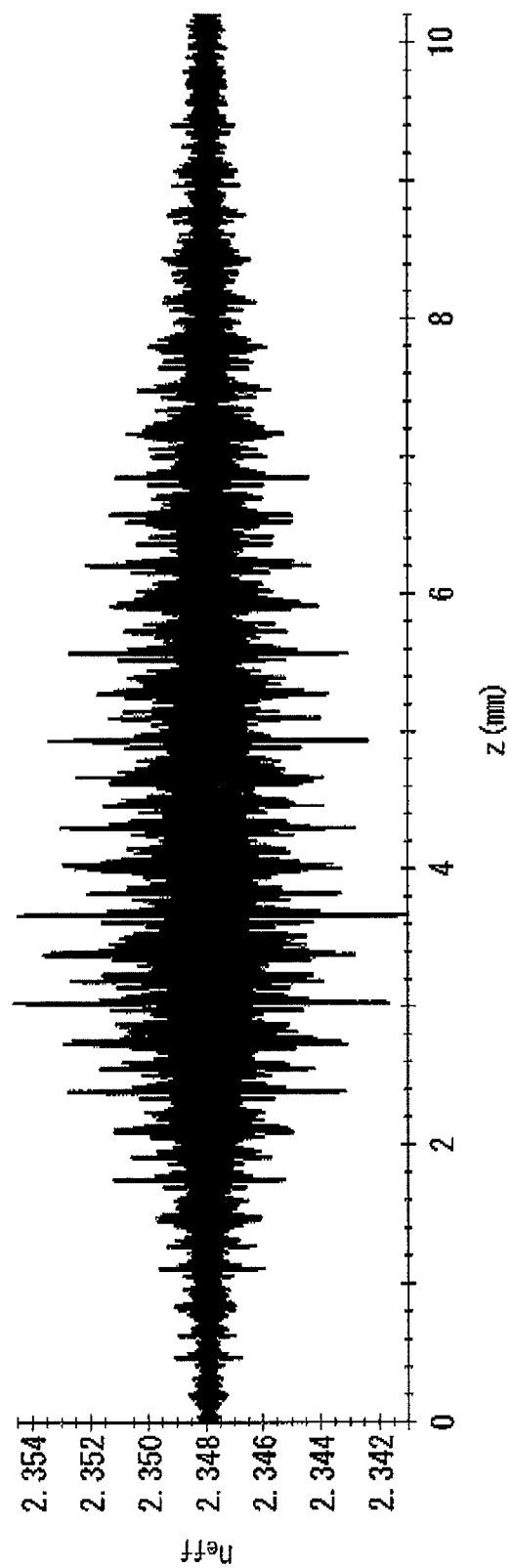
FIG. 9 is a graph showing an effective refractive index profile in Example 1 of a wavelength dispersion compensation element.

If the determined q (z) is applied to Formula (10), then the effective refractive index profile $n_{eff}(z)$ is obtained. A graph in which the effective refractive index profile of the present example is plotted over the entire length of a Bragg grating optical waveguide is shown in FIG. 9. z=0 mm corresponds to the start point (i.e., the incident end and the emission end) of the Bragg grating optical waveguide, while z=10.2 mm corresponds to the finishing end of the Bragg grating optical waveguide. In addition, the amplitude of the effective refractive index changes over the entire length of the optical waveguide.

The potential q (z) of Formula 10 and Formula 15 is a real number. As a result of this, the calculation to transform from the complex reflectance spectrum R (k) to r (z) which provides an impulse response (in other words, a 'time response') is a real number type, so that the amplitude changes and the phase changes subordinately to the amplitude.

Note that the inverse scattering method which is based on the Gel'fand-Levitan-Marchenko equation of the coupled mode equation is described in the following document.

"An Efficient Algorithm for Solving Zakharov-Shabat Inverse Scattering Problem", G. Xiao and K. Yashiro, IEEE Transactions on Antennas and Propagation, 2002, Vol. 50 Issue 6 pp. 807-811.

Figure 10:
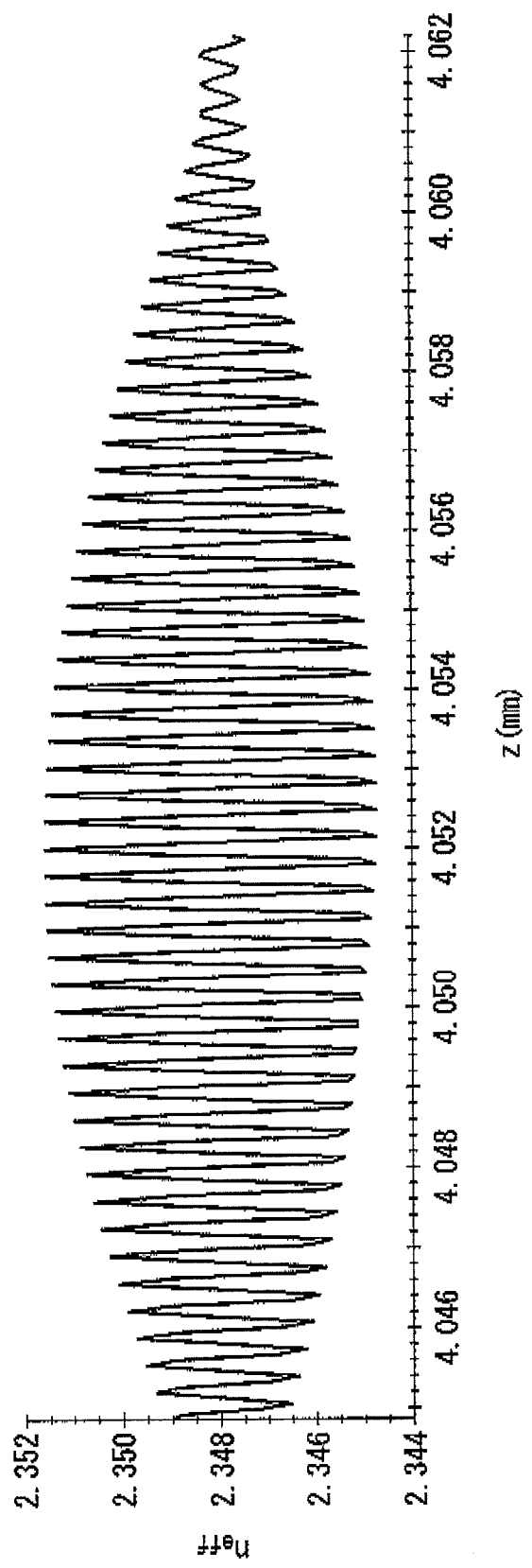
FIG. 10 is a graph showing an enlargement of a portion of the effective refractive index profile shown in FIG. 9.

FIG. 10 is an enlargement of the horizontal axis of FIG. 9, and displays a portion of a refractive index profile. As is shown in FIG. 10, the effective refractive index oscillates as a function of the coordinate z, and it is shown that a Bragg grating pattern is formed.

In the amplitude modulation-type Bragg grating of the embodiments of the present invention, the Bragg grating pattern is formed as an amplitude modulation type by changing the amplitude of the Bragg grating. As a result, it has the characteristic that the coding of the gradient of the envelope curve of the amplitude of the Bragg grating is inverted. The phase of the oscillation of the Bragg grating changes subordinately to the changes in amplitude.

Figure 11:
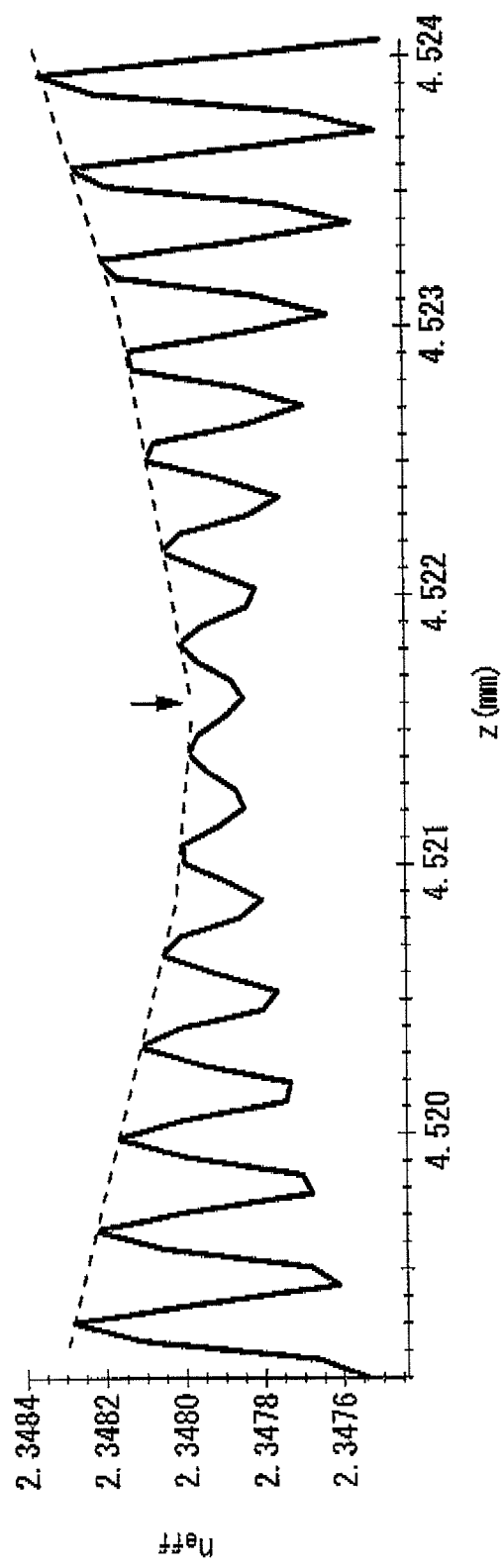
FIG. 11 is a graph showing an enlargement of a portion of the effective refractive index profile shown in FIG. 9 together with an envelope curve.

In order to show an example of amplitude modulation, a portion of the effective refractive index distribution shown in FIG. 9 is enlarged and shown in FIG. 11 together with the envelope curve (the dotted line) of the Bragg grating amplitude. The envelope curve is only displayed for the maximum values of the amplitude. Because the coding is inverted for the envelope curve for the minimum values of the amplitude at identical points as for the envelope curve for the maximum values, it is only necessary to consider the envelope curve for the maximum values. An arrow indicates the coordinate point on the waveguide where the coding of the gradient of the envelope curve becomes inverted. The coding inversions exhibit precipitous stepped changes or non-continuous changes that are generated at a single isolated coordinate point.

In contrast to this, in a sampled Bragg grating, when a coding inversion is generated, it is generated via two points and the precipitous stepped changes or non-continuous changes do not appear. Furthermore, a waveguide region where the amplitude changes continuously to zero is present between these two points. In the amplitude modulation-type grating of the present example, the amplitude of the envelope curve does not become zero at an isolated coordinate point where the coding of the gradient of the envelope curve is inverted, and there are no regions where the amplitude is continuously zero. Accordingly, it is possible for the waveguide length to be made shorter than for a sampled Bragg grating.

A plurality of isolated coordinate points where the coding of the gradient of the envelope curve is inverted are present on the waveguide. In each of these coordinate points, a non-continuous change in the phase is brought about incidentally. If the phase changes non-continuously, then the pitch changes. Consequently, the pitch takes on a value which is different from half the value obtained by dividing the center wavelength at that coordinate point (1590.83 nm) by $n_{av}$. The accuracy with which the coordinate point where the coding of the gradient of the envelope curve is inverted is specified depends on the discretized interval of the coordinate z of the waveguide which is shown by the horizontal axis. If this interval is taken as $\Delta P$, then the accuracy for specifying the coordinate point is within a range of $\pm \Delta P$. In this manner, in the amplitude modulation-type Bragg grating of the present invention, the coding of the gradient of the envelope curve of the amplitude of the Bragg grating is inverted so that, as a result, coordinate points are present where the pitch changes discretely.

In the present description, in this example and in all the other examples, the discretized resolution of the coordinate z refers to the discretized interval $\Delta P$ of the coordinate z.

Figure 12:
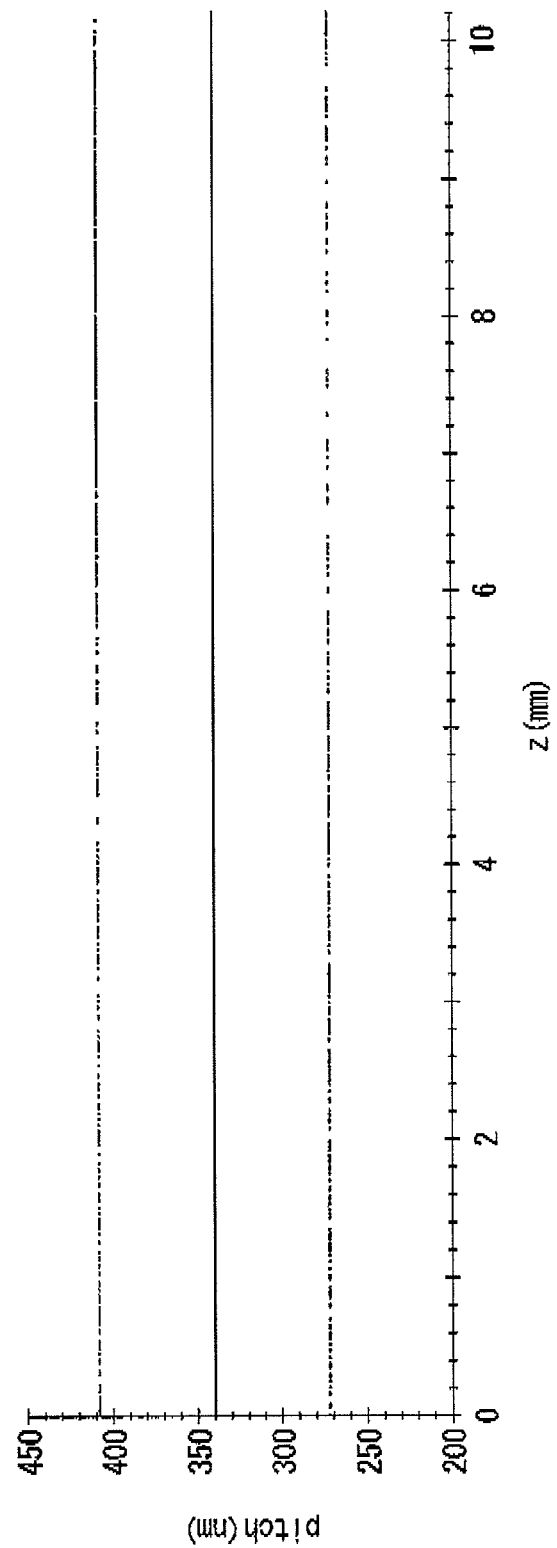
FIG. 12 is a graph showing a pitch distribution in Example 1 of the wavelength dispersion compensation element.

If the pitch of variations in the effective refractive index over the entire length of the optical waveguide is measured in the effective refractive index distribution of the present example, then it can be understood that the pitch changes discretely as shown in FIG. 12. Here, the pitch is determined by extracting all of the maximum values of the changes in the effective refractive index that regulate the pattern of the Bragg grating, and using the distance between respective adjacent maximum values as the pitch. The pitch of the vertical axis is set within a range of 200 nm through 450 nm. The pitch value where the frequency of occurrence is the highest is the main pitch or pitch center value, and corresponds to half a value determined by dividing the center wavelength (1590.83 nm) by $n_{av}$. In the present example, the discrete changes in the pitch are set using $\Delta P$ as the minimum unit of change, and with the amount of increase or decrease from the main pitch being an integer multiple of $\Delta P$. Accordingly, the amount of discrete change in the pitch changes in accordance with any changes in the discretized interval of the coordinates on the waveguide shown on the horizontal axis.

The discrete changes in the pitch have the feature that they do not appear in a chirped Bragg grating. In a chirped Bragg grating, the pitch changes continuously in the light waveguide direction. In a chirped Bragg grating, the amplitude of the Bragg grating also changes at the same time, however, the changes in the amplitude are confined to being used for achieving secondary characteristics such as apodization. Important characteristics such as the phase characteristics and number of channels of the filter reflection spectrum are achieved by changing the frequency of the Bragg grating in the light waveguide direction. In the present step, it is not possible to construct a chirped Bragg grating. In order to construct a chirped Bragg grating, it is necessary to switch the conversion from the complex reflectance spectrum R (v) to a time response (an impulse response) to a complex number type of conversion. As a result of this, the q (z) obtained from Formula 15 becomes a complex number. If q (z) is a complex number, then when $n_{eff}(z)$ is determined from q (z), because $n_{eff}(z)$ is a real number, it is necessary for only the real portion of q (z) to be used. Accordingly, an amplitude modulation type of Bragg grating has a different design method from that used for a chirped Bragg grating and the two are classified into mutually different categories. Because it is contrasted with an amplitude modulation type, a chirped Bragg grating is classified as a frequency modulation type.

In the present description, in this example and in all the other examples, the calculation used for the conversion from the complex reflectance spectrum to an impulse response is a real number-type, and is targeted at amplitude modulation-type Bragg gratings. The conditions (details thereof are given in the following supplement) that are used to select an amplitude modulation-type Bragg grating are set such that, the discretized resolution of the coordinate axis, namely, the sampling cycle is not less than the amount of change in the pitch which corresponds to a half value of the width of the reflection band, using coarse graining. In other words, the sampling cycle is not less than the maximum value of the amount of change from the center value of the pitch in a chirped Bragg grating.

At this time, the following two conditions may be met: (I) The frequency range of the specified spectrum characteristics includes all the regions from the point of origin (i.e., a frequency of 0) to the region where the relevant spectrum channel is located; (II) A real number type is selected in the above described conversion from the complex reflectance spectrum to an impulse response.

Here, the reason for this is that, because (I) simplifies the coarse graining, and because (II) is not targeted at chirped Bragg gratings, it is not necessary to select a complex number type in which the processing is complicated.

Five discrete values are taken for the pitch value, and the frequency with which these values are taken is concentrated in the three values formed by the center value and by the values above and below the center value. In FIG. 12, regions which include the three values are shown on the vertical axis. Among these, the frequency with which the center pitch (340 nm) is taken is the highest, and this becomes the main pitch. An average value of the minimum value (272 nm) and the maximum value (408 nm) of the pitch within the range of the vertical axis shown in FIG. 12 coincides with the main pitch. If the center wavelength is calculated with the product of the average value (2.3480) of the effective refractive index and the main pitch providing the half value of the center wavelength of the reflection band of the Bragg grating, then this center wavelength is 1597 nm which substantially coincides with the center of the wavelength band shown in FIG. 8. Accordingly, the repetition of a change either +68 nm or −68 nm from the main pitch becomes the principal cause for wavelength dispersion being generated in a plurality of wavelength channels around the center wavelength. As a result of this, the Bragg grating pattern of the present example is formed as a result of the pitch changing discretely at the same time as the amplitude changes continuously.

Taking a limited number (i.e., a low number) of discrete values as the pitches is effective in maintaining the frequency of work in the manufacturing process on a planar substrate. A grating pattern is manufactured based on pattern lithography using an optical mask. If the pitch changes continuously, it is difficult to maintain the accuracy of the optical lithography over all the pitches, and there is a concern that the pattern of a chirped Bragg grating will differ from the design. If the changes in pitch are limited to a small discrete value, then optimizing the lithography conditions is easy and the accuracy of the lithography is not adversely affected. Accordingly, the design method of the present example is suitable for applications in which an optical waveguide is manufactured on a planar substrate.

Figure 13A:
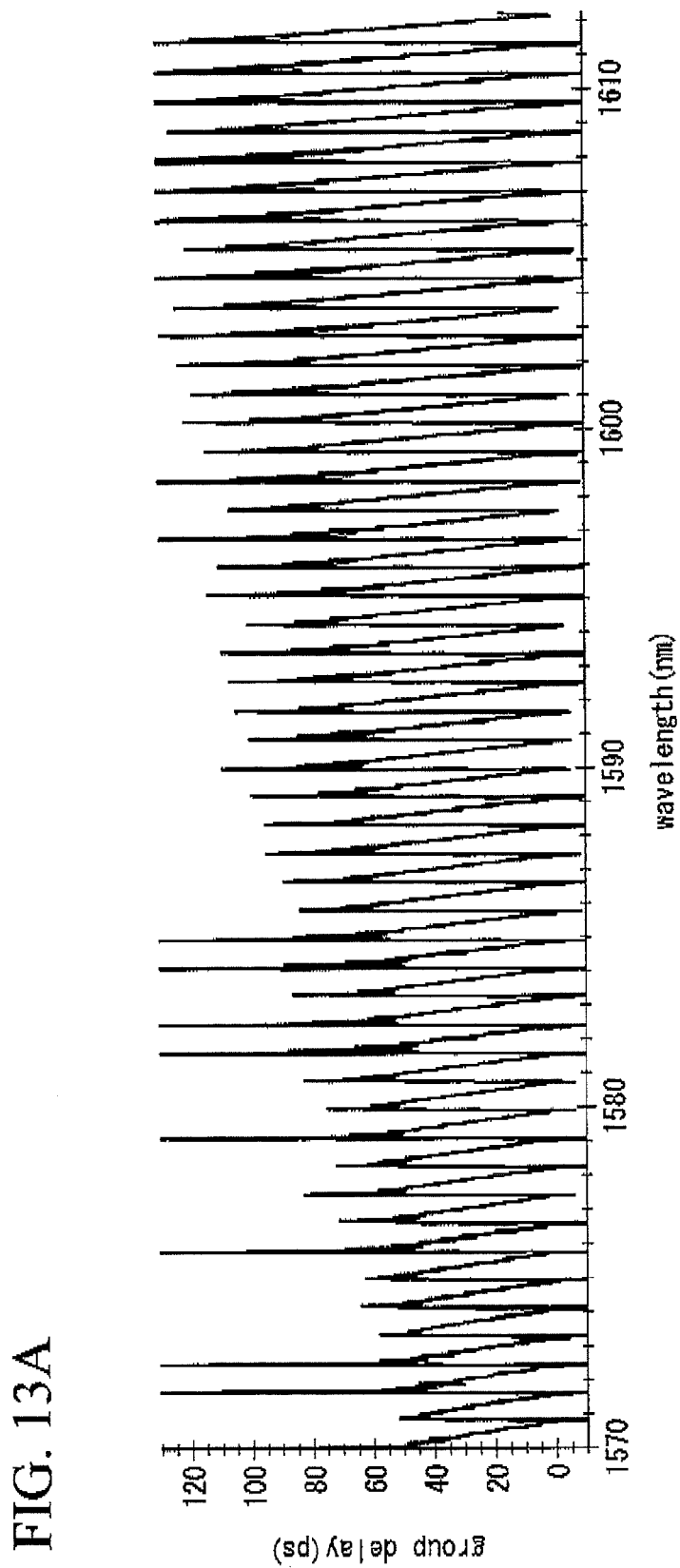
FIG. 13A is a graph showing the wavelength dependence in the group delay time obtained in Example 1 of the wavelength dispersion compensation element.

The wavelength dispersion characteristics of a Bragg grating optical waveguide having the effective refractive index profile shown in FIG. 9 was reproduced by simulation, and it was confirmed that they matched the characteristics (see FIG. 8) used as input data. The confirmed simulation was executed as a direct problem in which the effective refractive index profile shown in FIG. 9 was assigned to the coupled mode equations of Formula 6 and Formula 7. When Formula 1 was applied to the phase component of the complex reflectance spectrum which was the result thereof, then the wavelength dependence of the group delay time was obtained as is shown in FIG. 13A. When FIG. 13A was compared with FIG. 8, it was found that predetermined wavelength dispersion characteristics were reproduced.

(Step [4])

Based on a correspondence relationship between the dimensions and the effective refractive index of the optical waveguide prepared in Step [1], the effective refractive index profile determined in Step [3] was converted into distribution data (i.e., profile) of the dimensions of the optical waveguide. When the effective refractive index was provided, $w_{out}$ and $w_{in}$, which are the dimensional parameters to be decided, were determined. Accordingly, by associating $w_{out}$ and $w_{in}$ with the effective refractive index at each point of the coordinates z, distribution data was obtained for the optical waveguide dimensions $w_{out}$ and $w_{in}$.

The Bragg grating pattern shown in FIG. 10 has a sinusoidal shape. In a pattern transfer process which is based on dry-etching and lithography using an optical mask, if a rectangular wave type of shape is employed in which a repeated combination of spaces whose lines, which have a fixed width, and widths change in accordance with the pitch is arranged, there are few fluctuations in the shape after the dry etching. Therefore, after profile data for the optical waveguide dimensions $w_{out}$ and $w_{in}$ has been obtained from the profile of the effective refractive index, it is converted into a rectangular wave-shaped profile. However, in this conversion to a rectangular wave shape, the following two restrictions must be observed.

(1) The line width is fixed to 180 nm (the space changes in accordance with the pitch).

(2) The line amplitude of the rectangular wave shape line is adjusted so as to match the core surface area covered by the sinusoidal Bragg grating pattern.

Figure 14:
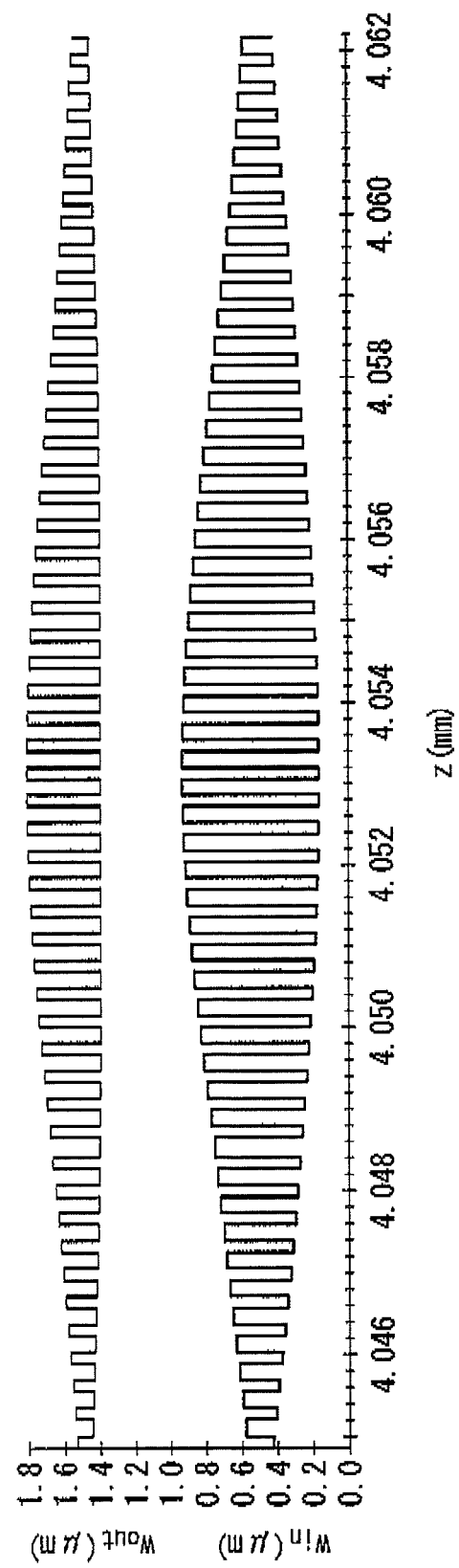
FIG. 14 is a graph showing an enlargement of a portion of an optical waveguide dimensional profile in Example 1 of the wavelength dispersion compensation element.

In accordance with the above flow, the profiles of $w_{out}$ and $w_{in}$ shown in FIG. 14 are obtained. The range of the horizontal axis in FIG. 14 is in the same region as the horizontal axis in FIG. 10. Because a groove is provided in the top portion of the core, and the width of the groove is changed in accordance with the Bragg grating pattern, an antiphase type of change is exhibited in which as $w_{out}$ increases, $w_{in}$ decreases. If projections are provided on the top portion of the core, and the width of the projections is changed in accordance with the Bragg grating pattern, then a normal phase type of change is exhibited in which as $w_{out}$ increases, $w_{in}$ also increases.

A procedure for manufacturing a Bragg grating optical waveguide having reduced polarization dependence is described above using Steps [1] through [4]. It is estimated that the element length is less than half the length when an optical fiber Bragg grating is used. By manufacturing an optical waveguide based on the above description, it is possible to provide a small-sized wavelength dispersion compensation element having reduced polarization dependence. Because the optical waveguide is a reflective type, light which is input from z=0 is propagated along the Bragg grating optical waveguide, and is propagated inversely from the input direction and is output from z=0. Note that as long as Step [1] is executed prior to Step [4], Step [1] may be executed after either one of Step [2] or Step [3].

Figure 13B:
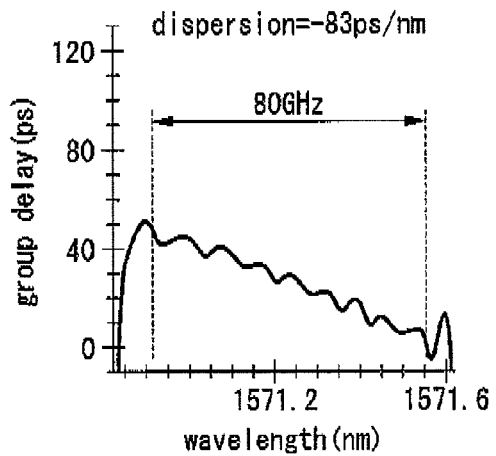
FIG. 13B is a graph showing an enlargement of the vicinity of a 1571 nm wavelength of FIG. 13A.
Figure 13C:
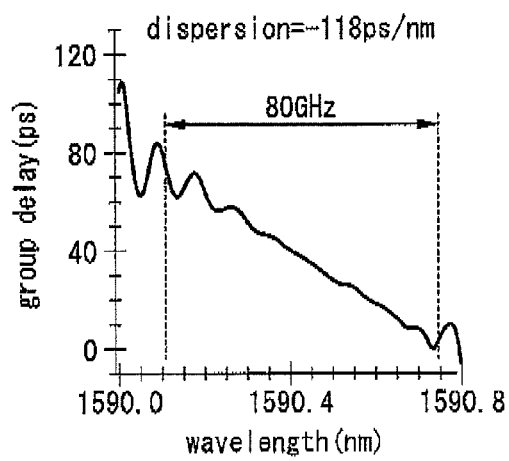
FIG. 13C is a graph showing an enlargement of the vicinity of a 1590 nm wavelength of FIG. 13A.
Figure 13D:
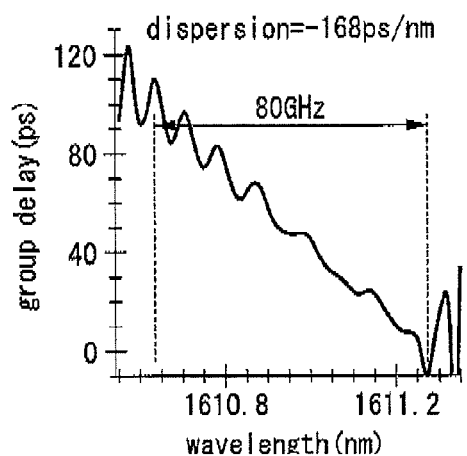
FIG. 13D is a graph showing an enlargement of the vicinity of a 1610 nm wavelength of FIG. 13A.

If both $w_{out}$ and $w_{in}$ are not changed simultaneously and only one is changed, then it is not possible to reduce the polarization dependence, and the difference between $n_{eff}^{TE}$ and $n_{eff}^{TM}$ increases to approximately 1000 ppm at maximum, which is approximately 50 times the difference in the present example. As is shown in FIG. 13B through FIG. 13D, a linear relationship is maintained between the group delay time and the wavelength, and variations in the group delay time which accompany variations in the change increase by approximately a factor of 50 compared with the present example. Namely, using the present example, in a wavelength dispersion compensation element which employs a high refractive index optical waveguide, it is possible to reduce the polarization dependence of the wavelength dispersion to approximately $1/50^{th}$.

The Bragg grating optical waveguide described in the present example can also be used for wavelength dispersion compensation in other wavelength regions. As an example of a wavelength dispersion compensation element in another wavelength band, a case in which a C-band region is targeted is provided in another example.

Reference Example of a Planar Optical Waveguide Element

Figure 15:
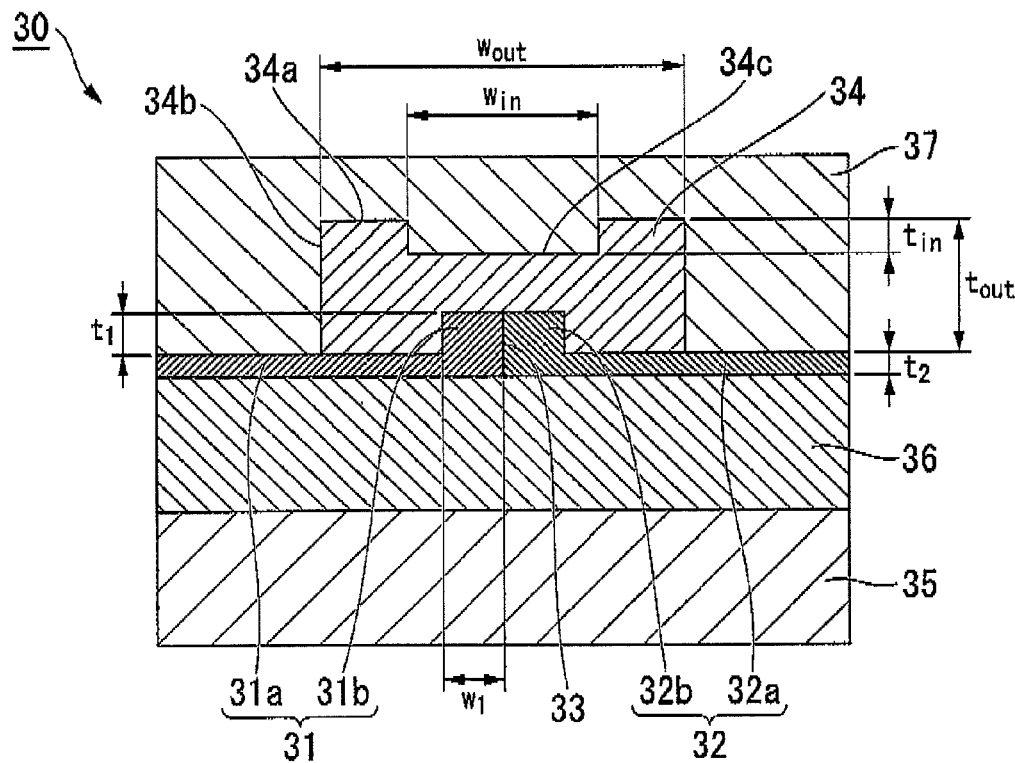
FIG. 15 is a cross-sectional view showing a Reference example of a planar optical waveguide element.

The cross-sectional structure of a planar optical waveguide element of the present reference example is shown in FIG. 15. The core of a planar optical waveguide element 30 which has the cross section shown in FIG. 15 is a composite core formed by two areas, namely, inner side cores 31 and 32 and an outer side core 34. The present example is the same as the third example shown in FIG. 5 except for the fact that the inner side cores 31 and 32 do not have a center gap. The structures of the outer side core 34, of a first Bragg grating pattern which is formed on a side wall 34b of the outer side core 34, of a second Bragg grating pattern which is formed in a groove 34c in a top surface 34a, and of a substrate 35, a bottom cladding 36, and a top cladding 37 are the same as in the third example shown in FIG. 5.

In this example, the inner side cores 31 and 32 are formed as two areas, namely, a first rib 31 and second rib 32, and a central gap is not provided between the two ribs. The first and second ribs 31 and 32 are formed from a material having a higher refractive index than that of the outer side core 34. The first rib 31 and second rib 32 are the same height, and this height is indicated by $t_2$ in FIG. 15. The first and second ribs 31 and 32 each have an identical shape, and are shaped so as to be the reverse of each other in a horizontal direction. Specifically, the first and second ribs 31 and 32 are formed by planar portions 31a and 32a which each have a thickness of $t_2$, and by rectangular parallelepiped portions 31b and 32b which have a height $t_1$ and a width $w_1$, and which are positioned on edges of the planar portions 31a and 32a. The material used to form the rectangular parallelepiped portions 31b and 32b is the same as the material used to form the planar portions 31a and 32a. The first rib 31 and the second rib 32 are joined via a center joining portion 33.

Because the cross-sectional area of the inner side core is reduced due to there being no center gap, variations in the effective refractive index which are caused by size variations in the first and second ribs 31 and 32 are increased. However, because it is possible to omit the manufacturing process which is performed in order to provide the center gap, the manufacturing process can be simplified and both a shortening of the manufacturing period and a reduction in costs can be achieved. If a shortening of the manufacturing period and a reduction in costs are given precedence over the performance of the element, then the structure of the present reference example can be used.

In the planar optical waveguide element of the present reference example, in the same way as in the above described third example, P-conductivity or N-conductivity may be imparted to the first rib 31 and the second rib 32 by doping the medium with suitable impurities. It is also possible to provide electrode pads that impart voltage to both the first rib 31 and the second rib 32, and by generating an electric potential difference between the two ribs 31 and 32, to make it possible to induce changes in the refractive index which are caused by changes in the carrier density, and to thereby make it possible to vary the optical characteristics of an electrode element.

Note that the imparting of conductivities having opposite polarities (i.e., P-type or N-type) to the first rib 31 and the second rib 32, and also the provision of the electrode pad to impart voltage are not essential structure in the present reference example, and it is also possible to use the inner side cores 31 and 32 without imparting any external voltage thereto.

Moreover, it is also possible for the first rib 31 and the second rib 32 to be formed from an identical material including whether or not dopants are added thereto. In this case, the center joining portion 33 is not provided, and the two ribs 31 and 32 are able to form an inner side core as a single integrated layer.

Reference Example 1 of a Wavelength Dispersion Compensation Element

In the present reference example, a case was calculated as Reference example 1 relating to a wavelength dispersion compensation element in which, in an optical waveguide structure having the composite core shown in FIG. 15 (having no center gap), the first and second ribs 31 and 32 were formed from Si, the outer side core 34 was formed from $Si_xN_y$, the substrate 35 was formed from Si, the bottom cladding 36 was formed from $SiO_2$, the top cladding 37 was formed from $SiO_2$, and in which $t_1$=250 nm, $t_2$=50 nm, $w_1$=100 nm, $w_2$=160 nm, $t_{out}$=600 nm, and $t_{in}$=100 nm, and in which the thickness of the bottom cladding 36 was 2000 nm, and the maximum thickness of the top cladding 37 was 2000 nm.

Figure 16:
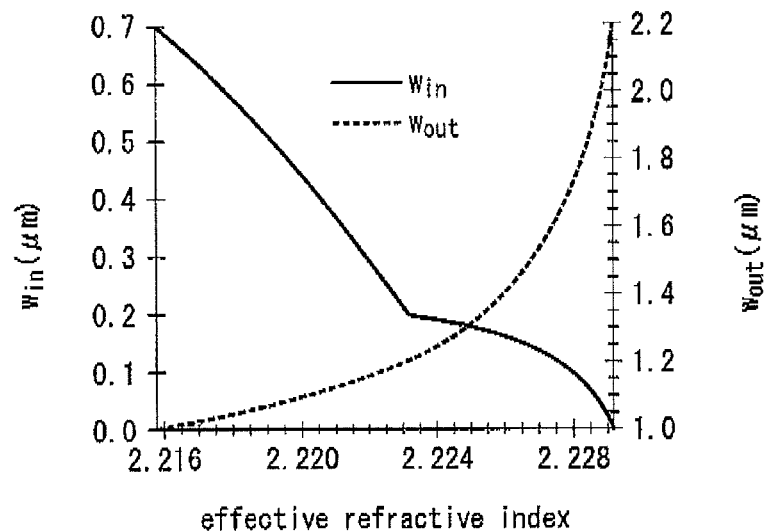
FIG. 16 is a graph showing changes in $w_{in}$ and $w_{out}$ relative to $n_{eff}$ in Reference example 1 of a planar optical waveguide element.

In this Reference example 1 as well, in the same way as in Example 1, changes in $w_{out}$ and $w_{in}$ relative to the effective refractive index were calculated in accordance with Step [1]. The results thereof are shown in FIG. 16. In this Reference example 1, the average value of the effective refractive index is 2.2225.

Furthermore, in the same way as in Example 1, a wavelength dispersion compensation element for 50 channels of an L band ITU grid in which the frequency interval was 100 GHz was designed in accordance with Steps [2] through [4] for a dispersion shifted fiber having a length of 40 km. The wavelength dependence of the group delay time to be assigned to the wavelength dispersion compensation element is the same as that shown in FIG. 8 for Example 1. The reflectance was also 85% in a wavelength region of 1570-1612.2 nm. Accordingly, as for the predetermined characteristics, the complex reflectance spectrum was the same as in Example 1. The bit rate of the transmitted optical signals was also the same as in Example 1 at 40 Gbit/s, and the usage band of each wavelength channel was regulated to 80 GHz.

Figure 17:
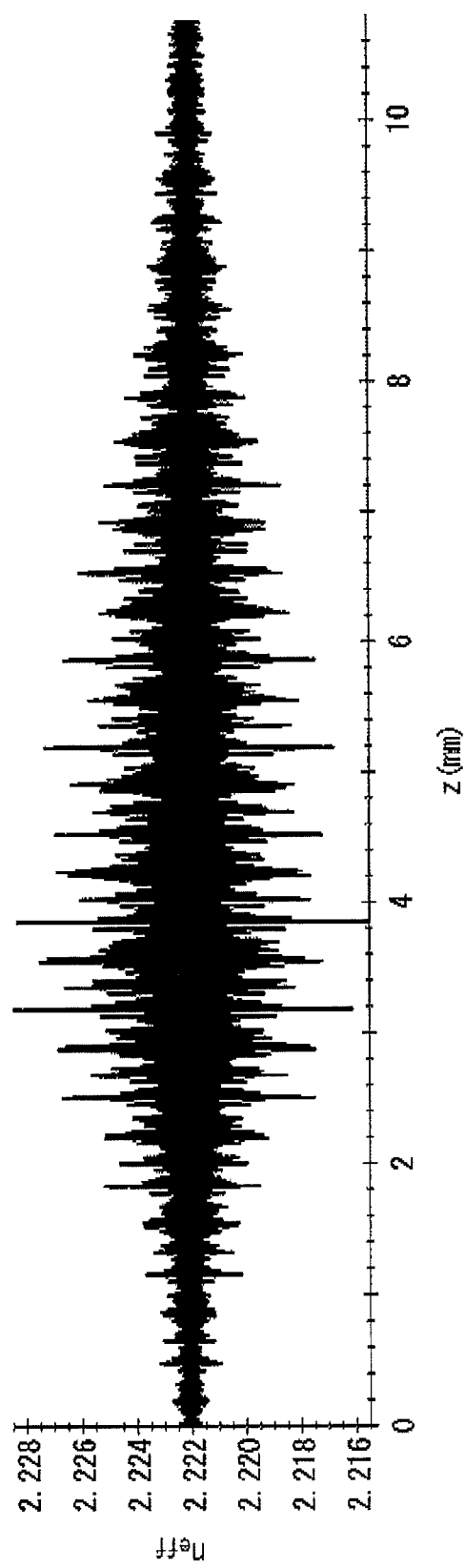
FIG. 17 is a graph showing an effective refractive index profile in Reference example 1 of a wavelength dispersion compensation element.

The overall length of the Bragg grating optical waveguide was 10.737 mm, and the effective refractive index profile shown in FIG. 17 was obtained. This profile was the same as the profile shown in FIG. 9 other than in the following points. In Reference example 1, the profile is enlarged in the center axis direction and the overall length of the optical waveguide is extended by the amount that the average value of the effective refractive index is smaller than it is in Example 1.

Figure 18:
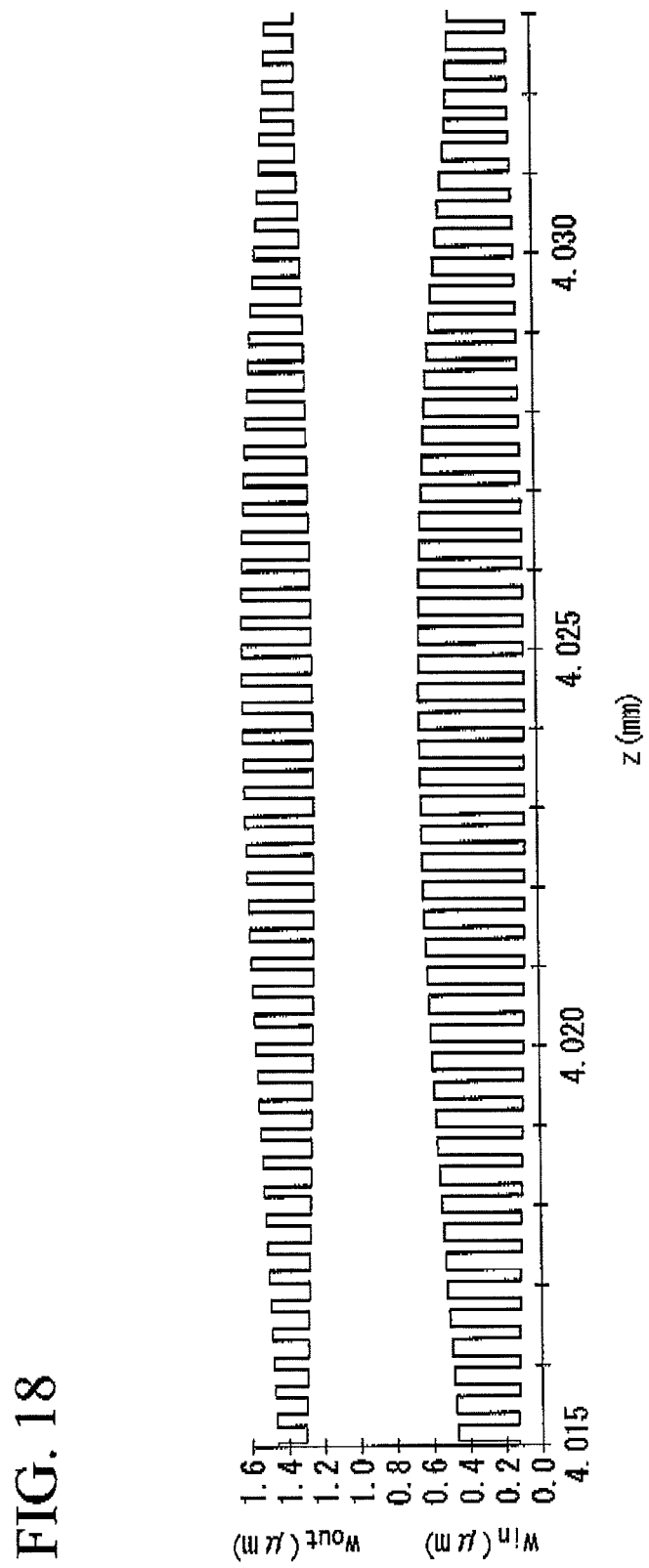
FIG. 18 is a graph showing an enlargement of a portion of an optical waveguide dimensional profile in Reference example 1 of a wavelength dispersion compensation element.

From the relationship shown in FIG. 16, in the same way as in Step [4] of Example 1, profiles of $w_{out}$ and $w_{in}$ were obtained. A portion of this is shown in enlargement in FIG. 18. The Bragg grating optical waveguide of the present Reference example 1 can also be designed so as to deal with wavelength bands outside the L band. In this case, the complex reflectance spectrum to be determined in the relevant wavelength band is determined in accordance with Step [2] described in Example 1, and the shape is designed in accordance with Steps [3] and [4].

Example 2 of a Wavelength Dispersion Compensation Element

Next, in the same way as in Example 1, an example of a wavelength dispersion compensation element for 40 channels ITU grid in which the frequency interval was 100 GHz in a C band (1528.77 to 1577.03 nm) which was designed in accordance with Steps [2] through [4] of Example 1 using a Bragg grating optical waveguide having the cross-sectional structure described in FIG. 5, is described as Example 2.

Figure 19:
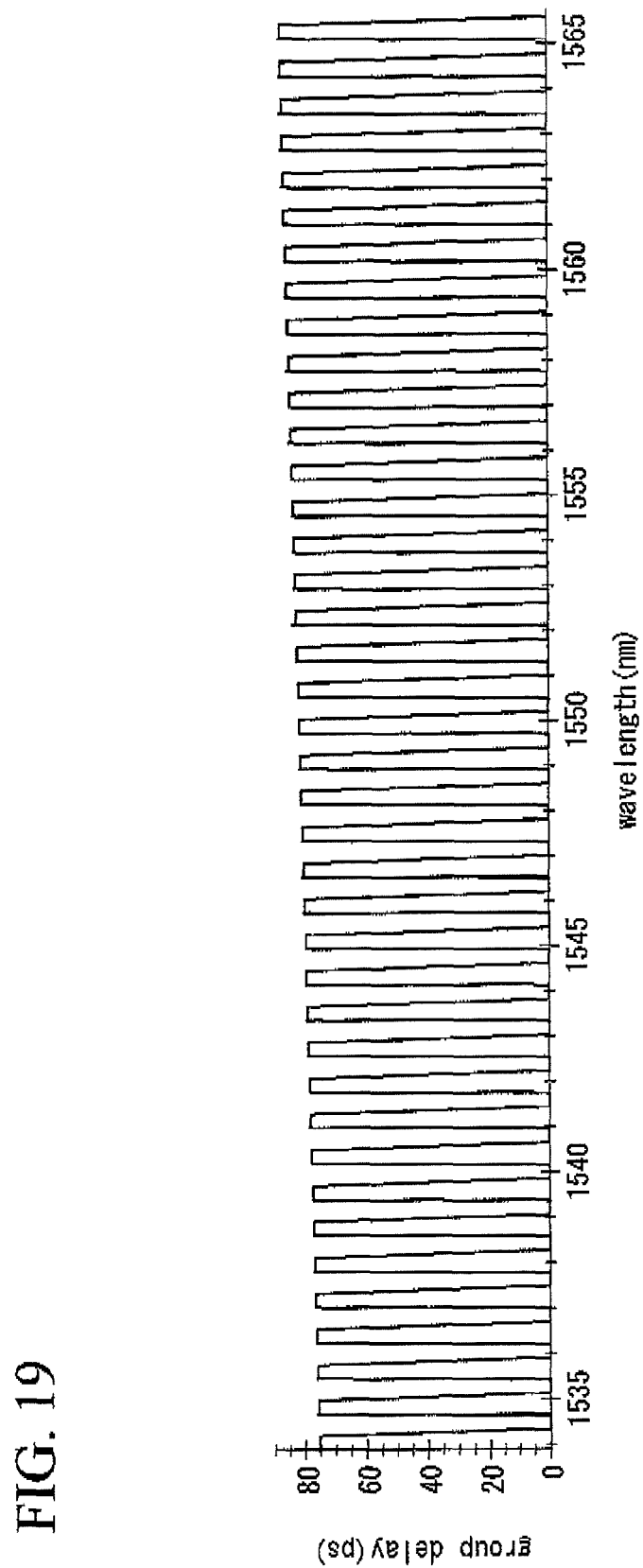
FIG. 19 is a graph showing a wavelength dependence of a group delay time determined in Example 2 of a wavelength dispersion compensation element.

The material forming the optical waveguide is the same as in Example 1. The intended optical fiber is a standard dispersion single mode fiber (G652) having a length of 30 km. In a wavelength of 1550 nm, the wavelength dispersion value was 510 ps/nm, and the dispersion slope value was 1.74 ps/nm². The bit rate of the transmitted optical signals was 10 Gbit/s, and the usage band of each wavelength channel was 20 GHz. Outside the usage band, the group delay time was regulated to be uniform. A graph of the wavelength dependence of the group delay time required in the wavelength dispersion compensation element is shown in FIG. 19. Here, the range of the horizontal axis is 1533.85 through 1565.58 nm. The reflectance is flat within the wavelength region shown by the horizontal axis in FIG. 19 and is 85%.

Figure 20:
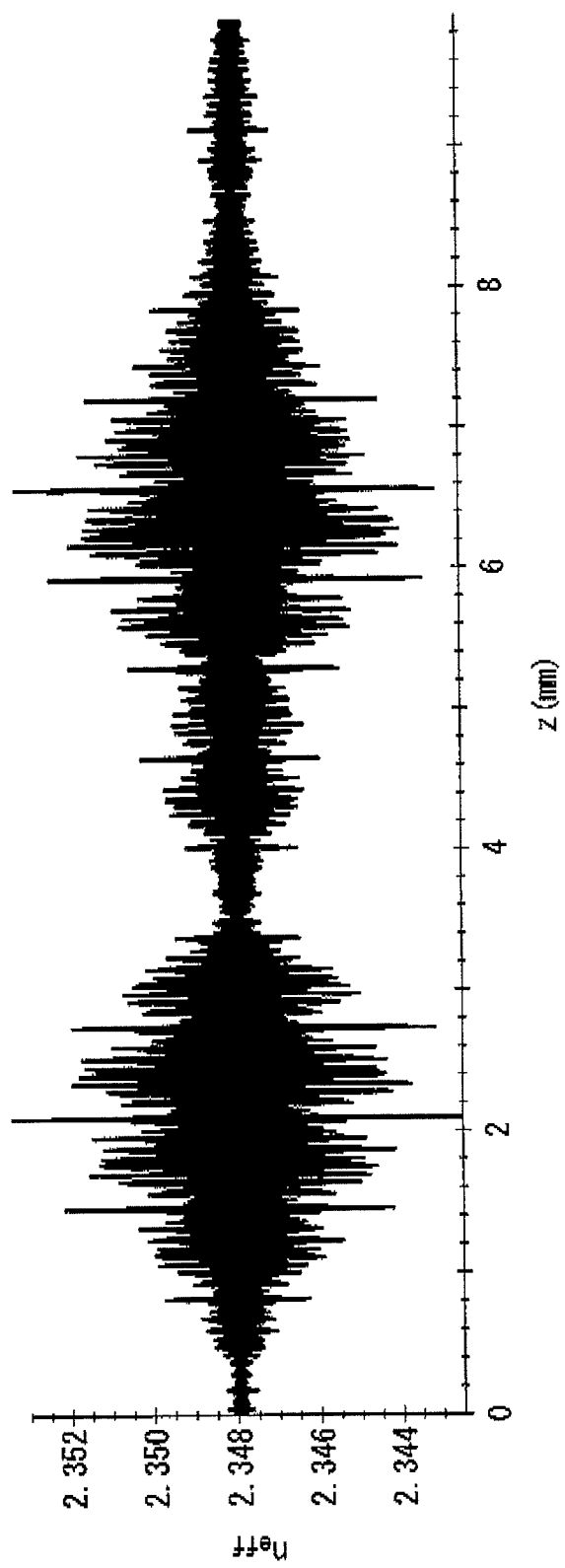
FIG. 20 is a graph showing an effective refractive index profile in Example 2 of a wavelength dispersion compensation element.

The length of the Bragg grating optical waveguide was 9.9 mm, and the effective refractive index profile shown in FIG. 20 was obtained. The peak distributed in the vicinity of z=2 mm and the peak distributed in the vicinity of z=6.5 through 7 mm were present in order to flatten the reflectance and group delay time in regions separate from the usage band. Accordingly, the Bragg grating length which contributes to changing the group delay time within the 20 GHz usage band at maximum corresponds to the distance differential between these two peaks, and is thought to be 5 mm or less. However, if the length required by an optical fiber Bragg grating having the equivalent functions is estimated based on the results shown in Non-patent document 1, then it is thought to be approximately 10 mm. Accordingly, according to the present example, the optical waveguide length required for wavelength dispersion compensation is shortened to less than half that required by an optical fiber Bragg grating.

Figure 21:
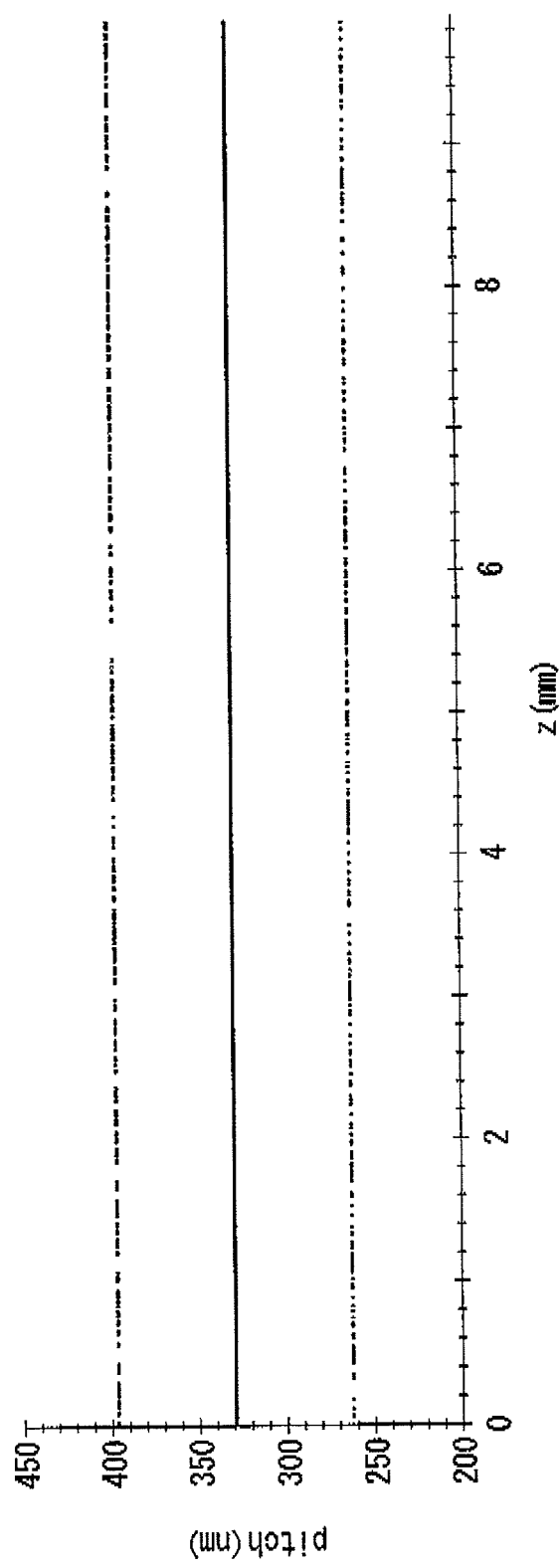
FIG. 21 is a graph showing a pitch distribution in Example 2 of a wavelength dispersion compensation element.

FIG. 21 shows changes in pitch over the entire length in a pitch range of 200 to 450 nm. In the same way as in FIG. 12, the frequency with which the pitch in the center is taken is the highest, and this forms the main pitch. Moreover, the average value of the minimum value (i.e., the next smaller discrete value from the center value) and the maximum value (i.e., the next larger discrete value from the center value) of the pitch within the vertical axis range shown in FIG. 21 coincides with the main pitch.

Figure 22:
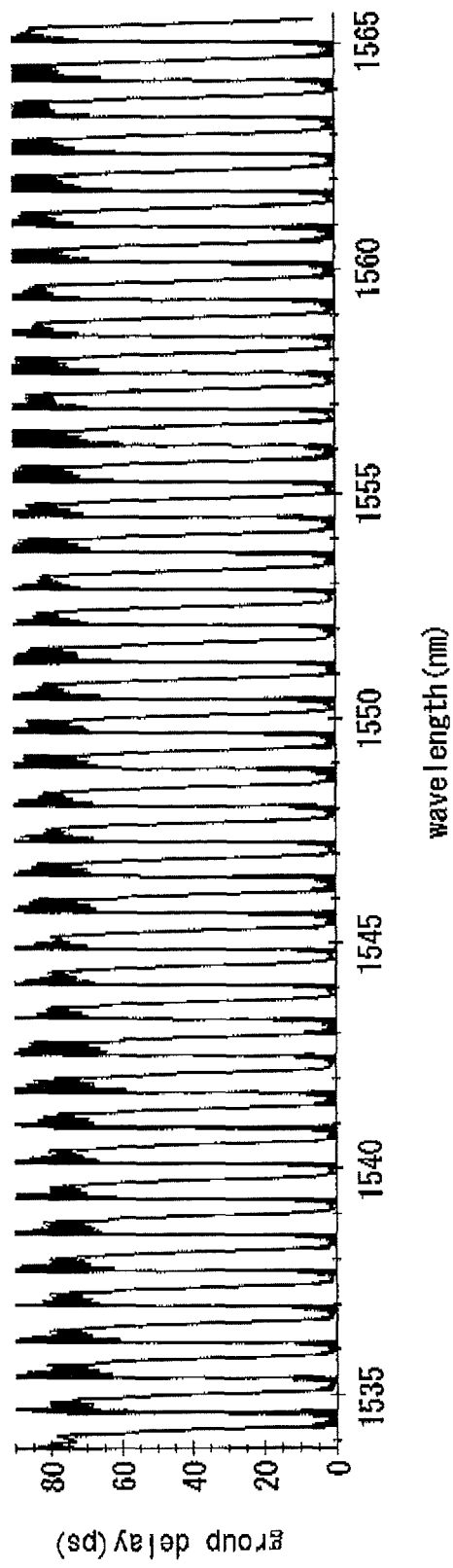
FIG. 22 is a graph showing a wavelength dependence of a group delay time obtained in Example 2 of a wavelength dispersion compensation element.

In the same way as in Example 1, by assigning the shape distribution of the effective refractive index supplied in FIG. 20 to the coupled mode equations of Formula 6 and Formula 7 and then solving these equations, the wavelength dispersion characteristics shown in FIG. 22 are obtained. If FIG. 22 is compared with FIG. 19, it can be seen that predetermined wavelength dispersion characteristics are reproduced.

In the same way as in Example 1, by deciding the dimensions of a Bragg grating optical waveguide from the relationships between $w_{in}$ and $w_{out}$ relative to the effective refractive index $n_{eff}$ shown in FIG. 7, it is possible to manufacture a small-size wavelength dispersion compensation element for the C band having reduced polarization dependence.

Example 3 of a Wavelength Dispersion Compensation Element

Next, in the same way as in Example 1, an example of a wavelength dispersion compensation element for an L band single channel designed in accordance with Steps [2] through [4] of Example 1 using a Bragg grating optical waveguide having the cross-sectional structure described in FIG. 5 is described as Example 3.

Figure 23:
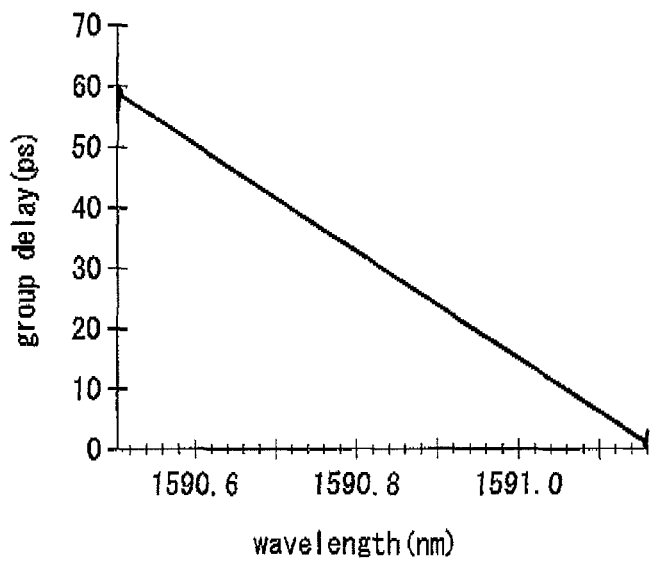
FIG. 23 is a graph showing a wavelength dependence of a group delay time determined in Example 3 of a wavelength dispersion compensation element.

The material forming the optical waveguide was the same as in Example 1. The intended optical fiber was a dispersion shifted fiber having a length of 30 km. The reflectance was 85% and the characteristics shown in FIG. 23 were specified for the wavelength dependence of the group delay time, so that a predetermined complex reflectance spectrum was obtained.

Figure 24:
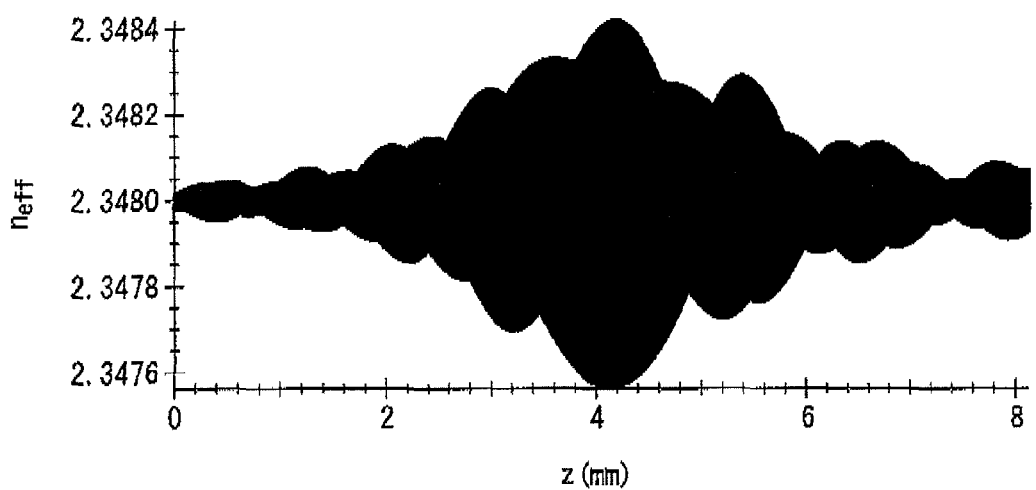
FIG. 24 is a graph showing an effective refractive index profile in Example 3 of a wavelength dispersion compensation element.

The length of the Bragg grating optical waveguide was 8.13 mm, and the effective refractive index profile (shape distribution) shown in FIG. 24 was obtained. The peak of the envelope curve of the changes in the effective refractive index in the effective refractive index profile shown in FIG. 24 was in the vicinity of z=4.2 mm.

Figure 25:
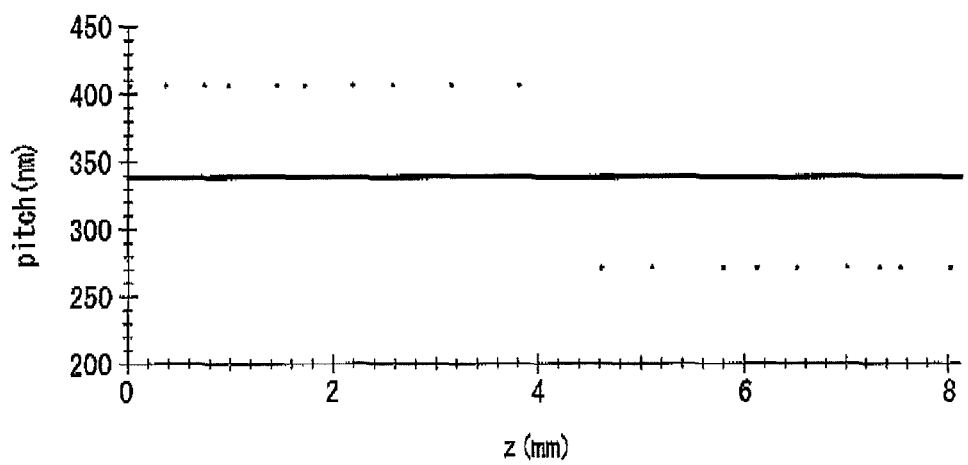
FIG. 25 is a graph showing a pitch distribution in Example 3 of the wavelength dispersion compensation element.

FIG. 25 shows changes in pitch over the entire length in a pitch range of 200 to 450 nm. In the case of the present example, the pitch takes only three values (discrete values outside the range of the vertical axis do not appear). In the same way as in FIG. 12, the frequency with which the pitch in the center (340 nm) is taken is the highest, and this forms the main pitch. Moreover, the maximum value (i.e., the next larger discrete value from the center value) is 68 nm bigger than the center value and the minimum value (i.e., the next smaller discrete value from the center value) is 68 nm smaller than the center value. The average value of the maximum value and the minimum value coincides with the center value which forms the main pitch.

As is shown in FIG. 25, on the front end side and the rear end side of the peak position of the effective refractive index, the trend of the discrete changes in pitch is inverted. On the front end side of the peak position, the pitch only takes two values, namely, the center value and the maximum value. In other words, a binary change is exhibited on the long wavelength side of the center value. In contrast, on the rear end side of the peak position, the pitch only takes two values, namely, the center value and the minimum value, and a binary change is exhibited on the short wavelength side of the center value. Wavelength dispersion compensation is possible by a pitch change Bragg grating which is simpler than chirped type of Bragg grating in which the pitch changes continuously. The Bragg grating of Example 1 may be thought to be constructed by combining a plurality of patterns to the pattern of the present example which is used as a foundation.

Figure 26:
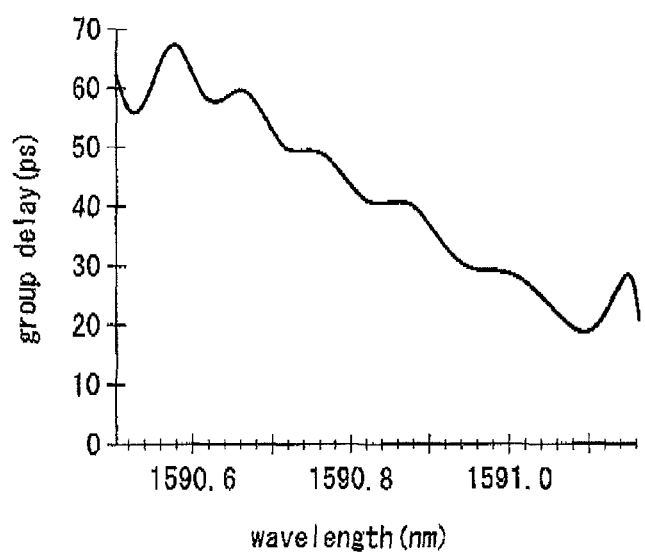
FIG. 26 is a graph showing a wavelength dependence of a group delay time obtained in Example 3 of a wavelength dispersion compensation element.

In the same way as in Example 1, by assigning the profile of the effective refractive index supplied in FIG. 24 to the coupled mode equations of Formula 6 and Formula 7 and then solving these equations, the wavelength dispersion characteristics shown in FIG. 26 are obtained. If FIG. 26 is compared with FIG. 23, it can be seen that predetermined wavelength dispersion characteristics are reproduced.

As a result of the above, it is possible to manufacture a wavelength dispersion compensation element which has reduced polarization dependence in a single wavelength channel within the L band. The manufacture of elements used in different wavelength bands can also be achieved by considering the characteristics of the wavelength dispersions that correspond to each wavelength band, and designing Bragg grating optical waveguides using the ideas of the present example.

[Method of Connecting a Wavelength Dispersion Compensation Element and an Optical Waveguide]

In the wavelength dispersion compensation elements of Examples 1 through 3, optical signals emitted from a Bragg grating optical waveguide are propagated in the opposite direction along the path of incident optical signals. Namely, because emitted signal light is propagated along the same path as incident signal light, a method of separating the emitted signal light from the incident signal light is required. In the present example, as is shown in FIG. 27, a description is given of the structure of a wavelength dispersion compensation element by connecting an optical circulator 102 to a wavelength dispersion compensation element 101, in which the element has a port where incident signal light is irradiated onto the wavelength dispersion compensation element, and a port where emitted signal light is extracted from the wavelength dispersion compensation element.

If the wavelength dispersion compensation element 101 of the present example corresponds to the wavelength dispersion compensation element of exemplary embodiments described herein, then the wavelength dispersion compensation element 101 of any of the Examples 1 through 3 may be used, or another element may be used. The optical circulator 102 is connected to the front end portion side of the wavelength dispersion compensation element 101. An incident optical fiber 103 that propagates incident signal light, a coupling optical fiber 104 that connects together the wavelength dispersion compensation element 101 and the optical circulator 102, and an emission optical fiber 105 that propagates emitted signal light are connected to the optical circulator 102.

Incident signal light is transferred by the optical circulator 102 from the incident optical fiber 103 to the coupling optical fiber 104, and is irradiated onto the wavelength dispersion compensation element 101. Emitted signal light that has been reflected inside the wavelength dispersion compensation element 101 is transferred from the coupling optical fiber 104 to the emission optical fiber 105 via the optical circulator 102. In order to reduce loss which is caused by the connection between the coupling optical fiber 104 and the wavelength dispersion compensation element 101, it is preferable for lens machining to be performed on the distal end of the coupling optical fiber 104 (i.e., the distal end thereof on the wavelength dispersion compensation element 101 side), or for a micro lens to be placed between the coupling optical fiber 104 and the wavelength dispersion compensation element 101, or for the coupling optical fiber 104 to be connected by adhesion to the front end portion of the Bragg grating optical waveguide of the wavelength dispersion compensation element 101. The loss created by the connection is, for example, approximately 1 dB. Because the loss within the optical circulator 102 is approximately 1 dB, the total optical loss created by the connections of the optical circulator 102 is approximately 2 dB.

Figure 27:
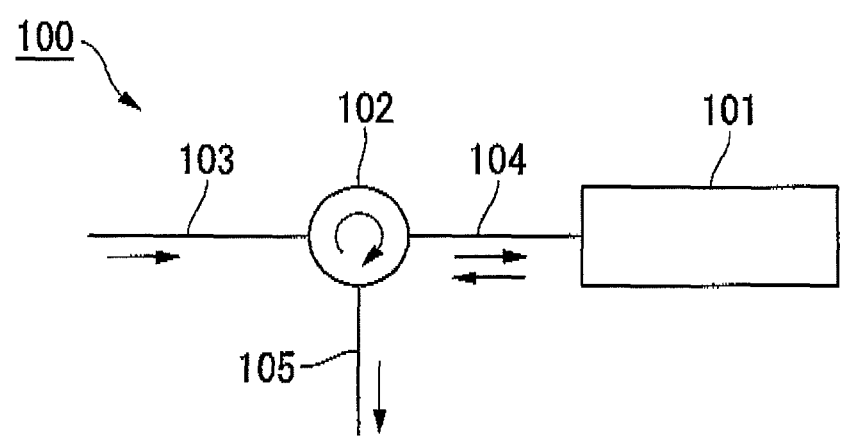
FIG. 27 is an explanatory view showing an example of a connection method for connecting a wavelength dispersion compensation element and an optical transmission path.

In order to install the structure 100 shown in FIG. 27 on an optical fiber transmission path that is intended for wavelength dispersion compensation, it is sufficient for the incident optical fiber 103 to be connected to the transmitter side of the optical fiber transmission path, and for the emission optical fiber 105 to be connected to the receiver side of the optical fiber transmission path. By doing this, it is possible to construct a small-sized wavelength dispersion compensation element that can be installed on an optical fiber transmission path, and that has a low level of optical insertion loss.

Example 1 of an Optical Filter

An optical filter having reflection bands in ten mutually different wavelength channels was constructed using the planar (substrate-type) optical waveguide in the above described Example 3 of a planar optical waveguide element. The method used to design the optical filter was made up of the following steps [1] to [4].

[1] The dimensions ($w_{in}/w_{out}$) of the cross-sectional structure of the optical waveguide core are specified, and the field distribution of the intrinsic mode of the TE-type polarization and TM-type polarization in the cross-section are calculated. These dimensions are then adjusted such that the effective refractive indices in the two polarizations are equal. $w_{in}/w_{out}$ are then decided such that polarization dependence is cancelled out in different effective refractive indices. The correspondence relationship between the effective refractive indices and $w_{in}/w_{out}$ are then obtained so that it is possible to decide the dimensions of the cross-sectional structure of the optical waveguide core from the effective refractive indices. This step is the design process for the cross-sectional structure of the optical waveguide core.

[2] The reflection characteristics desired for the optical filter are specified, and the necessary data required to determine the structure of the optical waveguide is obtained. What are specified as the reflection characteristics are the reflectance and phase in each wavelength. All of the frequency regions that include the desired reflection characteristics from the point of origin (i.e., from a frequency of 0 Hz) are included in the frequency range.

[3] The optical waveguide length is provided, and the shape distribution of the effective refractive index extending in the waveguide direction of the optical waveguide is derived from the complex field reflectance spectrum obtained in Step [2] using an inverse scattering problem solution. This step includes a calculation process to convert the complex field reflectance spectrum into a time response, however, this is a real number type of conversion.

Steps [2] and [3] form the Bragg grating pattern design process.

[4] Based on the correspondence relationships between the effective refractive indices and the cross-sectional dimensions of the optical waveguide core obtained in Step [1], the shape extending in the optical waveguide direction of the Bragg grating optical waveguide is decided from the shape distribution of the effective refractive index obtained in Step [3]. This step forms the optical filter design process.

Note that in the same way as in the above described wavelength dispersion compensation element design process, the order of these steps can also be switched.

Hereinafter, each step for designing an optical filter will be described in detail.

Step [1]

The cross-sectional structure of the waveguide is the same as that shown in FIG. 5.

If the effective refractive index of the TE polarization is regarded as the effective refractive index of the waveguide, then the graph shown in FIG. 7 is obtained when relationships between the effective refractive index and win and wout are calculated and plotted.

Step [2]

The optical characteristics of an optical filter having reflection bands in ten mutually different wavelength channels were specified. In optical communication, it is common for distinctions to be made between spectrum regions using frequency instead of wavelength. In the present example, hereinafter, the spectrum characteristics of an optical filter as a function of frequency will be discussed. A complex field reflectance spectrum R (v) is calculated from the reflectance and phase in each frequency. In an orthogonal coordinate system, R (v) is formed by a real number component and an imaginary number component, however, converting the coordinates into a polar coordinate system and splitting the complex field reflectance into a phase and absolute value of the field reflectance simplifies dealing with the optical filter characteristics. Therefore, as in the following Formula A, the complex field reflectance is expressed using a polar coordinate display.

[Expression 17]

$$R(v) = |R(v)| \exp[-\phi(v)] \quad \text{(Formula A)}$$

Here, R is the electric field, ν is the frequency, |R (ν)| is the absolute value of the field reflectance, and φ (ν) is the phase. The absolute value of the reflectance is normalized as 1 (namely 100%). The absolute value of the field reflectance is set to 0.95 (i.e. 95%) such that the power reflectance $|R(\nu)|^2$ becomes 0.9 (90%), within the reflection band of each channel.

Figure 28:
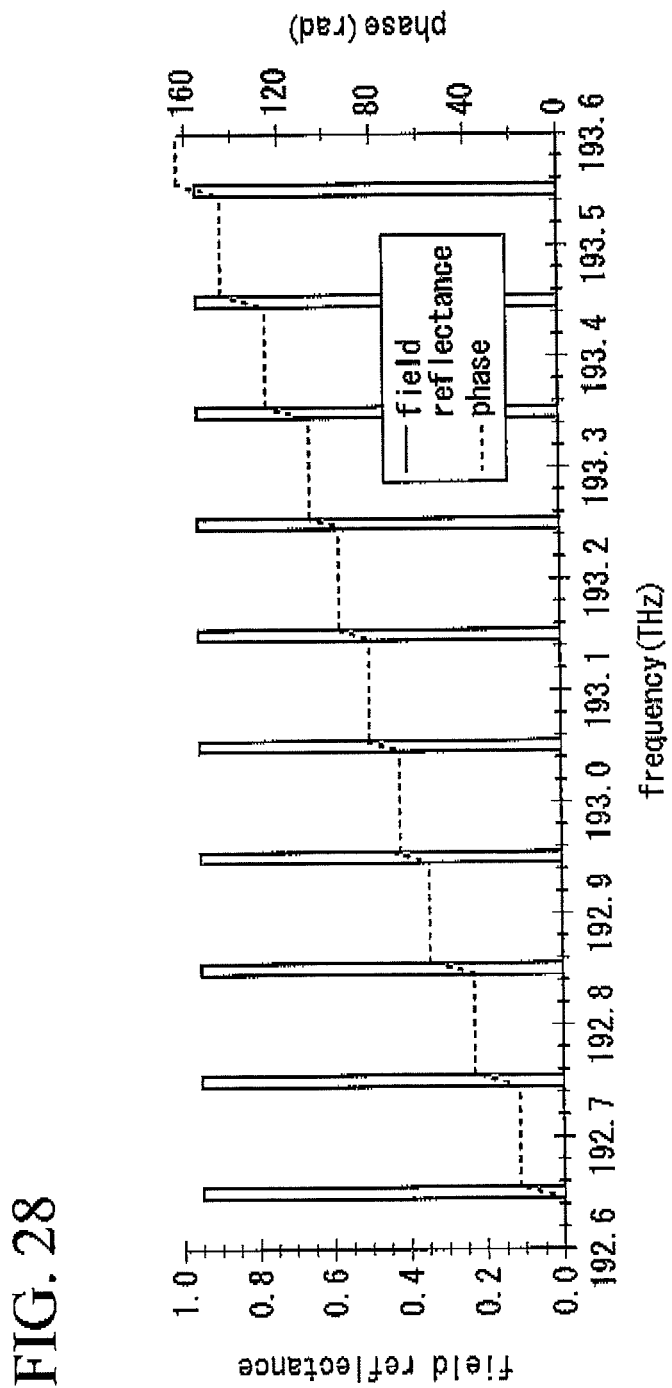
FIG. 28 is a graph showing optical characteristics specified for Example 1 of an optical filter.

In the optical filter of the present example, the wavelength dispersion in the reflection band of each channel is set to zero. If the wavelength dispersion is zero, the phase forms a linear function relative to the frequency. As a result of the above, the optical characteristics specified for the optical filter of the present example are shown in FIG. 28. In FIG. 28, the left vertical axis shows the absolute value of the field reflectance |R (ν)|, the right vertical axis shows the phase φ (ν), and these are plotted respectively by a solid line and a broken line. The horizontal axis shows the frequency ν in units of THz, and specifies optical characteristics by dividing the frequency from 192.6 THz to 193.6 THz into ten equal channels at intervals of 0.1 THz. The center frequency is 193.1 THz. If this is converted into a center wavelength, it becomes 1552.52 nm. The spectrum width of the reflection band in each channel is 0.01 THz, and it can be seen that the phase changes linearly within this range.

If the spectrum shape of the rectangular reflection band of each channel, such as those shown in FIG. 28, is converted into a time waveform using an inverse Fourier transform, a sinc function type of impulse waveform is obtained. If the width of the spectrum of the reflection band is taken as Δν, then the main peak of the sinc function type impulse waveform is contained within a time region of approximately Δt=3/(Δν). Accordingly, in an optical waveguide that generates a reflection band in each channel shown in FIG. 28, the propagation time that is required between when light is incident and when it is reflected must be approximately Δt or even greater than this. The phases, which change linearly within the frequency region of each reflection band shown in FIG. 28, reflect phase delays which are caused by this propagation time.

FIG. 28 only displays the frequency bands in the vicinity of channels where a reflection band is present. All of the frequency bands in which a reflection channel is present from the point of origin (i.e., from 0 THz) are included as desired optical characteristics in the optical characteristics being target of an inverse scattering method. However, because no reflection channels are present in frequency regions outside those shown in FIG. 28, the value of the field reflectance is zero.

Step [3]

The effective refractive index distribution in the waveguide direction of the optical waveguide forming an optical filter is derived based on the inverse scattering problem solution. This procedure is described in Step [3] in the design direction of the above described wavelength dispersion compensation element.

When specifying the entire length of the optical waveguide, the optical path length in accordance with Δt in Step [2] is taken as the minimum value, and the specification is made based on the loss and allowable dimensions of the optical waveguide. After the optical waveguide length has been specified, the potential q (z) is determined using an inverse scattering problem solution. q (z) is assigned to the above described Formula 10, and the effective refractive index distribution $n_{eff}$ (z) is obtained. Here, the conversion which is used when an impulse response is derived from the complex reflectance spectrum R (ν) is a real number type.

As a result of this, the q (z) which is obtained from the above described Formula 15 is also a real number, and an effective refractive index distribution for an amplitude modulation-type Bragg grating is obtained in which the amplitude of the Bragg grating changes and the phase changes incidentally to the amplitude. A definition of amplitude modulation in the present invention is given below.

Figure 29:
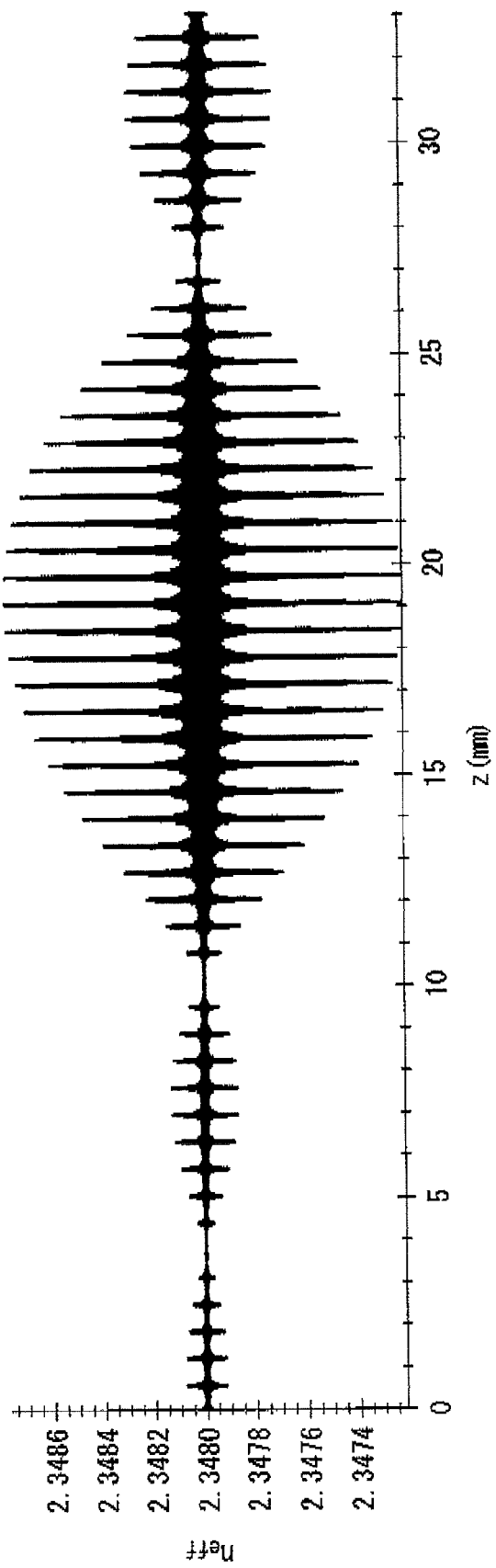
FIG. 29 is a graph showing an effective refractive index profile in Example 1 of an optical filter.
Figure 30:
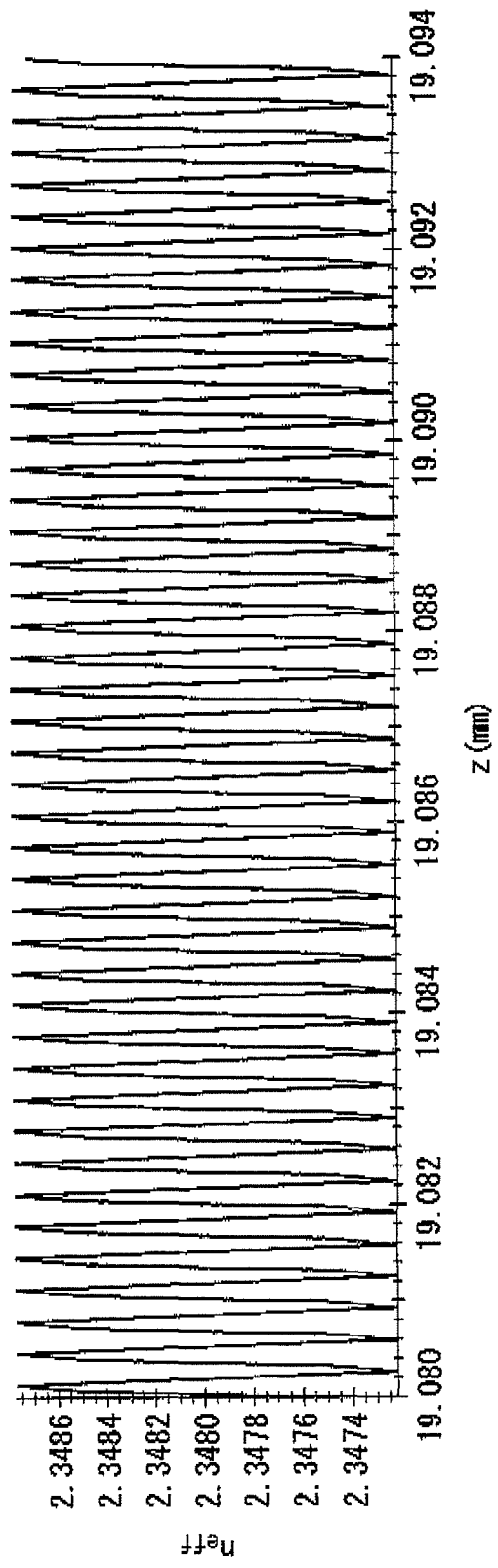
FIG. 30 is a graph showing an enlargement of a portion of the effective refractive index profile shown in FIG. 29.

$n_{eff}$(z) is plotted in FIG. 29 and FIG. 30. The horizontal axis z shows coordinates in the optical waveguide direction. z=0 mm is the starting end of the Bragg grating optical waveguide, and z=33.0605 mm is the finishing end thereof. $n_{av}$ which corresponds to the average value of the refractive index distribution of the grating optical waveguide is 2.348 in the present example.

FIG. 30 shows an enlargement of the effective refractive index distribution shown in FIG. 29 for a portion of the optical waveguide. It can be seen that $n_{eff}$ oscillates at a cycle of half the value obtained by dividing the center wavelength (1552.52 nm), which corresponds to the center frequency (193.1 THz), by $n_{av}$, so as to exhibit a pattern that regulates the Bragg grating.

One of the features of the amplitude modulation-type Bragg grating of the present invention is that the coding of the gradient of the envelope curve of the amplitude of the Bragg grating is inverted. Namely, in the present invention, the change when the coding of the gradient of the envelope curve of the amplitude of the Bragg grating is inverted is known as amplitude modulation.

The coding inversions exhibit precipitous stepped changes or non-continuous changes that are generated at a single isolated coordinate point, and the characteristic of a sampled Bragg grating that a waveguide region where the amplitude changes continuously to zero is interposed between two points at which the coding is inverted is not shown. In the amplitude modulation-type grating of the present invention, because the amplitude only becomes zero at an isolated coordinate point where the coding of the gradient of the envelope curve is inverted, essentially, there are no regions where the amplitude is zero. Accordingly, it is possible for the waveguide length to be made shorter than in a sampled Bragg grating.

A plurality of isolated coordinate points where the coding of the gradient of the envelope curve is inverted are present on the waveguide. In each of these coordinate points, a non-continuous change in the phase is generated incidentally. The pitch changes if the phase changes non-continuously. Consequently, the pitch takes on a value which is different from half the value obtained by dividing the center wavelength at that coordinate point (1552.52 nm) by $n_{av}$. The accuracy with which the coordinate point where the coding of the gradient of the envelope curve is inverted is specified depends on the discretized interval of the coordinate z of the waveguide which is shown by the horizontal axis. If this interval is taken as ΔP, then the accuracy for specifying the coordinate point is within a range of ±ΔP.

In this manner, in the amplitude modulation-type Bragg grating of exemplary embodiments, the coding of the gradient of the envelope curve of the amplitude of the Bragg grating is inverted so that, as a result, coordinate points are present where the pitch changes discretely. The pitch is determined by extracting all of the maximum values of the changes in the effective refractive index that regulate the pattern of the Bragg grating, and using the distance between respective adjacent maximum values as the pitch. The pitch value where the frequency of occurrence is the highest is the main pitch or pitch center value, and corresponds to half a value determined by dividing the center wavelength (1552.52 nm) by $n_{av}$. In the present example, the main pitch is approximately 401.2 nm. The discrete changes in the pitch take ΔP as the minimum unit of change, and take the amount of increase or decrease from the main pitch as an integer multiple of ΔP. Accordingly, the amount of discrete change in the pitch changes in accordance with any changes in the discretized interval of the coordinates on the waveguide shown on the horizontal axis.

The discrete changes in the pitch are the feature that they do not appear in a chirped Bragg grating. In a chirped Bragg grating, the pitch changes continuously in the light waveguide direction. In a chirped Bragg grating, the amplitude of the Bragg grating also changes at the same time. However, the changes in the amplitude are confined to being used for achieving secondary characteristics such as apodization. Important characteristics such as the phase characteristics and number of channels of the filter reflection spectrum are achieved by changing the frequency of the Bragg grating in the light waveguide direction. In the present step, it is not possible to construct a chirped Bragg grating. In order to construct a chirped Bragg grating, it is necessary to switch the conversion from the complex reflectance spectrum R (v) to a time response (an impulse response) to a complex number type of conversion. As a result of this, the q (z) obtained from Formula 15 becomes a complex number. If q (z) is a complex number, then when $n_{eff}(z)$ is determined from q (z), because $n_{eff}(z)$ is a real number, it is necessary for only the real portion of q (z) to be used. Accordingly, an amplitude modulation type of Bragg grating has a different design method from that used for a chirped Bragg grating and the two are classified into mutually different categories. Because it is contrasted with an amplitude modulation type, a chirped Bragg grating is classified as what is known as a frequency modulation type.

Step [4]

Based on a correspondence relationship between the effective refractive index $n_{eff}$ and the dimensions $w_{in}$ and $w_{out}$ of the optical waveguide prepared in Step [1], the effective refractive index distribution $n_{eff}(z)$ obtained in Step [3] was converted into distribution data (i.e., profile) of $w_{in}$ and $w_{out}$. When the effective refractive index was determined by using the correspondence relationship shown in FIG. 6A and FIG. 6B, $w_{out}$ and $w_{in}$, which are the dimensional parameters to be decided, were determined. As is shown in FIG. 30, the Bragg grating pattern in the effective refractive index distribution has a sinusoidal shape.

In a pattern transfer process which is based on dry-etching and lithography using an optical mask, if a rectangular wave type of shape is employed in which a repeated combination of spaces whose lines, which have a fixed width, and widths change in accordance with the pitch is arranged, there are few fluctuations in the shape after the dry etching. Therefore, after profile data for the optical waveguide dimensions $w_{out}$ and $w_{in}$ has been obtained from the profile of the effective refractive index profile, it is converted into a rectangular wave-shaped profile. However, in this conversion to a rectangular wave shape, the following two restrictions must be observed.

(1) In the present example, the line width is fixed at 140 nm. In contrast, the spaces change in accordance with the pitch of the grating. A larger value than the threshold value of the machining accuracy is set for the line width.

(2) The line amplitude of the rectangular wave shape is adjusted so as to match the core area covered by the sinusoidal Bragg grating pattern.

Figure 31:
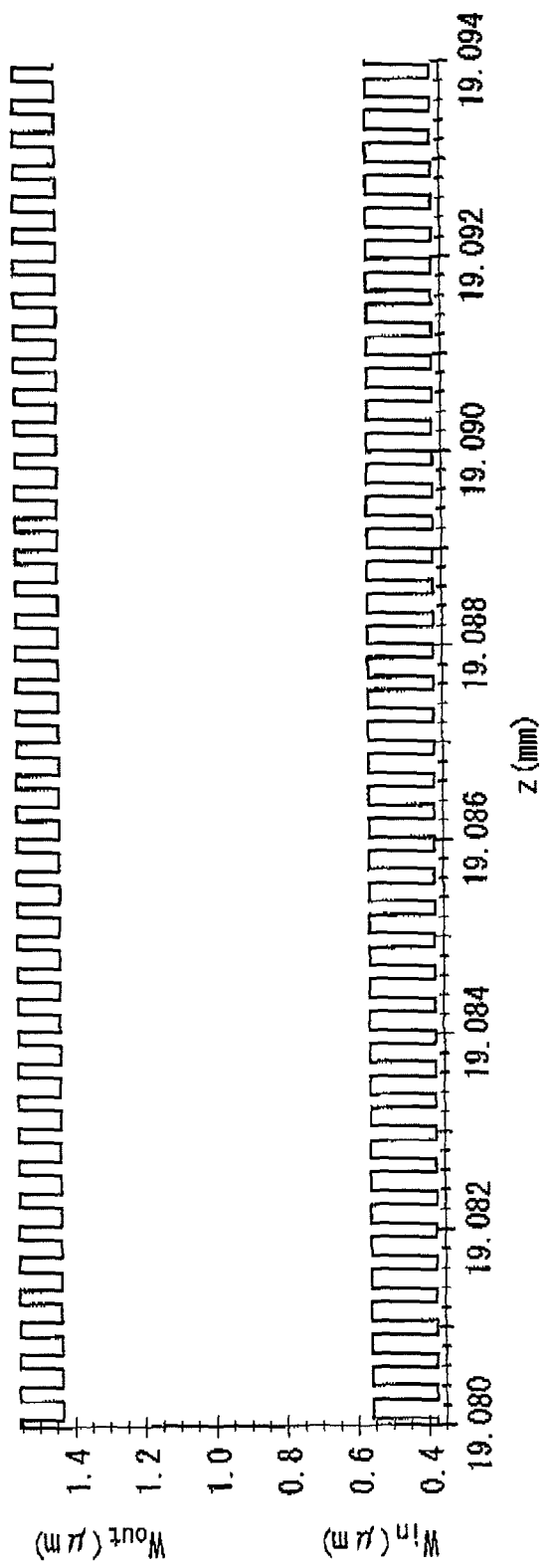
FIG. 31 is a graph showing an enlargement of a portion of the optical waveguide dimension profile in Example 1 of an optical filter.

In accordance with the above flow, the profiles of $w_{out}$ and $w_{in}$ shown in FIG. 31 are obtained. The range of the horizontal axis in FIG. 31 is in the same region as the horizontal axis in FIG. 30.

Applications for the optical filter of the present example include, for example, using it to extract, as non-polarization dependent reflection light, only the signal light of wavelength-multiplexed channels after this light has passed through the optical amplifier, and to remove spontaneous emission optical noise which is present in wavelength regions adjacent to the signal light. Note that the number of channels, the channel intervals, and the spectrum width of the reflection band are not limited to the numerical values of the present example, and the optical filter can be designed with the optimum numerical values specified in accordance with the application.

Example 2 of an Optical Filter

The present example is an example of the design of a beam splitter having a power reflectance of approximately 40%. A beam splitter can be used in applications to split the signal light of each channel into two paths.

The design method of this beam splitter is performed in the same way as that performed for the optical filter of Example 1, other than the power reflectance parameters being altered.

Figure 32:
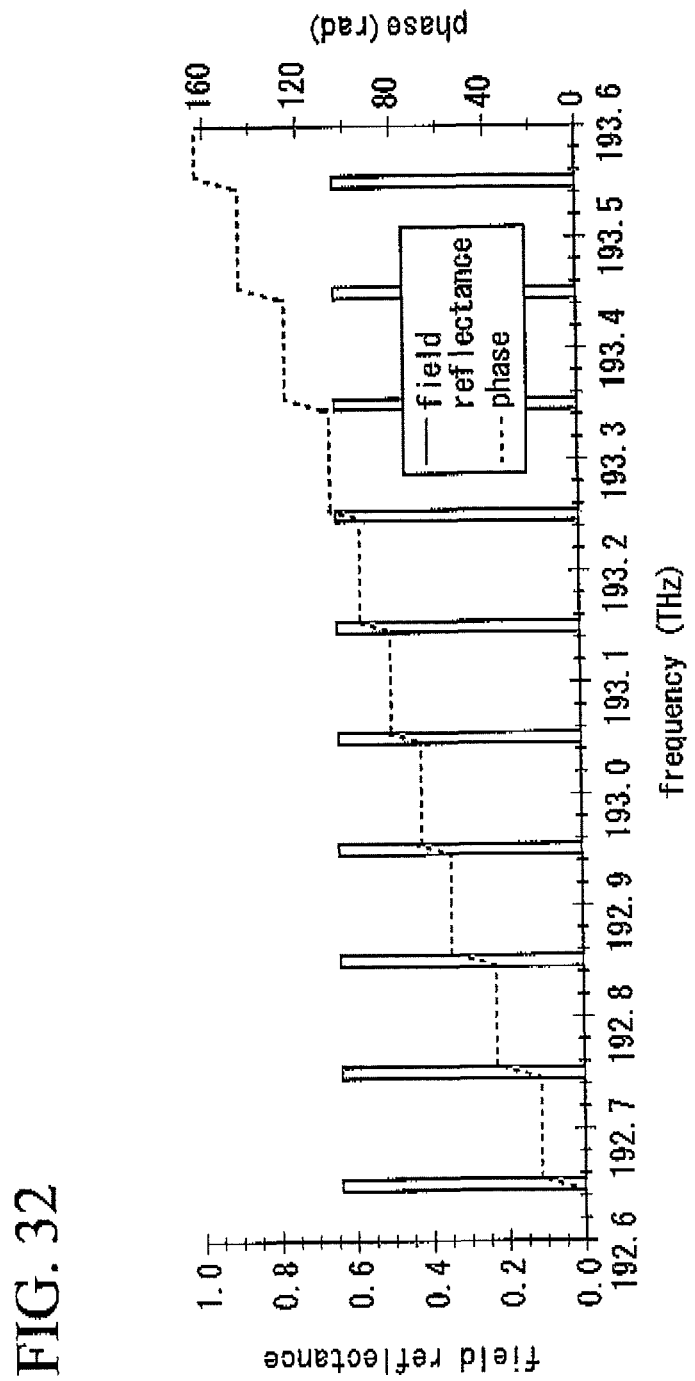
FIG. 32 is a graph showing optical characteristics specified for Example 2 of an optical filter.

The design steps of the present example as well comprise four steps in the same way as in Example 1. The same correspondence relationship between the effective refractive index and $w_{in}$ and $w_{out}$ in Step [1] as that of Example 1 is used here. In Step [2], the absolute value of the field reflectance is set to 0.64 (i.e. 64%) such that the power reflectance within the reflection band of each channel, becomes 0.4 (40%). The wavelength dispersion in the reflection band of each channel is set to zero. The optical characteristics specified for the optical filter of the present example are shown in FIG. 32. In the same way as in Example 1, the optical characteristics are specified by dividing the frequency from 192.6 THz to 193.6 THz into ten equal channels at intervals of 0.1 THz.

The center frequency is 193.1 THz. The spectrum width of the reflection band in each channel is 0.01 THz, and it can be seen that the phase changes linearly within this range.

Figure 33:
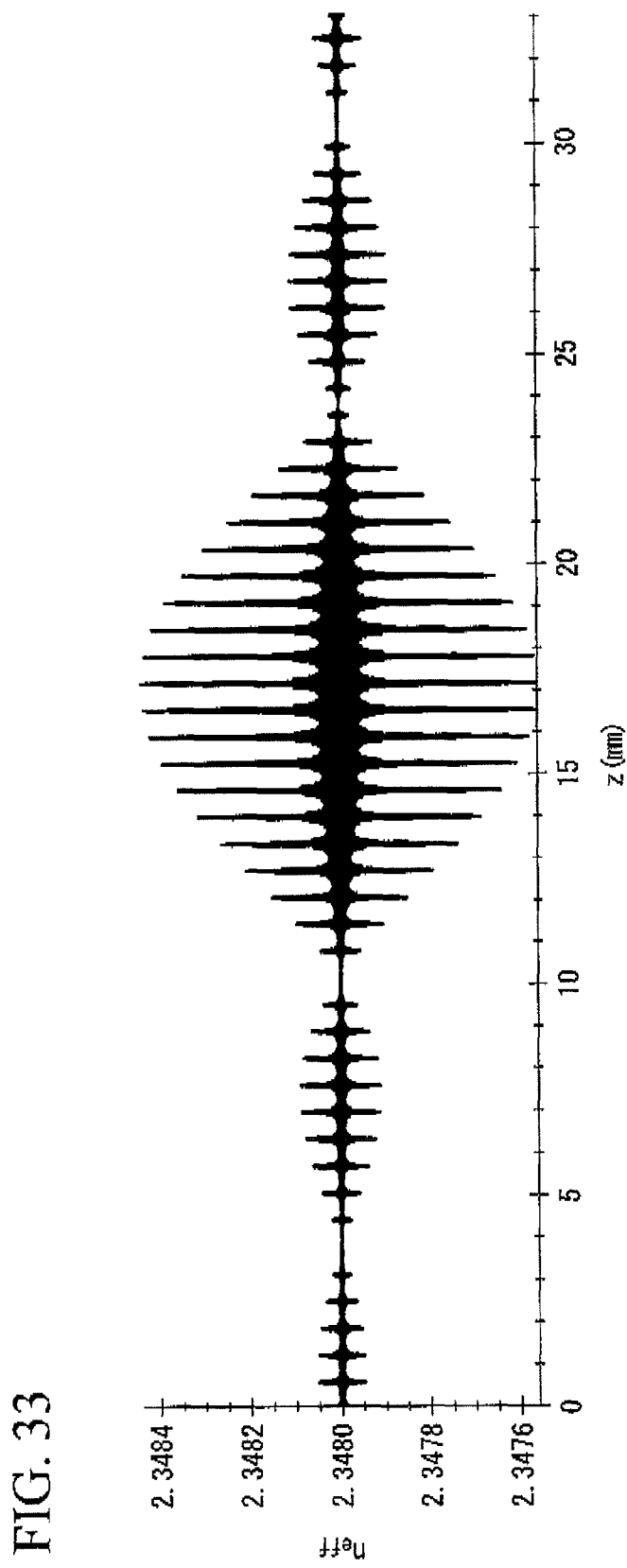
FIG. 33 is a graph showing an effective refractive index profile in Example 2 of an optical filter.
Figure 34:
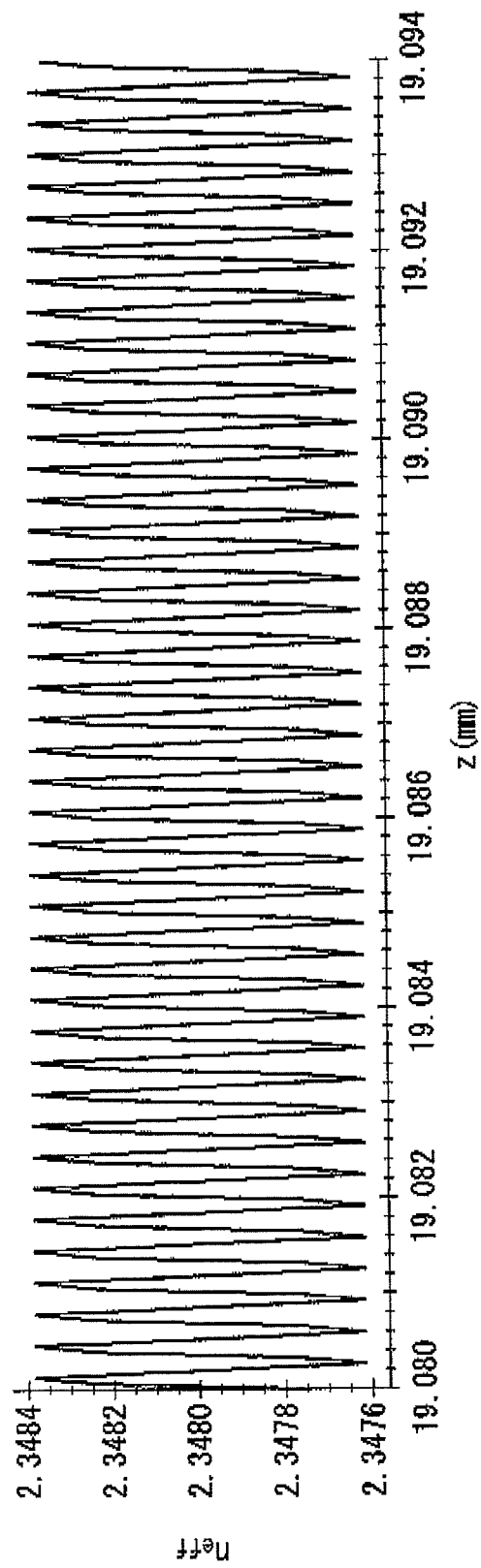
FIG. 34 is a graph showing an enlargement of a portion of the effective refractive index profile shown in FIG. 33.
Figure 35:
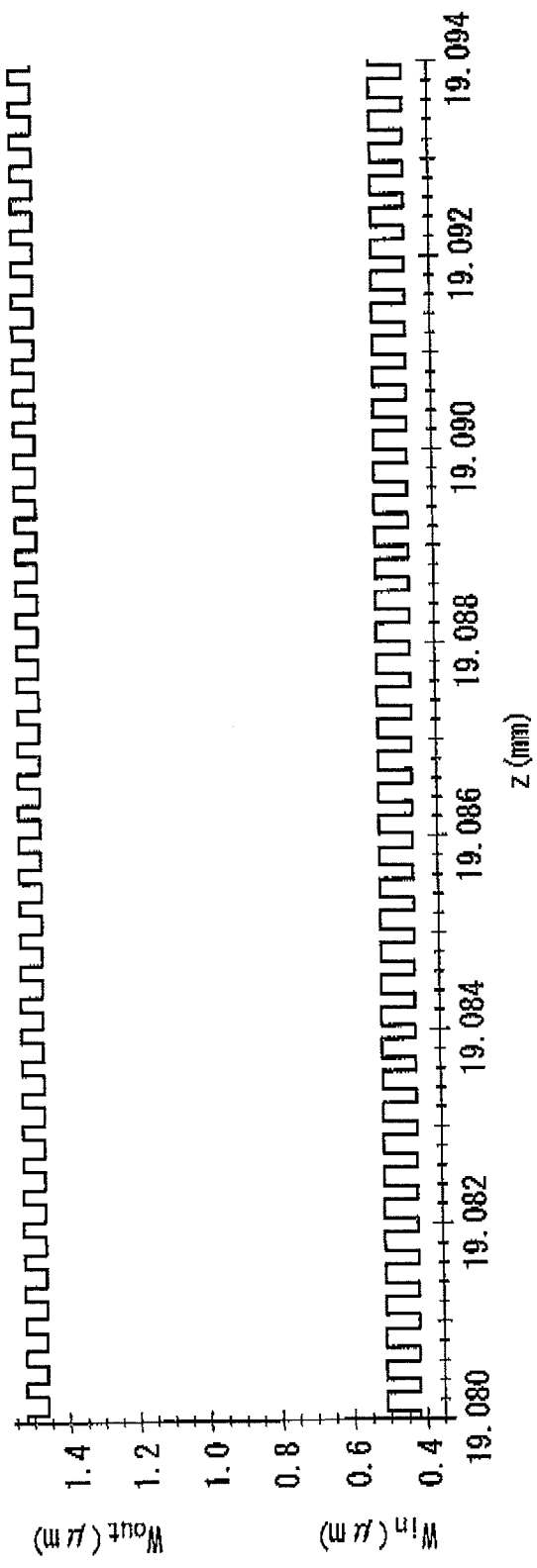
FIG. 35 is a graph showing an enlargement of a portion of the optical waveguide dimension profile in Example 2 of an optical filter.

The effective refractive index profile of the waveguide derived in Step [3] is shown in FIG. 33 and FIG. 34. The rectangular wave-shaped $w_{in}$ and $w_{out}$ profiles obtained in Step [4] are shown in FIG. 35.

Example 3 of an Optical Filter

Figure 36:
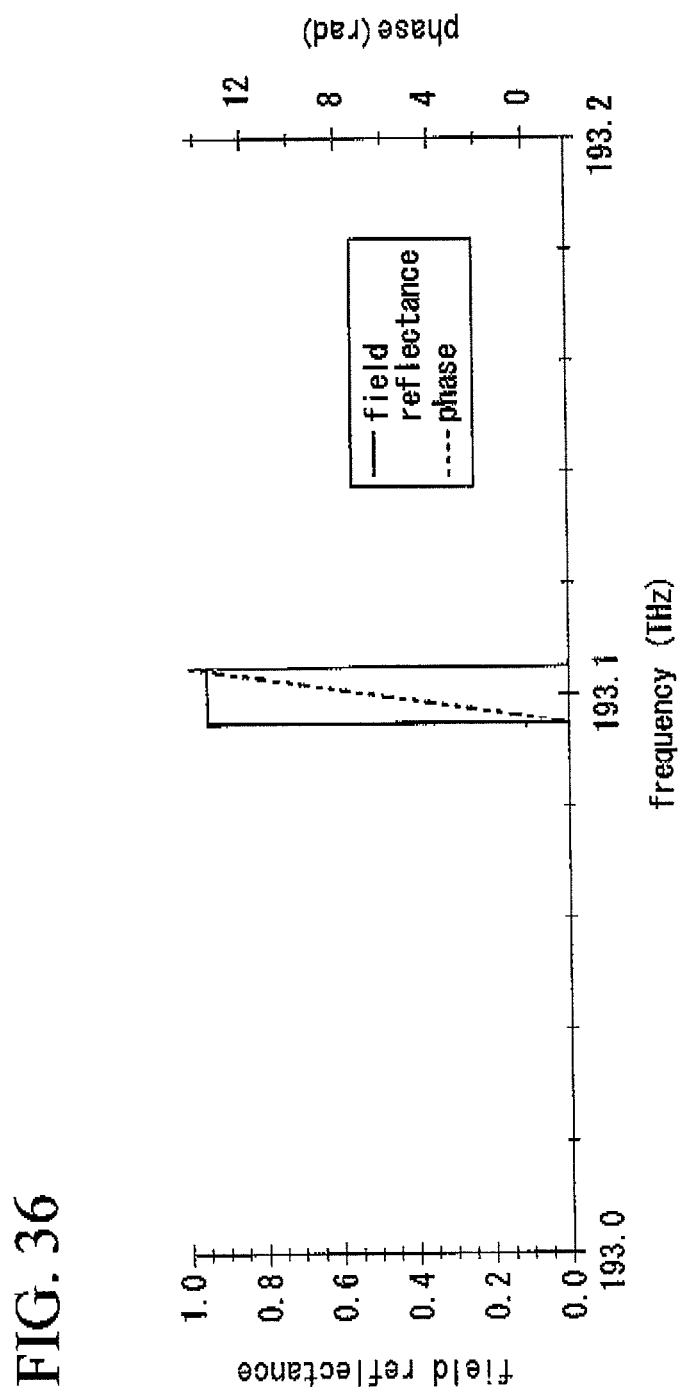
FIG. 36 is a graph showing optical characteristics specified for Example 3 of an optical filter.

The present example is an example of the design of an optical filter having a single reflection band. The design steps are the same as in Examples 1 and 2. The power reflectance of the reflection band is set to approximately 90%. The correspondence relationship between the effective refractive index and $w_{in}$ and $w_{out}$ is identical to Examples 1 and 2. The specified optical characteristics are shown in FIG. 36. The spectrum width of the reflection band is 0.01 THz.

Figure 37:
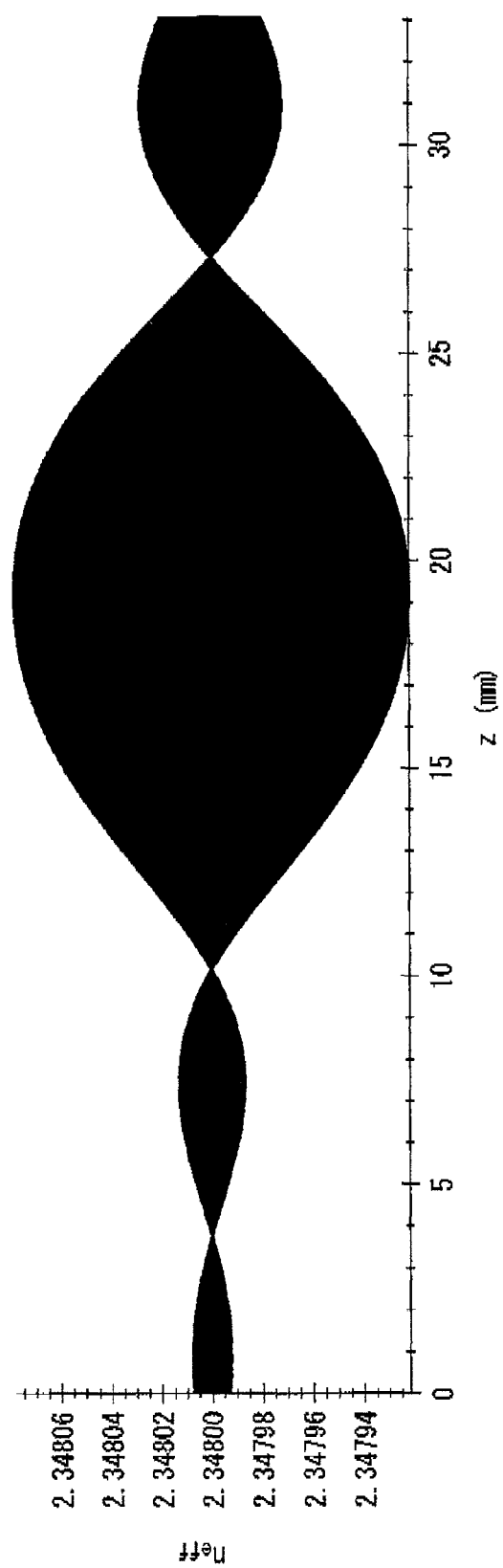
FIG. 37 is a graph showing an effective refractive index profile in Example 3 of an optical filter.
Figure 38:
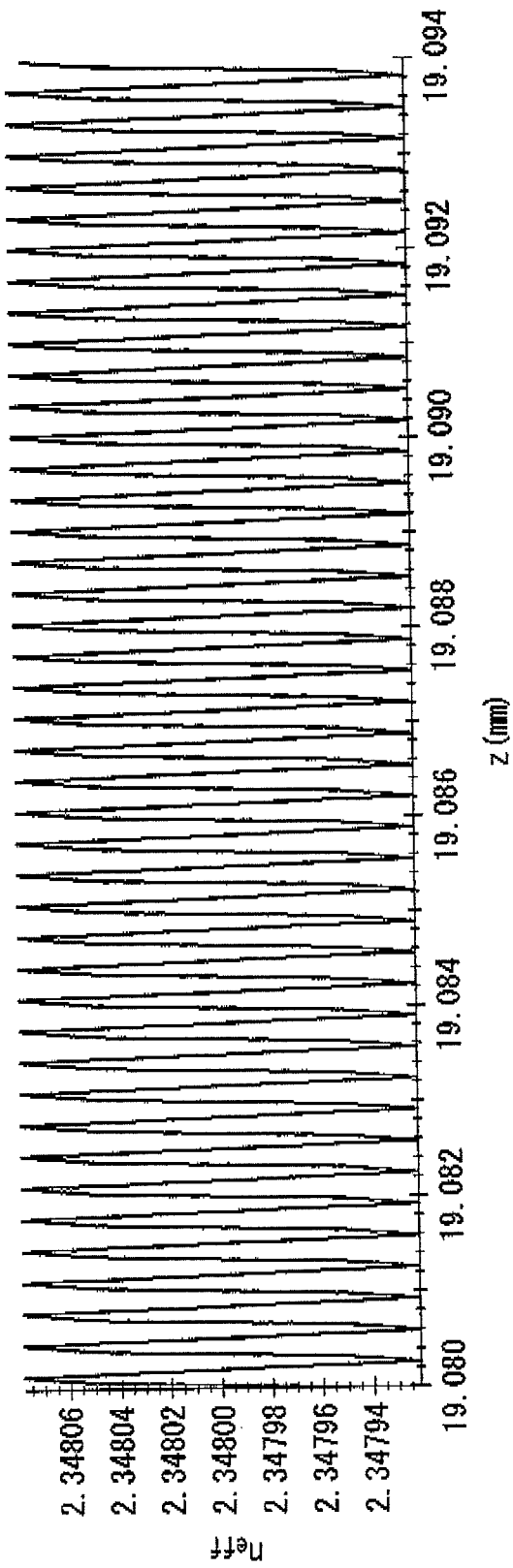
FIG. 38 is a graph showing an enlargement of a portion of the effective refractive index profile shown in FIG. 37.
Figure 39:
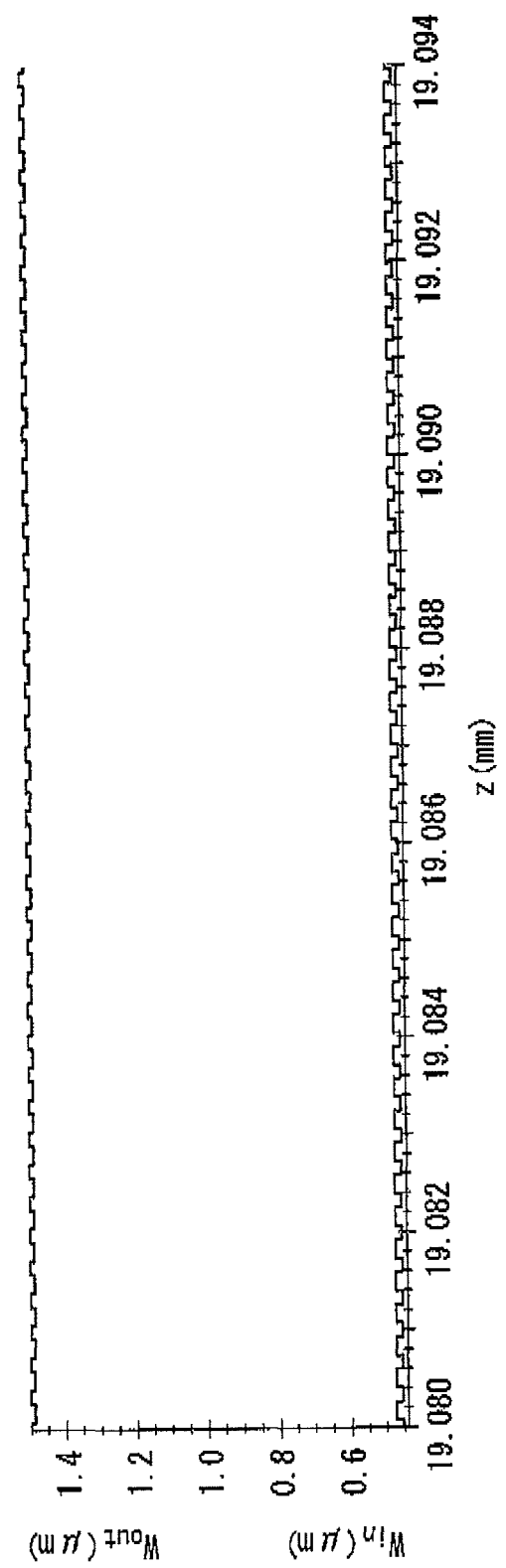
FIG. 39 is a graph showing an enlargement of a portion of the optical waveguide dimension profile in Example 3 of an optical filter.

The effective refractive index distribution derived based on an inverse scattering problem solution using these optical characteristics is shown in FIG. 37 and FIG. 38. The results obtained when the effective refractive index was converted to a rectangular wave-shaped profile are shown in FIG. 39. The optical filter of the present example can be used to extract signal light of a single specific channel as reflection light.

Note that the spectrum width of the reflection band is not limited to 0.01 THz and it is also possible to design an optical filter with an optional width specified arbitrarily.

Example 4 of an Optical Filter

The present example is an example of the design of an interleaver for a wavelength channel having intervals of 0.1

Figure 40:
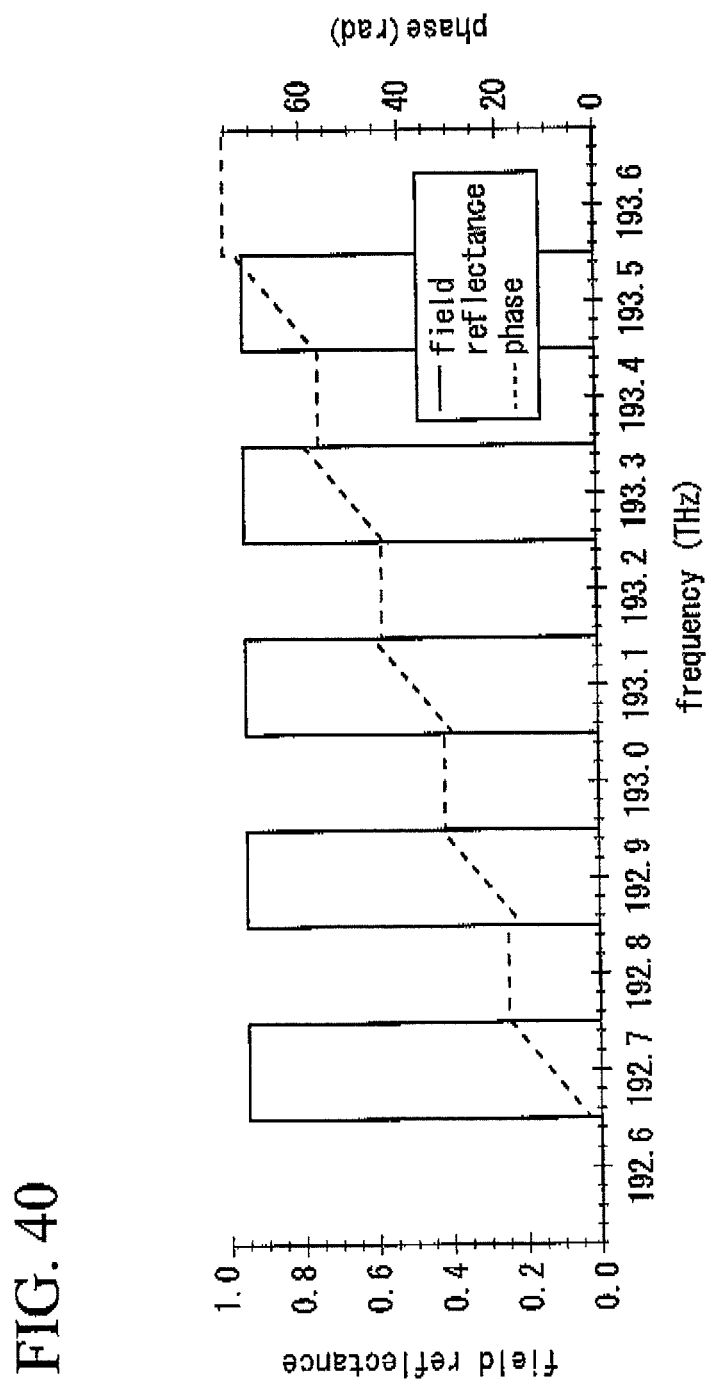
FIG. 40 is a graph showing optical characteristics specified for Example 4 of an optical filter.
Figure 41:
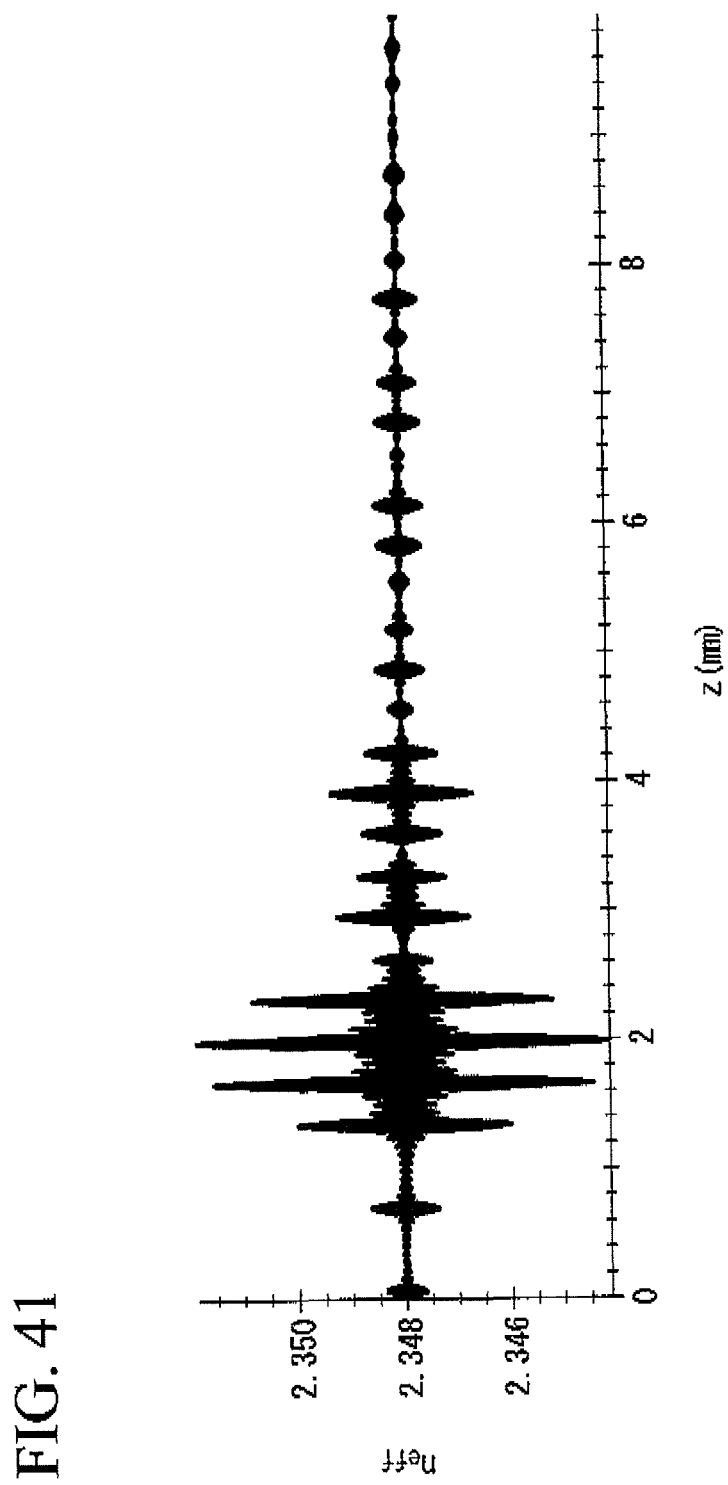
FIG. 41 is a graph showing an effective refractive index profile in Example 4 of an optical filter.
Figure 42:
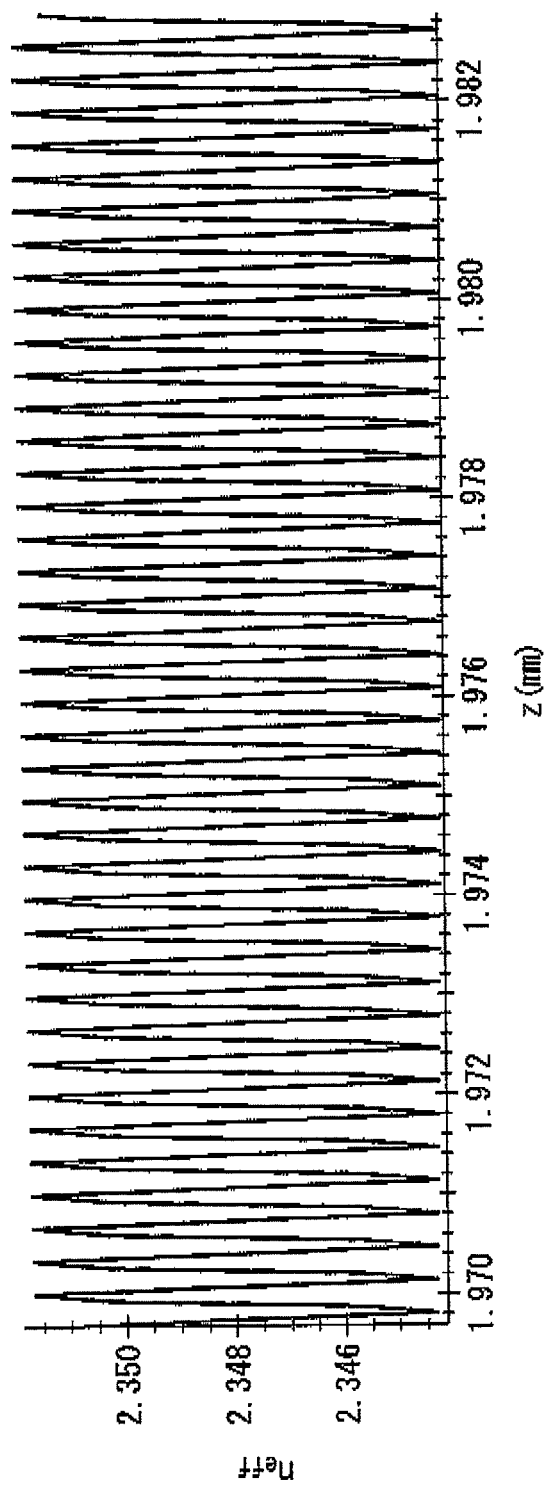
FIG. 42 is a graph showing an enlargement of a portion of the effective refractive index profile shown in FIG. 41.
Figure 43:
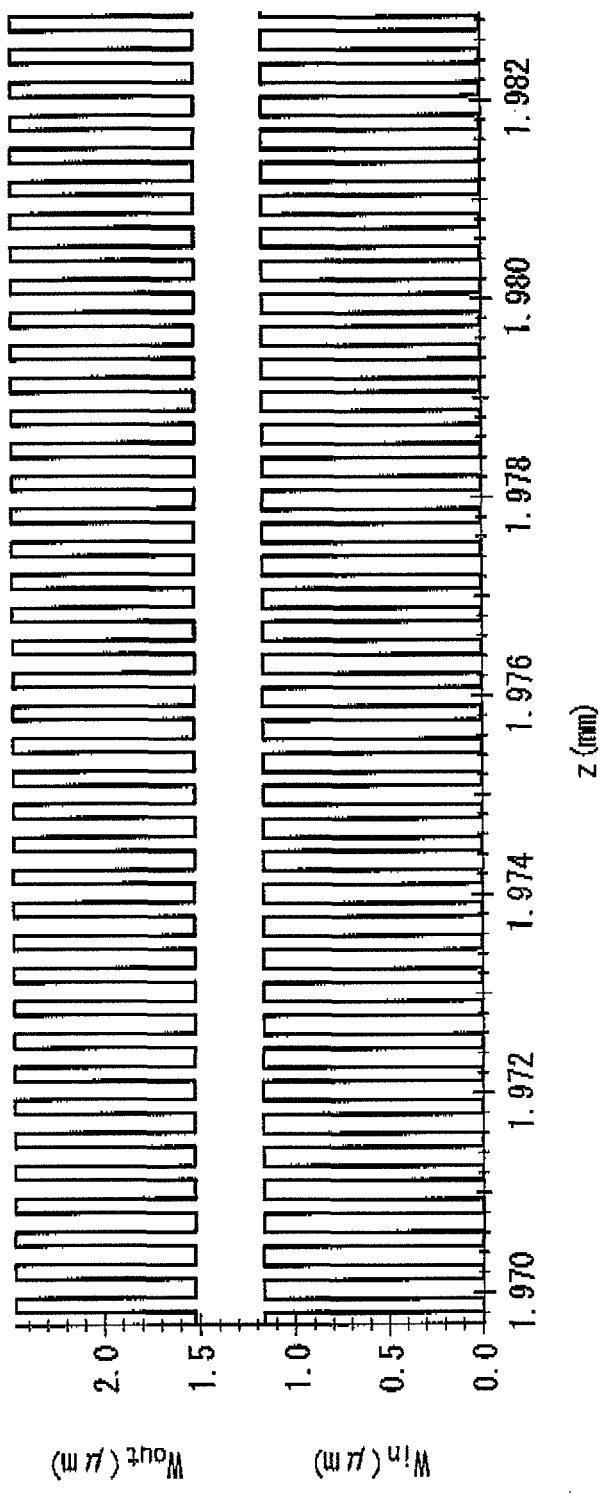
FIG. 43 is a graph showing an enlargement of a portion of the optical waveguide dimension profile in Example 4 of an optical filter.

THz. In the present example, an optical filter is designed with the channel interval set to 0.2 THz, and with the width of the reflection band of each channel set to 0.1 THz. The specified optical characteristics are shown in FIG. 40. The effective refractive index distribution derived based on an inverse scattering problem solution using these optical characteristics is shown in FIG. 41 and FIG. 42. The results obtained when the effective refractive index was converted to a rectangular wave-shaped profile are shown in FIG. 43.

The optical filter (i.e., the interleaver) of the present example is able to split the signal light of each channel having an interval of 0.1 THz into two paths made up of odd-numbered and even-numbered channels.

[Optical Resonator]

Figure 44:
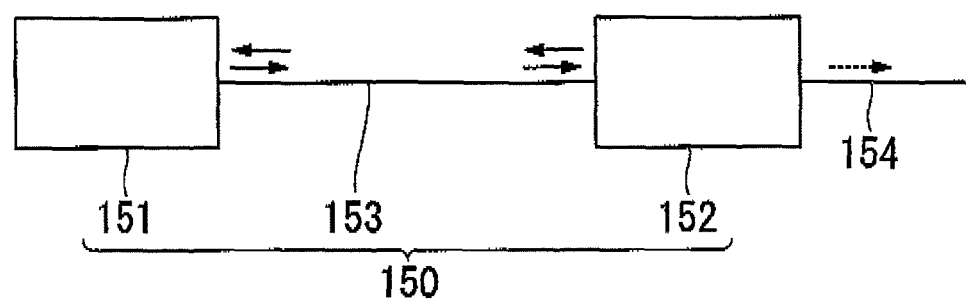
FIG. 44 is a typical view showing an example of the structure of an optical resonator.

As is shown in FIG. 44, an optical resonator 150 has a structure in which optical waveguides which are formed by reflection mirrors 151 and 152 (i.e., a first optical waveguide 151 and a second optical waveguide 152) are placed at the two ends thereof, and a third optical waveguide 153 which includes an optical resonator medium is sandwiched between the reflection mirrors 151 and 152. In the present invention, the first optical waveguide 151, the third optical waveguide 153, and the second optical waveguide 152 are connected together in series so that a single planar optical waveguide is formed, and optical waveguides that have a Bragg grating pattern and that have a reflection function are used for the reflection mirrors 151 and 152 at the two ends thereof. The designing of an optical waveguide having a reflection function can then be achieved in accordance with the above described optical filter design method by setting the desired reflection characteristics. The third optical waveguide 153 which is formed by an optical resonator medium may also have a predetermined optical path length in order for light to resonate between the reflection mirrors 151 and 152.

Because it is desirable to extract light to the outside of the resonator, the reflectance of at least one mirror is lower than 1 (i.e., 100%). For example, as is shown in FIG. 44, in order to emit a portion of the light transmitted from the reflection mirror of the second optical waveguide 152, a fourth optical waveguide 154 for emissions is provided. The fourth optical waveguide 154 is connected in series to the first through third optical waveguides so that a single planar optical waveguide is formed.

Example 1 of an Optical Resonator

An optical resonator is designed so as to have a function of selecting any one of a plurality of wavelength channels. An example of a plurality of wavelength channels is an ITU grid having frequency intervals of 100 GHz. A description of the optical characteristics of the component elements of an optical resonator having the required function will now be described based on FIG. 45 and FIG. 46. In the graph in the bottom portion of FIG. 45, the power reflection spectrum (the solid line) of the first reflection mirror and the power reflection spectrum (the broken line) of the second reflection mirror are shown.

Figure 45:
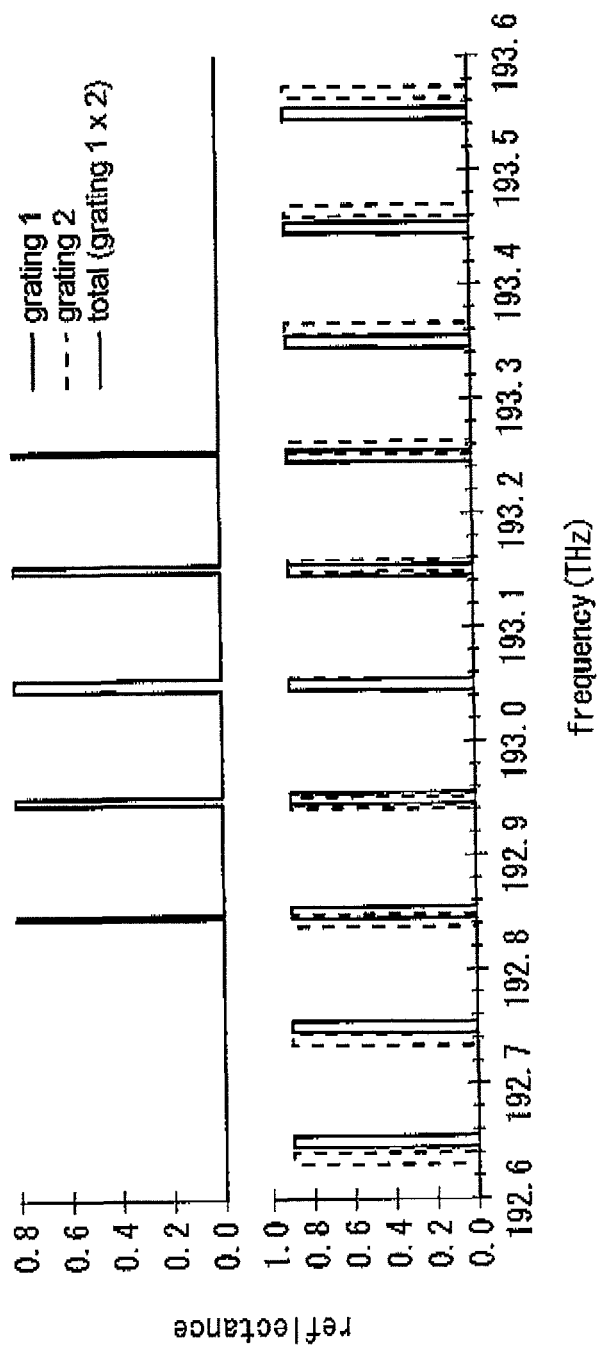
FIG. 45 is a graph in which the bottom portion shows reflection spectrums of both a first and a second reflection mirror, while the top portion shows the product of these two.

A spectrum obtained as the product of the power reflection spectrums of the first and second reflection mirrors is shown in the graph in the top portion of FIG. 45. The power reflectance of the reflection bands of the first and second reflection mirrors is set at 0.9 (i.e., 90%). The wavelength of the light resonating in the optical resonator is limited to the region where the reflection regions of the two spectrums overlap. This is generally called a vernier function, and is used in applications in which a specific wavelength component is extracted by combining two optical filters having mutually different comb-like power reflection spectrums, and, furthermore, is used to make it possible to vary the wavelength components being extracted by varying the characteristics of one optical fiber.

Figure 46:
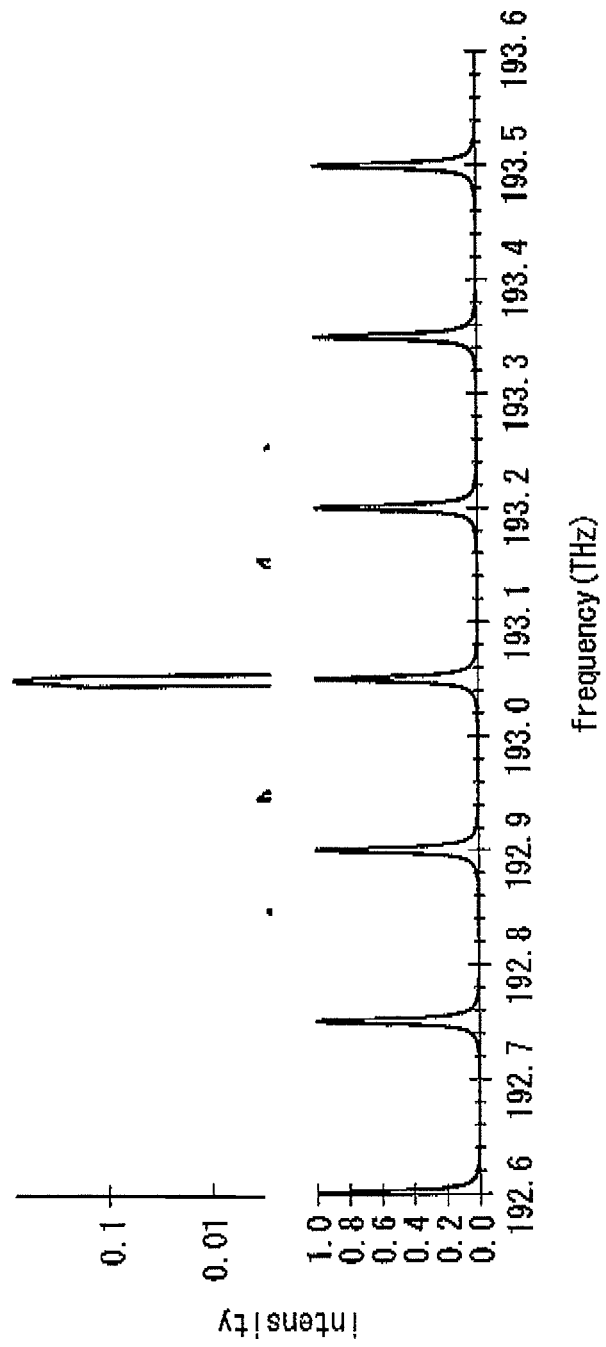
FIG. 46 is a graph in which the bottom portion shows intensity characteristics of a Fabry-Perot resonance, while the top portion shows transmission characteristics of an optical resonator.

The resonance characteristics of an optical resonator that includes the first and second optical waveguides having the characteristics shown in FIG. 45 are shown in the graph (total) in the top portion in FIG. 46. The vertical axis is shown in a normal logarithmic scale. If it assumed that the power reflectances of the two end mirrors are not wavelength-dependent and are fixed at 0.9, then the resonance characteristics are shown in the graph (FP) in the bottom portion of FIG. 46. In these resonance characteristics, the resonance peak is normalized as 1. The optical length of the optical resonator is set to 1000 μm. If the effective refractive index of the optical waveguide is 1.94945, then the waveguide length obtained by conversion from the optical length is approximately 513 μm. The resonance characteristics shown in the graph in the top portion of FIG. 46 are based on a spectrum obtained by superimposing the characteristics of the graph shown in the bottom portion of FIG. 46 onto the spectrum in the graph shown in the top portion of the FIG. 45. The resonance characteristics in the graph shown in the top portion of FIG. 46 have a peak at 193.1 THz (1552.52 nm).

By fixing the effective refractive index of the first optical waveguide, and changing the effective refractive index of the second optical waveguide, and changing the pitch of the Bragg grating pattern in the second reflection mirror, it is possible to select wavelength components of different single channels for the reflection spectrum of the first reflection mirror using a vernier function. Namely, by changing the effective refractive index of the second optical waveguide, the selected wavelength can be varied. Of course, it is also possible to change the effective refractive index of the first reflection mirror, or to change the effective refractive indices of both reflection mirrors. In the graph shown in the top portion of FIG. 46, the side channel suppression ratio is approximately 24 dB.

In order to maximize the resonance power in a selected wavelength channel, it is sufficient to adjust the phase shift which is generated when light is being propagated along the third optical waveguide which is an optical resonator medium. Namely, it is sufficient to adjust the effective refractive index of the third optical waveguide. In the graph shown in the top portion of FIG. 46, the phase shift is $0.477\pi$.

Hereinafter, the procedure to design the first optical waveguide which is formed by the first reflection mirror will be described.

The method used to design the first reflection mirror in the present example comprises the following steps [1] to [4].

[1] The dimensions ($w_{in}/w_{out}$) of the cross-sectional structure of the optical waveguide core are specified, and the field distribution of the intrinsic mode of the TE-type polarization and TM-type polarization in the cross-section are calculated. These dimensions are then adjusted such that the effective refractive indices in the two polarizations are equal. $w_{in}/w_{out}$ are then decided such that polarization dependence is cancelled out in different effective refractive indices. Correspondence relationships between the effective refractive indices and $w_{in}/w_{out}$ are then obtained so that it is possible to decide the dimensions of the cross-sectional structure of the optical waveguide core from the effective refractive indices. This step becomes the design process for the cross-sectional structure of the optical waveguide.

[2] The reflection characteristics desired for the reflection mirror are specified, and the necessary data required to determine the structure of the optical waveguide is obtained. What are specified as the reflection characteristics are the reflectance and phase in each wavelength. All of the frequency regions that include the desired reflection characteristics from the point of origin (i.e., from a frequency of 0 Hz) are included in the frequency range.

[3] The optical waveguide length is provided, and the shape distribution of the effective refractive index extending in the waveguide direction of the optical waveguide is derived from the complex field reflectance spectrum obtained in Step [2] using an inverse scattering problem solution. This step includes a calculation process to convert the complex field reflectance spectrum into a time response, and this is a real number type of conversion.

Steps [2] and [3] become the Bragg grating pattern design process.

[4] Based on the correspondence relationships between the effective refractive indices and the cross-sectional dimensions of the optical waveguide core obtained in Step [1], the shape extending in the optical waveguide direction of the Bragg grating optical waveguide is decided from the shape distribution of the effective refractive index obtained in Step [3]. This step becomes the reflection mirror design process.

Note that in the same way as in the above described wavelength dispersion compensation element design step, the order of these steps can also be switched.

Hereinafter, each step of designing the first reflection mirror will be described in detail.

Step [1]

The cross-sectional structure of the waveguide is the same as that shown in FIG. 5.

If the effective refractive index of the TE polarization is regarded as the effective refractive index of the waveguide, then the graph shown in FIG. 7 is obtained when relationships between the effective refractive index and $w_{in}$ and $w_{out}$ are calculated and plotted.

Step [2]

Using the desired phase characteristics and the power reflection spectrum in the graph shown in the bottom portion of FIG. 45, the complex field reflectance spectrum R (v) of the grating optical waveguide was calculated. In an orthogonal coordinate system, R (v) is formed by a real number component and an imaginary number component, however, converting the coordinates into a polar coordinate system and splitting the complex field reflectance into a phase and absolute value of the field reflectance simplifies dealing with the reflection mirror characteristics. Therefore, as in the above mentioned Formula A, the complex field reflectance is expressed using a polar coordinate system.

The absolute value of the reflectance is normalized as 1 (namely 100%). Within the reflection band of each channel, the absolute value of the field reflectance is set to 0.95 (i.e. 95%) such that the power reflectance $|R(v)|^2$ becomes 0.9 (90%).

In the reflection mirror of the present example, the wavelength dispersion in the reflection band of each channel is set to zero. If the wavelength dispersion is zero, the phase forms a linear function relative to the frequency. As a result of the above, the optical characteristics specified for the reflection mirror of the present example are shown in FIG. 28. In FIG. 28, the left vertical axis shows the absolute value of the field reflectance $|R(v)|$, the right vertical axis shows the phase φ (v), and these are plotted respectively by a solid line and a broken line. The horizontal axis shows the frequency v in units of THz, and specifies optical characteristics by dividing the frequency from 192.6 THz to 193.6 THz into ten equal channels at intervals of 0.1 THz. The center frequency is 193.1 THz. If this is converted into a center wavelength, it becomes 1552.52 nm. The spectrum width of the reflection band in each channel is 0.01 THz, and it can be seen that the phase changes linearly within this range.

If the spectrum shape of the rectangular reflection band of each channel, such as those shown in FIG. 28, is converted into a time waveform using an inverse Fourier transform, a sinc function type of impulse waveform is obtained. If the width of the spectrum of the reflection band is taken as Δv, then the main peak of the sinc function type impulse waveform is contained within a time region of approximately Δt=3/(Δv). Accordingly, in an optical waveguide that generates a reflection band in each channel shown in FIG. 28, the propagation time that is required between when light is incident and when it is reflected must be approximately Δt or even greater than this. The phases, which change linearly within the frequency region of each reflection band shown in FIG. 28, reflect phase delays which are caused by this propagation time.

In FIG. 28, only the frequency bands in the vicinity of channels where a reflection band is present are displayed. All of the frequency bands in which a reflection channel is present from the point of origin (i.e., from 0 THz) are included as desired optical characteristics in the optical characteristics being target of an inverse scattering method. However, because no reflection channels are present in frequency regions outside those shown in FIG. 28, the value of the field reflectance is zero.

Step [3]

The effective refractive index distribution in the waveguide direction of the optical waveguide forming a reflection mirror is derived based on the inverse scattering problem solution. This procedure is described in Step [3] in the design direction of the above described wavelength dispersion compensation element.

When specifying the entire length of the optical waveguide, the optical path length in accordance with Δt in Step [2] is taken as the minimum value, and the specification is made based on the loss and allowable dimensions of the optical waveguide. After the optical waveguide length has been specified, the potential q (z) is determined using an inverse scattering problem solution. q (z) is assigned to the above described Formula 10, and the effective refractive index distribution $n_{eff}(z)$ is obtained. Here, the conversion which is used when an impulse response is derived from the complex reflectance spectrum R (v) is a real number type.

As a result of this, the q (z) which is obtained from the above described Formula 15 is also a real number, and an effective refractive index distribution for an amplitude modulation type Bragg grating in which the amplitude of the Bragg grating changes and the phase changes incidentally to the amplitude is obtained. A definition of amplitude modulation in the present invention is given below.

$n_{eff}(z)$ is plotted in FIG. 29 and FIG. 30. The horizontal axis z shows coordinates in the optical waveguide direction. z=0 mm is the starting end of the Bragg grating optical waveguide, and z=33.0605 mm is the finishing end thereof. $n_{av}$ which corresponds to the average value of the refractive index distribution of the grating optical waveguide is 2.348 in the present example.

FIG. 30 shows an enlargement of the effective refractive index distribution shown in FIG. 29 for a portion of the optical waveguide. It can be seen that $n_{eff}$ oscillates at a cycle of half the value obtained by dividing the center wavelength (1552.52 nm), which corresponds to the center frequency (193.1 THz), by $n_{av}$, so as to exhibit a pattern that regulates the Bragg grating.

One of the features of the amplitude modulation type Bragg grating of the present invention is that, as was described in [Example 1 of an optical filter], the coding of the gradient of the envelope curve of the amplitude of the Bragg grating is inverted.

Step [4]

Based on a correspondence relationship between the effective refractive index $n_{eff}$ and the dimensions $w_{in}$ and $w_{out}$ of the optical waveguide prepared in Step [1], the effective refractive index distribution $n_{eff}(z)$ obtained in Step [3] was converted into distribution data (i.e., a profile) for $w_{in}$ and $w_{out}$. When the effective refractive index was determined by using the correspondence relationship shown in FIG. 6A and FIG. 6B, $w_{out}$ and $w_{in}$, which are the dimensional parameters to be decided, were determined. As is shown in FIG. 30, the Bragg grating pattern in the effective refractive index distribution has a sinusoidal shape.

In a pattern transfer process which is based on dry-etching and lithography using an optical mask, if a rectangular wave type of shape is employed in which a combination of spaces whose lines, which have a fixed width, and widths change in accordance with the pitch are repeatedly arrayed, there are few fluctuations in the shape after the dry etching. Therefore, after profile data for the optical waveguide dimensions $w_{out}$ and $w_{in}$ has been obtained from the profile of the effective refractive index, it is converted into a rectangular wave shaped profile. However, in this conversion to a rectangular wave shape, the following two restrictions must be observed.

(1) In the present example, the line width is fixed at 140 nm. In contrast, the spaces change in accordance with the pitch of the grating. A larger value than the threshold value of the machining accuracy is set for the line width.

(2) The line amplitude of the rectangular wave shape is adjusted so as to match the core area covered by the sinusoidal Bragg grating pattern.

In accordance with the above flow, the profiles of $w_{out}$ and $w_{in}$ shown in FIG. 31 are obtained. The range of the horizontal axis in FIG. 31 is in the same region as the horizontal axis in FIG. 30. FIG. 29 through FIG. 31 which were described in the present example are the same as those described in Example 1 of an optical filter described above.

A design procedure for the first optical waveguide which forms the first reflection mirror has been described above. However, the second optical waveguide which forms the second reflection mirror can also be designed in the same way based on the predetermined phase characteristics and the power reflection spectrum shown in the graph in the bottom portion of FIG. 45.

The third optical waveguide is connected in series between the first optical waveguide and the second optical waveguide. The length of the third optical waveguide is as described above. If an optical waveguide on a substrate is used, then an optical waveguide in which the first optical waveguide, the third optical waveguide, and the second optical waveguide are connected in series can be defined on an optical mask.

The optical resonator of the present example can be used in applications such as optical filters that extract a specific frequency component, and laser resonators. If it is used for laser resonators, it is necessary for the third optical waveguide to have an optical amplification function which utilizes optical gain. By reducing polarization dependence, it is possible to manufacture an optical resonator that corresponds to an arbitrary polarization.

[Amplitude Modulation-Type Bragg Gratings]

In the above description, it was described that an amplitude modulation-type Bragg grating based on exemplary embodiments differs from a chirped Bragg grating. In contrast, according to the sampling theorem described below, a Bragg grating pattern is defined as having a single meaning (i.e., as being unique), and differences such as amplitude modulation types or chirped types of Bragg grating pattern did not appear. However, this applies to continuous effective refractive index distributions, and does not apply to discrete effective refractive index distributions that have undergone coarse graining. This point is supplemented below.

The effective refractive index distribution of a Bragg grating is obtained as an effective refractive index distribution for discrete points sampled at fixed intervals on a coordinate axis which extends in the light propagation direction. If the sampling theorem derived by Nyquist, Shannon, and Someya is applied to the effective refractive index distribution of a Bragg grating, then if the coordinate interval, namely, the sampling cycle of discrete points in the effective refractive index distribution obtained from a design is set to not more than half the local cycle (i.e., the pitch) of the sinusoidal changes in the effective refractive index of the targeted Bragg grating, then the continuous effective refractive index distribution which corresponds to the discrete effective refractive index distribution is determined as being unique. In order to determine a continuous effective refractive index distribution, as is shown in the following Formula B, a Whittaker-Shannon interpolation formula which utilizes a sinc function is used.

[Expression 18]

$$q(z) = \sum_{n=-\infty}^{+\infty} \left\{ q(nZ_{IS}) \cdot \text{sinc}\left[\pi\left(\frac{z}{Z_{IS}} - n\right)\right] \right\} \quad \text{(Formula B)}$$

Here, z is the continuous coordinates, q (z) expresses a potential that provides an effective refractive index distribution defined by continuous coordinates, q ($nZ_{IS}$) expresses a potential that provides an effective refractive index defined by discrete coordinates, and $Z_{IS}$ is the sampling cycle. In the present example, because the sampling cycle is $\frac{1}{5}^{th}$ the pitch, the effective refractive index is decided uniquely. n is an integer specifying a discrete coordinate point. In reality, because the Bragg grating length is finite, n is finite. Reproducing the (original) continuous waveform from the discrete waveform is called "reconstruction". In order to achieve a Bragg grating having predetermined optical characteristics, it is necessary for the effective refractive index distribution to be able to be reconstructed uniquely. The above Formula 10 is used to obtain the effective refractive index $n_{eff}$ from the potential.

It should be noted that, in order to form a Bragg grating pattern by optical exposure, it is necessary to prepare data of a Bragg grating pattern for an optical mask. The pattern data for an optical mask is prepared as a digital file in GDS format or the like. Because the number of data items is unlimited in a continuous effective refractive index distribution, the file capacity is infinite. Accordingly, it is necessary to use a discrete effective refractive index distribution which has a limited number of data items as the optical mask pattern data. As a result of this, even if a continuous effective refractive index distribution is reconstructed, it is necessary to convert it to a discrete distribution. Because of this, the discrete effective refractive index distribution before the reconstruction is used for the mask pattern data. In a discrete effective refractive index distribution, the shape of the effective refractive index distribution differs depending on the discretized sampling cycle and the mode of discretization. This fact generates the differences between amplitude modulation-type and chirped Bragg gratings. If there is a need to further improve the accuracy with which predetermined optical characteristics are reproduced, then it is possible to use an effective refractive index distribution which has been discretized after undergoing reconstruction as the mask data.

Figure 47:
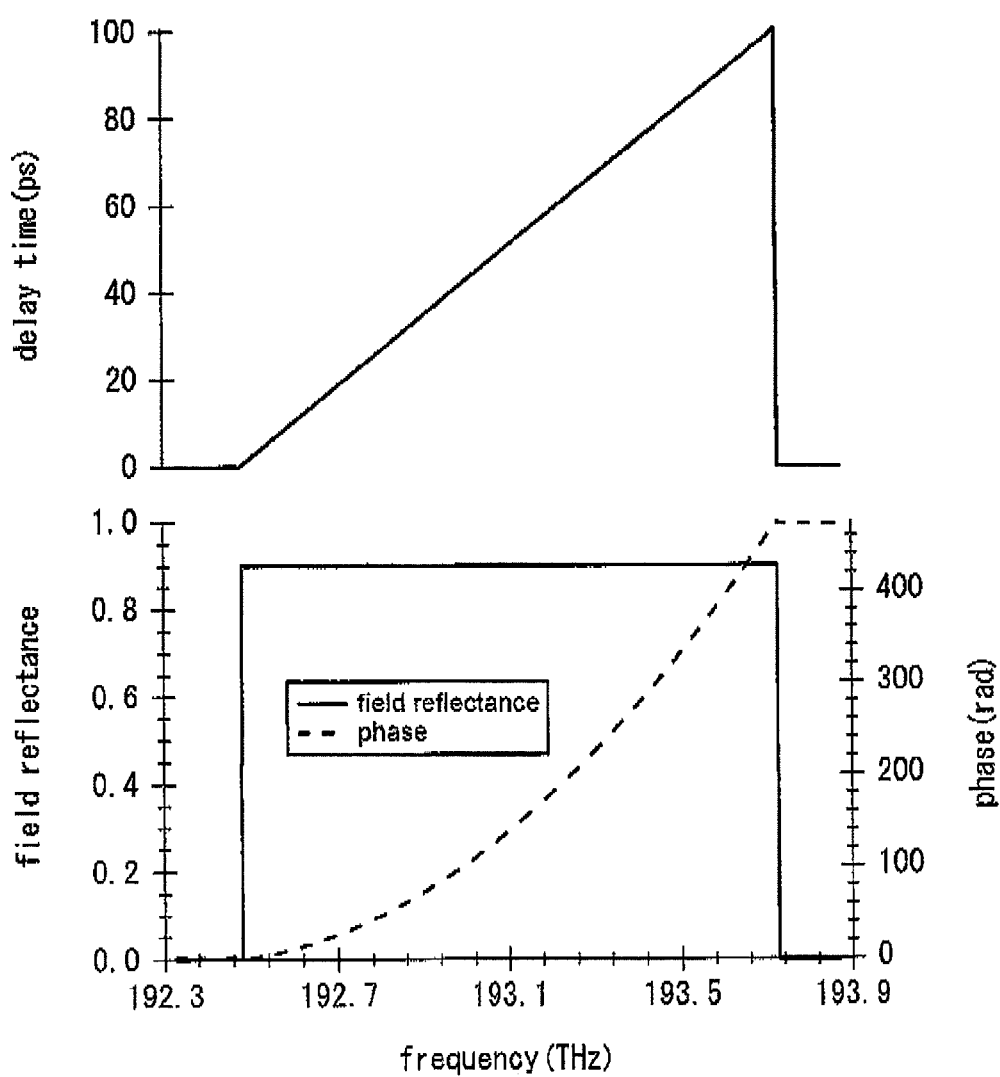
FIG. 47 is a graph in which the top portion shows frequency dependence of a delay time in an example of an optical element having a single reflection channel, while the bottom portion shows an absolute value and phase of a complex field reflectance in this example.

For example, if a case in which optical characteristics such as those shown in FIG. 47 are specified as the predetermined characteristics are considered. In FIG. 47, an example of the characteristics of an optical element having a single reflection channel is shown. In the top portion of the graph in FIG. 47, the frequency dependence of the delay time is plotted, while in the bottom portion of the graph in FIG. 47, the absolute value of the complex field reflectance and phase are plotted. The frequency width of the reflection channel is 1.244 THz. The center frequency is 193.1 THz. The spectrum occupancy of the half value of the width of the reflection channel is approximately 0.32% of the center frequency, which is a narrow band. Note that in each example of the present invention, the width of each channel is even narrower.

If a Bragg grating that provides the above characteristics is formed by a chirped Bragg grating, then a resolution that corresponds to changing the pitch by a maximum of only 0.32% is sought for the discretization of the coordinate axis of the Bragg grating. Namely, the number of segments used to discretize each pitch is at least 313 which is an inverse number of 0.32%. In order to reproduce the fact that the pitch changes continuously in the light waveguide direction, it is necessary to raise the resolution even further, so that the number of data items increases even further. Accordingly, if an attempt to accurately construct a chirped Bragg grating is made, the number of data items is enormous, and the processing itself of the mask data becomes difficult. Moreover, a maximum amount of change in the pitch of only 0.32% is only approximately 1 nm if the pitch center value is taken as 340 nm. In order to chirp this, it is necessary to miniaturize this even further, however, it is difficult to accurately manufacture an optical mask pattern at a sub-nanometer accuracy level.

Accordingly, it can be said that an amplitude modulation-type Bragg grating is advantageous from the standpoints of improving the accuracy of the manufacturing process, and of both reducing processing time and costs. As has been described above, in order to select an amplitude modulation-type Bragg grating pattern, it is sufficient to perform coarse graining in which the discretized resolution of the coordinate axis is taken as more than an amount of change in the pitch which corresponds to the half value of the width of the reflection band, in other words, the discretized resolution of the coordinate axis is taken as more than (not less than) the maximum value of the amount of change from the pitch center value in a chirped Bragg grating. As a result of this, the continuous changes in pitch in a chirped Bragg grating are accumulated, and the feature is evident that the coding of the gradient of the envelope curve of the amplitude of the Bragg grating is inverted at a single isolated coordinate point, and that the phase changes continuously incidentally to this.

EXAMPLES

Hereinafter, exemplary embodiments will be described in greater detail using comparisons between Examples and Comparative examples.

In order to evaluate the effects of roughness on the core side walls, the basic propagation mode was simulated using a mode solver, and the effective refractive index of the ribs was calculated. In Examples 1 and 2, the optical confinement coefficient in the core region was also calculated.

Simulation Example 1

In Example 1, in the planar optical waveguide element of the first embodiment shown in FIGS. 1A and 1B, the top cladding 7, bottom cladding 6, and center gap 3 were formed from $SiO_2$ having a refractive index of 1.45, and the high refractive index ribs 1 and 2 were formed from Si having a refractive index of 3.48. The dimensions of the respective portions were set as height $t_1$ of the rectangular parallelepiped portions 1b and 2b=250 nm, thickness $t_2$ of the planar portions 1a and 1b=50 nm, width w1 of the rectangular parallelepiped portions 1b and 2b=280 nm, and width w2 of the center gap 3=160 nm.

Figure 48:
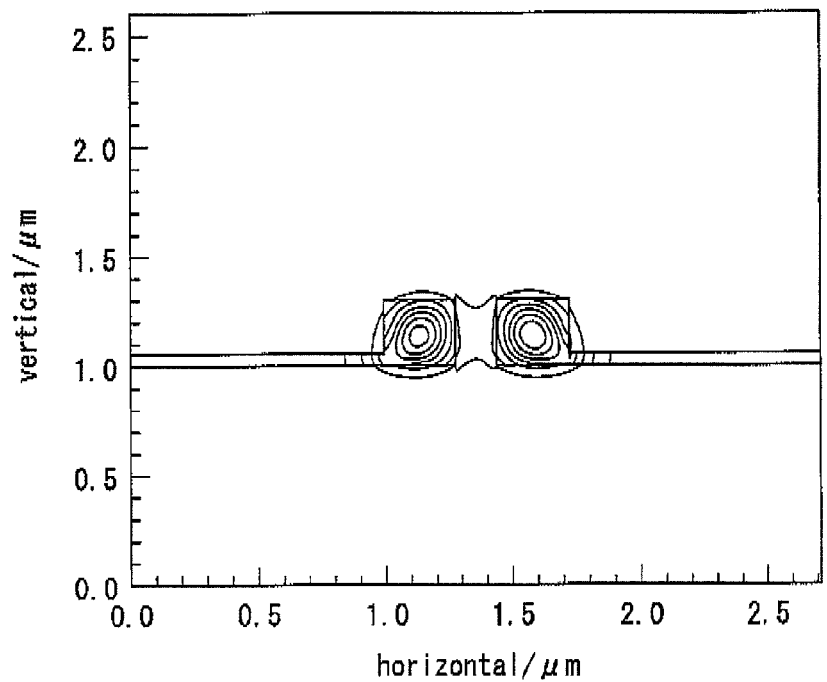
FIG. 48 is a contour plan showing simulation results for the light intensity distribution of a core in Example 1 of the planar optical waveguide element shown in FIG. 1A and FIG. 1B.

FIG. 48 shows the light intensity distribution of the core expressed as a contour diagram as a simulation result for Example 1. Note that, in FIG. 48, the interfaces of each material are also shown for a reference. These results were as follows: the effective refractive index of the basic propagation mode for $w_1$=280 nm was 2.1640. Moreover, the optical confinement coefficient in rib areas in two locations of the high refractive index ribs 1 and 2 which each had cross-sectional areas of width $w_1$×height $(t_1+t_2)$ was 70.5%, and it was found that the propagated light was mainly confined in the silicon core area.

Furthermore, in order to evaluate the effects of core (rib) side wall roughness generated in an etching process during manufacturing, $w_1$ alone was altered to 275 nm and 285 nm, and the effective refractive index of the basic propagation mode was measured in the same type of simulation. It was found that the measured effective refractive indices were 2.1458 and 2.1827 respectively. Namely, the effective refractive index varied −0.84% relative to a variation of −1.79% in $w_1$, and the effective refractive index varied +0.86% relative to a variation of +1.79% in $w_1$.

Simulation Example 2

In Example 2, in the planar optical waveguide element of the second embodiment shown in FIG. 2, the top cladding 7A, bottom cladding 6A, and center gap 3A were formed from $SiO_2$ having a refractive index of 1.45, and the high refractive index cores 1A and 2A were formed from silicon nitride having a refractive index of 2.0. The dimensions of the respective portions were set as height $t_3$ of the cores 1A and 2A and of the center gap 3A=600 nm, width $w_3$ (on one side) of the cores 1A and 2A=340 nm, and width $w_4$ of the center gap 3A=160 nm.

Figure 49:
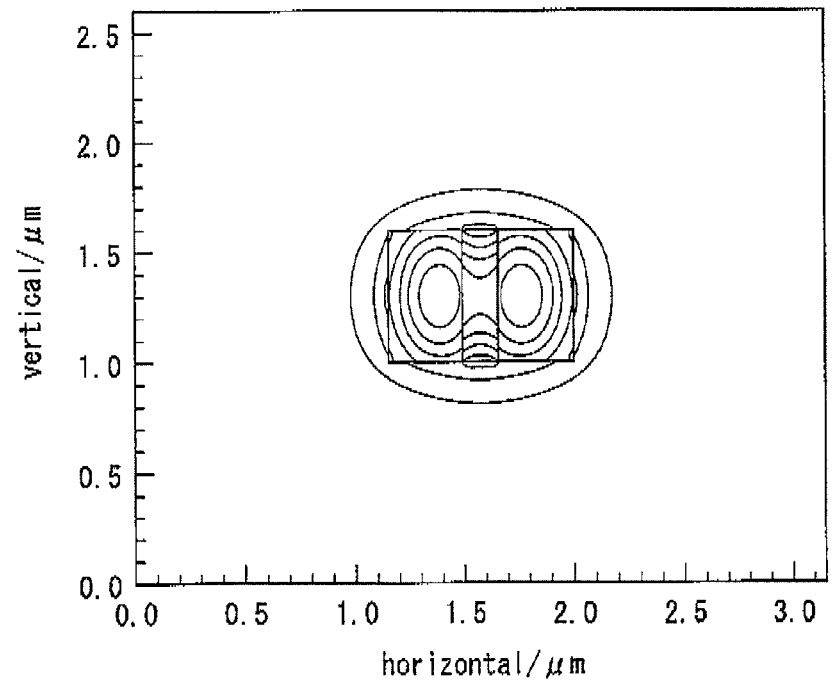
FIG. 49 is a contour plan showing simulation results for the light intensity distribution of a core in Example 2 of the planar optical waveguide element shown in FIG. 2.

FIG. 49 shows the light intensity distribution of the core expressed as a contour diagram as a simulation result for Example 2. Note that, in FIG. 49, the interfaces of each material are also shown for a reference. These results were as follows: the effective refractive index of the basic propagation mode for $w_3$=340 nm was 1.5690. Moreover, the optical confinement coefficient in the silicon nitride core areas in two locations each having cross-sectional areas of width $w_3$×height $t_3$ was 41.2%. In contrast to this, the optical confinement coefficient in the center gap area having a cross-sectional area of width $w_4$×height $t_3$ was 22.1%, and it was found that the propagated light was mainly confined in the silicon nitride core area.

Furthermore, in order to evaluate the effects of core side wall roughness generated in an etching process during manufacturing, $w_1$ alone was altered to 335 nm and 345 nm, and the effective refractive index of the basic propagation mode was measured in the same type of simulation. It was found that the measured effective refractive indices were 1.5663 and 1.5717 respectively. Namely, the effective refractive index varied −0.17% relative to a variation of −1.47% in $w_1$, and the effective refractive index varied +0.17% relative to a variation of +1.47% in $w_1$.

Simulation Comparative Example 1

Figure 50A:
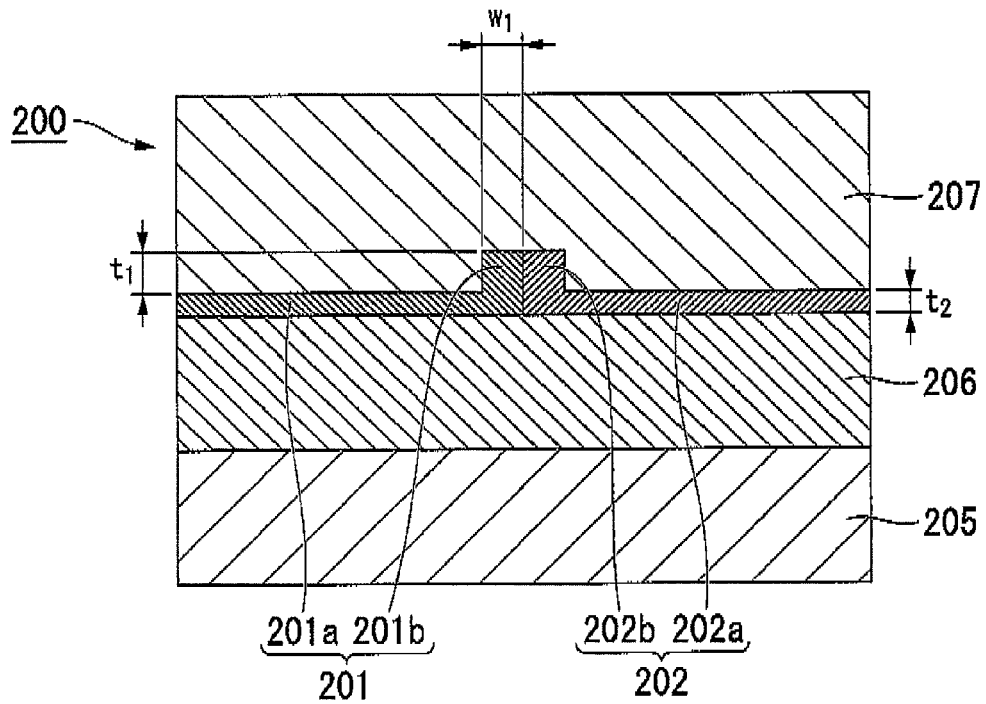
FIG. 50A is a cross-sectional view showing the schematic structure of a planar optical waveguide element of Comparative example 1.
Figure 50B:
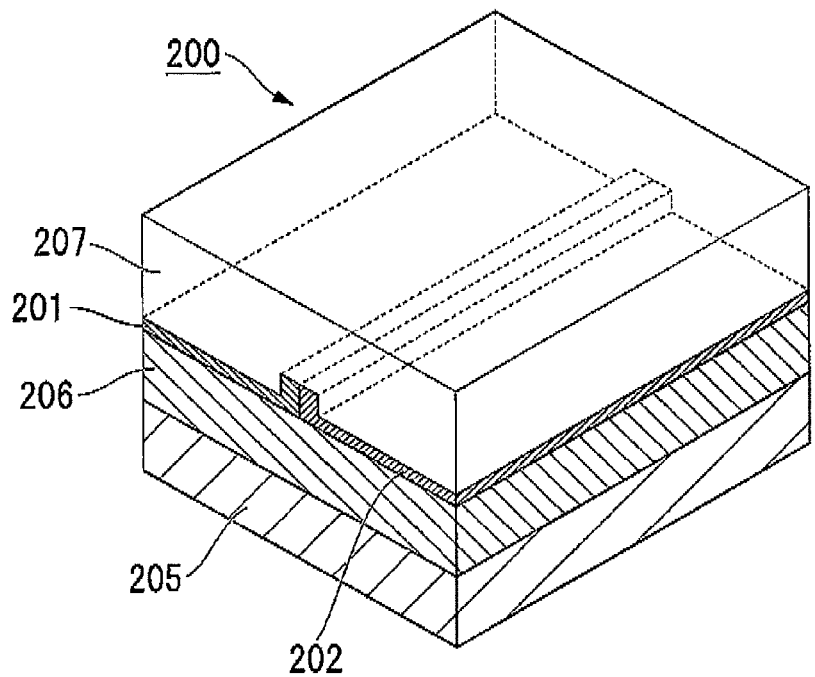
FIG. 50B is a partial perspective view of this same planar optical waveguide element.

In Comparative example 1, in the planar optical waveguide element having no center gap as shown in FIGS. 50A and 50B, the top cladding 207 and the bottom cladding 206 were formed from $SiO_2$ having a refractive index of 1.45, and the high refractive index ribs 201 and 202 were formed from Si having a refractive index of 3.48. The dimensions of the respective portions were set as height $t_1$ of the rectangular parallelepiped portions 201b and 202b=250 nm, thickness $t_2$ of the planar portions 201a and 201b=50 nm, and width $2w_1$ of the ribs=380 nm (corresponding to 190 nm of $w_1$ on one side). The materials used for each portion, as well as $t_1$ and $t_2$ were the same as in the above-described Example 1. w1 was a value determined as a condition for single mode propagation.

Figure 52:
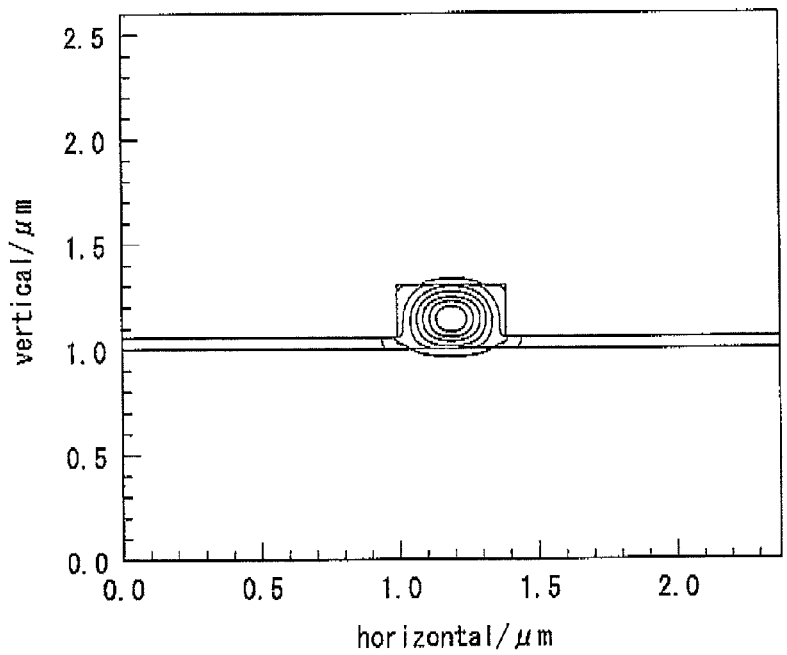
FIG. 52 is a contour plan showing simulation results for the light intensity distribution of a core in Comparative example 1 of the planar optical waveguide element shown in FIG. 50A and FIG. 50B.

FIG. 52 shows the light intensity distribution of the core expressed as a contour diagram as a simulation result for Comparative example 1. Note that, in FIG. 52, the interfaces of each material are also shown for a reference. These results were as follows: the effective refractive index of the basic propagation mode for $2w_1$=380 nm was 2.4905. Moreover, in order to evaluate the effects of core (rib) side wall roughness generated in an etching process during manufacturing, $2w_1$ alone was altered to 370 nm and 390 nm, and the effective refractive index of the basic propagation mode was measured in the same type of simulation. It was found that the measured effective refractive indices were 2.4657 and 2.5149 respectively. Namely, the effective refractive index varied −1.0% relative to a variation of −2.6% in $2w_1$, and the effective refractive index varied +0.98% relative to a variation of +2.6% in $2w_1$.

Simulation Comparative Example 2

Figure 51:
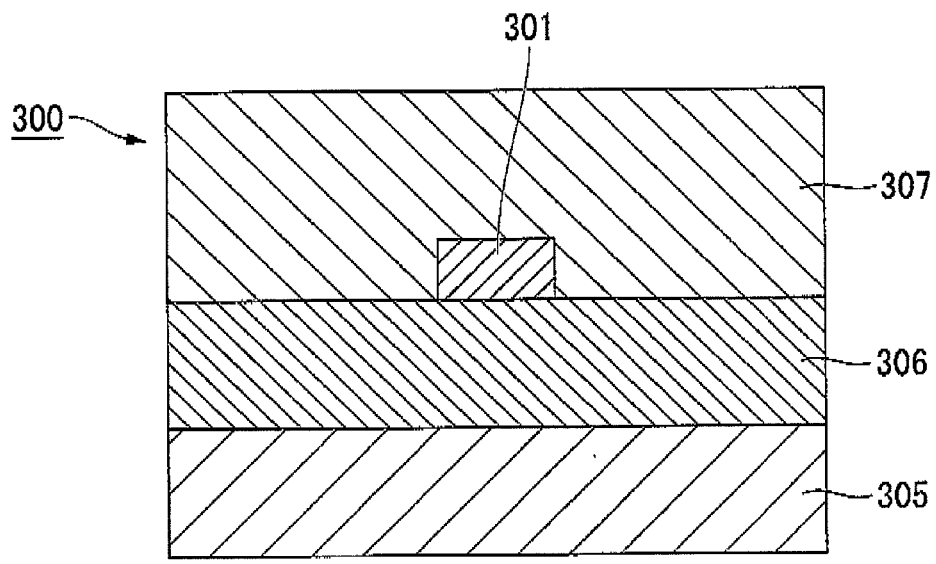
FIG. 51 is a cross-sectional view showing the schematic structure of a planar optical waveguide element of Comparative example 2.

In Comparative example 2, in the planar optical waveguide element having no center gap as shown in FIG. 51, the top cladding 307 and the bottom cladding 306 were formed from $SiO_2$ having a refractive index of 1.45, and the high refractive index core 301 was formed from silicon nitride having a refractive index of 2.0. The dimensions of the respective portions were set as height of the core 301=600 nm, width of the core 301=680 nm (corresponding to $2w_3$ of Example 2). The materials used for each portion, as well as the cross-sectional dimensions of the core were the same as in the above-described Example 2.

Figure 53:
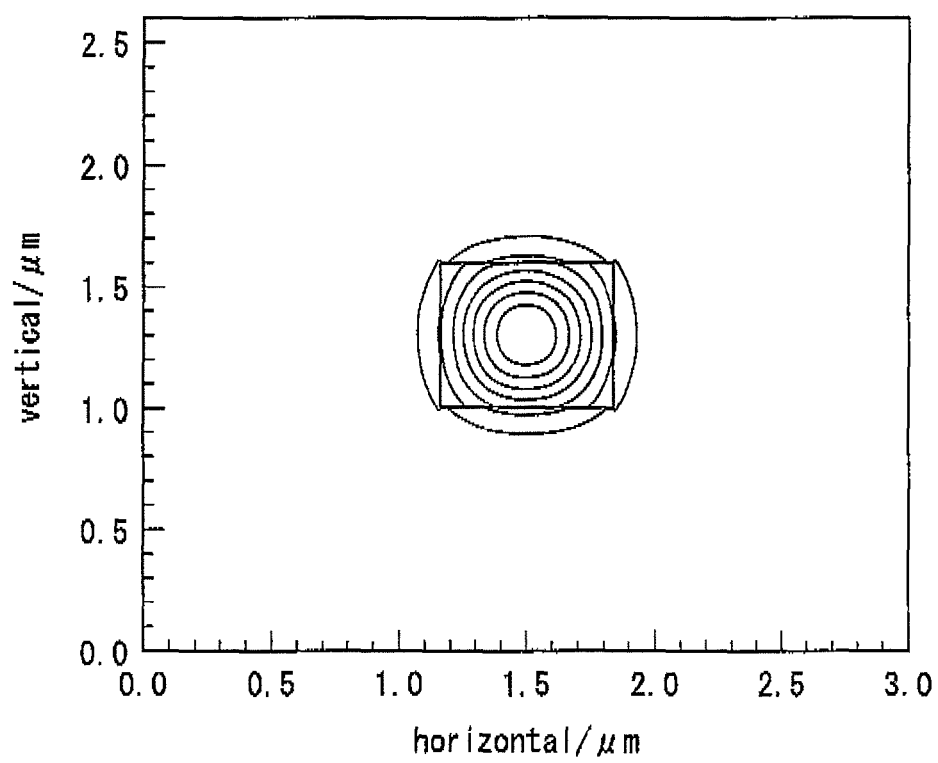
FIG. 53 is a contour plan showing simulation results for the light intensity distribution of a core in Comparative example 2 of the planar optical waveguide element shown in FIG. 51.

FIG. 53 shows the light intensity distribution of the core expressed as a contour diagram as a simulation result for Comparative example 2. Note that, in FIG. 53, the interfaces of each material are also shown for a reference. These results were as follows: the effective refractive index of the basic propagation mode for a core width of 680 nm was 1.6482. Moreover, in order to evaluate the effects of core side wall roughness generated in an etching process during manufacturing, the core width alone was altered to 670 nm and 690 nm, and the effective refractive index of the basic propagation mode was measured in the same type of simulation. It was found that the measured effective refractive indices were 1.6446 and 1.6517 respectively. Namely, the effective refractive index varied −0.22% relative to a variation of −1.47% in core width, and the effective refractive index varied +0.21% relative to a variation of +1.47% in core width.

Simulation Comparative Example 3

The basic propagation mode was simulated using a mode solver in the same way as in the above-described Examples 1 and 2 and Comparative examples 1 and 2 for the structure described in FIGS. 1 (a) and (b) and FIG. 3 (a) of the above-described Non-patent document 4. The results of this showed that the optical confinement coefficient in a rectangular silicon core area (having a refractive index of 3.48, and width 180 nm×height 300 nm×two locations) was 42.7%. Moreover, the optical confinement coefficient in silica glass of the center gap area (having a refractive index of 1.46, and width 50 nm×height 300 nm) was 48.0%. From this it was found that the propagated light was mainly confined in the center gap area (i.e., the slot area).

Comparison Between Examples and Comparative Examples

By comparing Example 1 with Comparative example 1, and Example 2 with Comparative example 2, it was found that, in each example in which a center gap was provided, variations in the effective refractive index of the basic propagation mode relative to variations in the core width were smaller. Namely, according to the present examples, it is possible to reduce the effects of core side wall roughness.

Moreover, by comparing Examples 1 and 2 with Comparative example 3, the difference was found that, while in Comparative example 3 propagated light was mainly confined within the center gap area, in the Examples propagated light was mainly confined within high refractive index core. This difference shows a unique structure in which, by narrowing the center gap in Comparative example 3, propagated light is confined within the center gap area which has a low refractive index.

Exemplary embodiments described herein enable propagated light to be confined mainly within the high refractive index core, unlike the cases of Non-patent document 4 and Comparative example 3. Because of this, side wall roughness in the high refractive index core has an effect on optical characteristics. In contrast to this, by dividing the high refractive index core into two areas, and providing a low refractive index gap area between these two areas, the effects of side wall roughness in the high refractive index core are inhibited.

INDUSTRIAL APPLICABILITY

According to exemplary embodiments described herein, it is possible to provide a planar optical waveguide element that makes it possible to reduce the effects of core side wall roughness which is inevitably generated in a manufacturing process, and also possible to provide a wavelength dispersion compensation element and to a design method thereof which uses this planar optical waveguide element.

Although a few exemplary embodiments have been shown and described, it would be appreciated by those skilled in the art that changes may be made in these embodiments without departing from the principles and spirit of the inventive concept, the scope of which is defined in the claims and their equivalents.

What is claimed is:

1. A planar optical waveguide element comprising:

a core of an optical waveguide comprising a first portion and a second portion, extending in a propagation direction of guided light, and a gap portion disposed between the first portion and the second portion in a width direction of the core, perpendicular to the propagation direction of guided light; and a first Bragg grating pattern and a second Bragg grating pattern provided on the core, wherein the gap portion has a refractive index lower than a refractive index of the first portion and the second portion of the core;

wherein a single mode is propagated in the optical waveguide so as to span across the first portion and the second portion of the core;

wherein the first Bragg grating pattern and the second Bragg grating pattern are mutually parallel and extend in the propagation direction of guided light;

wherein the first Bragg grating pattern comprises recessed and protruding portions that are formed on both outer side walls of the core along the propagation direction of guided light;

wherein the second Bragg grating pattern comprises recessed and protruding portions that are formed, along the propagation direction of guided light, on both inner side walls of a groove that is formed on a top portion of the core at a center of the core in the width direction; and wherein the protruding portions of the first Bragg grating pattern where a core width is wide correspond with the protruding portions of the second Bragg grating pattern where a width of the groove is narrow, and the recessed portions of the first Bragg grating pattern where the core width is narrow correspond with the recessed portions of the second Bragg grating pattern where the width of the groove is wide.

2. The planar optical waveguide element according to claim 1, wherein the first Bragg grating pattern and the second Bragg grating pattern comprise a plurality of isolated single coordinate points where a sign of a gradient of an envelope curve of an amplitude of a Bragg grating is inverted.

* * * * *